(12) United States Patent
Tokunaga et al.

(10) Patent No.: US 12,715,378 B2
(45) Date of Patent: Aug. 25, 2026

(54) COMMUNICATION SYSTEM

(71) Applicant: DENSO CORPORATION, Kariya-city (JP)

(72) Inventors: Tomoya Tokunaga, Kariya-city (JP); Akira Tada, Kariya-city (JP); Ryota Kameoka, Kariya-city (JP); Tomohisa Kishigami, Kariya-city (JP); Yuta Kawamura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 12 days.

(21) Appl. No.: 18/815,915

(22) Filed: Aug. 27, 2024

(65) Prior Publication Data

US 2025/0074340 A1 Mar. 6, 2025

(30) Foreign Application Priority Data

Aug. 30, 2023 (JP) ................................ 2023-140005
Aug. 6, 2024 (JP) ................................ 2024-129825

(51) Int. Cl.
*B60R 16/03* (2006.01)
*B60R 16/023* (2006.01)
*G07C 5/08* (2006.01)

(52) U.S. Cl.
CPC ........ *B60R 16/0232* (2013.01); *G07C 5/0808* (2013.01)

(58) Field of Classification Search
CPC ... B60R 16/0232; B60R 16/023; B60R 16/03; G07C 5/0808; H04L 67/12; H04L 41/0631
See application file for complete search history.

(56) References Cited

U.S. PATENT DOCUMENTS

2015/0112510 A1* 4/2015 Tokunaga .............. B60R 16/03 701/1
2024/0430125 A1* 12/2024 Piednoel ............. G06F 15/7807
2025/0055273 A1* 2/2025 Gauthier ................ H02H 3/087

FOREIGN PATENT DOCUMENTS

EP 2208124 B1 * 10/2019 .......... H04L 12/462
JP 2015081021 A 4/2015

* cited by examiner

*Primary Examiner* — Masud Ahmed
(74) *Attorney, Agent, or Firm* — Harness, Dickey & Pierce, P.L.C.

(57) ABSTRACT

A first device receives an electric power from a battery via an electronic fuse. A second device is connected to the first device to transmit and receive a frame. A third device controls the operation of the electronic fuse. The first and second devices store a diagnosis mask table. The diagnosis mask table defines, for each of communication groups, one or more combinations of a device whose electric power supply via the electronic fuse is cut off, a device which enters a sleep state, and a communication frame that is not received. The third device determines an activation group based on acquired activation trigger information. The third device transmits the communication frame indicating the determined activation group to the first and second devices.

21 Claims, 34 Drawing Sheets

1
BAT
7
MAST ECU
2
CONT U
11
CPU
21
ROM
22
RAM
23
MEM
14
ACT TAB
25
ELE FUSE
15
ELE FUSE
16
CAN COM U
12
CAN COM U
13
SLAVE ECU
3
CONT U
31
CPU
41
ROM
42
RAM
43
MEM
33
DIAG MASK TAB
45
CAN COM U
32
SLAVE ECU
4
CONT U
31
MEM
33
CAN COM U
32
SLAVE ECU
5
CONT U
31
MEM
33
CAN COM U
32
8
SLAVE ECU
6
CONT U
31
MEM
33
CAN COM U
32
9

| | DLC | | | | DATA | | | | | | | |
|---|---|---|---|---|---|---|---|---|---|---|---|---|
| AFFILI INF | 0 | 0 | 0 | 1 | 1 | 0 | 1 | 0 | 1 | 0 | 0 | 0 |
| | | | Groups: | | 1 | 2 | 3 | 4 | 5 | 6 | 7 | 8 |
| ACT INF | 0 | 0 | 0 | 1 | 0 | 1 | 1 | 1 | 1 | 0 | 0 | 0 |

1
2
MAST ECU
11
CONT U
21
CPU
22
ROM
23
RAM
14
MEM
25
ACT TAB
27
DIAG MASK TAB
15
ELE FUSE
16
ELE FUSE
12
CAN COM U
13
CAN COM U
7
BAT
3
SLAVE ECU
31
CONT U
41
CPU
42
ROM
43
RAM
33
MEM
32
CAN COM U
4
SLAVE ECU
5
SLAVE ECU
6
SLAVE ECU
8
9

| EVENT | ACT GR | COND FUSE |
| --- | --- | --- |
| 1ST EVENT | 1ST COM GR | ELE FUSE15 |
| 2ND EVENT | 2ND COM GR | ELE FUSE15, ELE FUSE16 |
| 3RD EVENT | 3RD COM GR | ELE FUSE16 |
| 4TH EVENT | 1ST COM GR | ELE FUSE15 |
| | 2ND COM GR | ELE FUSE15, ELE FUSE16 |
| 5TH EVENT | 4TH COM GR | NO FUSE |
| ⋮ | ⋮ | ⋮ |

27,45

| ACT GR | ECU | CANID |
| --- | --- | --- |
| 1ST COM GR | SLAVE ECU4 | 1ST CANID |
| | SLAVE ECU5 | 2ND CANID |
| 2ND COM GR | SLAVE ECU6 | 3RD CANID |
| ⋮ | ⋮ | ⋮ |

27

| ELE FUSE | ELE POW SUP ECU | CANID |
| --- | --- | --- |
| ELE FUSE15 | SLAVE ECU3 | 4TH CANID |
| ELE FUSE16 | SLAVE ECU4 | 1ST CANID |

1
2
MAST ECU
7
BAT
503
WIRELESS DEV
11
CONT U
21
CPU
22
ROM
23
RAM
14
MEM
15
ELE FUSE
16
ELE FUSE
12
CAN COM U
504
ELE FUSE
505
ELE FUSE
13
CAN COM U
TO ANOTHER MASTER ECU
9
8
3
SLAVE ECU
5
SLAVE ECU
4
SLAVE ECU
501
SMART SENS
502
SMART ACTUATOR
6
SLAVE ECU

FIG. 9

| CONT TARGET | 1ST CLUSTER | 2ND CLUSTER | 3RD CLUSTER | 4TH CLUSTER | 5TH CLUSTER | 6TH CLUSTER | 7TH CLUSTER |
|---|---|---|---|---|---|---|---|
| ELE FUSE15, ECU3 | ✓ | | ✓ | | | | |
| ECU5 | | ✓ | | ✓ | | | |
| ELE FUSE16, ECU4 | ✓ | | | | ✓ | | |
| ELE FUSE504, SENS501 | | ✓ | | | | ✓ | |
| ELE FUSE505, ACTUATOR502 | | ✓ | | | | | ✓ |

BAT
117
CENTRAL ECU
101
100
118
SLAVE ECU
108
109
110
111
112
113
114
115
116
ZONE ECU
104
105
106
107
UP STREAM POW SUP DISTRIB U
102
103
121
122
123
124
125
126
127
128
129
130
131
132
133
134
135
136
141
142
143
144
145
146
147
148
149
150

CENTRAL ECU
101
CONT U
151
CPU
161
ROM
162
RAM
163
MEM
158
ACT TAB
165
COM U
152
COM U
153
COM U
154
COM U
155
COM U
156
COM U
157
143
144
145
146
142
141
102
103
COM U
172
COM U
182
ELE FUSE
173
ELE FUSE
174
ELE FUSE
183
ELE FUSE
184
123
124
125
126
121
122
171
181
CONT CIRCUIT
CONT CIRCUIT
UP STREAM POW SUP DISTRIB U
UP STREAM POW SUP DISTRIB U

| EVENT | ACT GR |
|---|---|
| 1ST EVENT | 3RD COM GR |
| 2ND EVENT | 2ND COM GR |
| 3RD EVENT | 1ST COM GR |
| ... | ... |

| ACT GR | ZONE ECU 104 | | ZONE ECU 105 | | ZONE ECU 106 | | ZONE ECU 107 | |
|---|---|---|---|---|---|---|---|---|
| 1ST COM GR | SLAVE ECU 108 | ON | SLAVE ECU 110 | ON | SLAVE ECU 112 | ON | SLAVE ECU 115 | ON |
| | SLAVE ECU 109 | ON | SLAVE ECU 111 | ON | SLAVE ECU 113 | ON | SLAVE ECU 116 | ON |
| | SLAVE ECU 118 | ON | | | SLAVE ECU 114 | ON | | |
| 2ND COM GR | SLAVE ECU 108 | ON | SLAVE ECU 110 | OFF | SLAVE ECU 112 | OFF | SLAVE ECU 115 | ON |
| | SLAVE ECU 109 | ON | SLAVE ECU 111 | OFF | SLAVE ECU 113 | ON | SLAVE ECU 116 | ON |
| | SLAVE ECU 118 | ON | | | SLAVE ECU 114 | ON | | |
| 3RD COM GR | SLAVE ECU 108 | ON | SLAVE ECU 110 | OFF | SLAVE ECU 112 | OFF | SLAVE ECU 115 | OFF |
| | SLAVE ECU 109 | OFF | SLAVE ECU 111 | ON | SLAVE ECU 113 | ON | SLAVE ECU 116 | OFF |
| | SLAVE ECU 118 | ON | | | SLAVE ECU 114 | ON | | |
| ... | ... | | ... | | ... | | ... | |

| EVENT | ACT GR |
|---|---|
| 1ST EVENT | 3RD COM GR |
| 2ND EVENT | 2ND COM GR |
| 3RD EVENT | 1ST COM GR |
| ⋮ | ⋮ |

| ACT GR | ZONE ECU 104 | | ZONE ECU 105 | | ZONE ECU 106 | | ZONE ECU 107 | |
|---|---|---|---|---|---|---|---|---|
| 1ST COM GR | SLAVE ECU 108 | | SLAVE ECU 110 | | SLAVE ECU 112 | | SLAVE ECU 115 | |
| | SLAVE ECU 109 | | SLAVE ECU 111 | | SLAVE ECU 113 | | SLAVE ECU 116 | |
| | SLAVE ECU 118 | | | | SLAVE ECU 114 | | | |
| 2ND COM GR | SLAVE ECU 108 | | SLAVE ECU 110 | | SLAVE ECU 112 | | SLAVE ECU 115 | ON |
| | SLAVE ECU 109 | | SLAVE ECU 111 | | SLAVE ECU 113 | | SLAVE ECU 116 | ON |
| | SLAVE ECU 118 | | | | SLAVE ECU 114 | | | |
| 3RD COM GR | SLAVE ECU 108 | | SLAVE ECU 110 | | SLAVE ECU 112 | | SLAVE ECU 115 | |
| | SLAVE ECU 109 | | SLAVE ECU 111 | | SLAVE ECU 113 | | SLAVE ECU 116 | |
| | SLAVE ECU 118 | | | | SLAVE ECU 114 | | | |
| ⋮ | ⋮ | | ⋮ | | ⋮ | | ⋮ | |

CENTRAL ECU
CONT U
151
161
CPU
162
ROM
163
RAM
158
MEM
165
ACT TAB
167
DIAG MASK TAB
101
152
COM U
153
COM U
154
COM U
155
COM U
156
COM U
157
COM U
143
144
145
146
142
141
102
172
COM U
173
ELE FUSE
123
174
ELE FUSE
124
121
171
CONT CIRCUIT
UP STREAM POW SUP DISTRIB U
103
182
COM U
183
ELE FUSE
125
184
ELE FUSE
126
122
181
CONT CIRCUIT
UP STREAM POW SUP DISTRIB U

| EVENT | ACT GR |
| --- | --- |
| 1ST EVENT | 3RD COM GR |
| 2ND EVENT | 2ND COM GR |
| 3RD EVENT | 1ST COM GR |
| ... | ... |

205

| ACT GR | ZONE ECU 104 | |
| --- | --- | --- |
| 1ST COM GR | SLAVE ECU 108 | ON |
| | SLAVE ECU 109 | ON |
| | SLAVE ECU 118 | ON |
| 2ND COM GR | SLAVE ECU 108 | ON |
| | SLAVE ECU 109 | ON |
| | SLAVE ECU 118 | ON |
| 3RD COM GR | SLAVE ECU 108 | ON |
| | SLAVE ECU 109 | OFF |
| | SLAVE ECU 118 | ON |
| ... | ... | |

225

| ACT GR | ZONE ECU 105 | |
| --- | --- | --- |
| 1ST COM GR | SLAVE ECU 110 | ON |
| | SLAVE ECU 111 | ON |
| | | |
| 2ND COM GR | SLAVE ECU 110 | OFF |
| | SLAVE ECU 111 | OFF |
| | | |
| 3RD COM GR | SLAVE ECU 110 | OFF |
| | SLAVE ECU 111 | ON |
| | | |
| ... | ... | |

Figure 30:
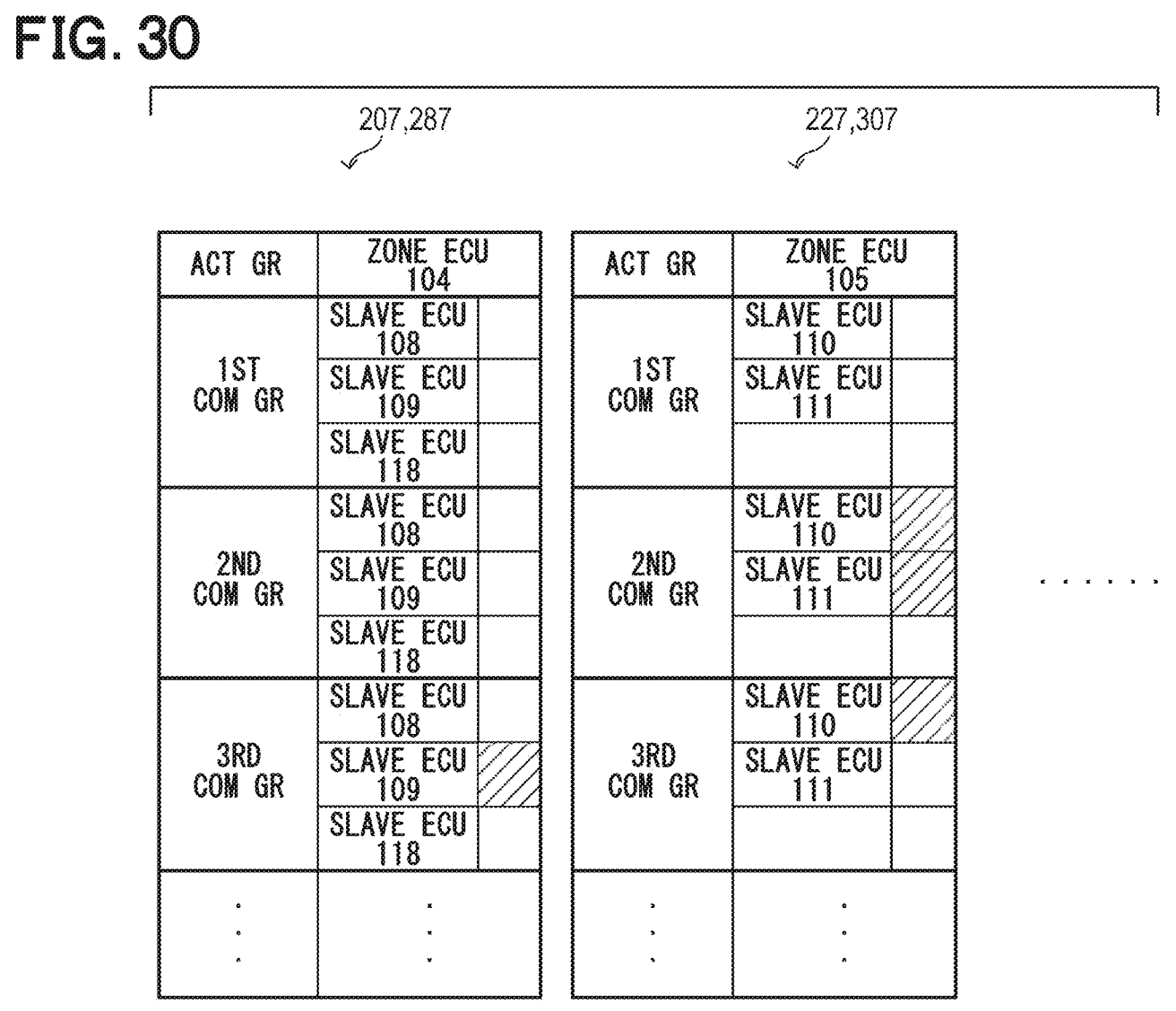

| ACT GR | ZONE ECU 104 | |
|---|---|---|
| 1ST COM GR | SLAVE ECU 108 | |
| | SLAVE ECU 109 | |
| | SLAVE ECU 118 | |
| 2ND COM GR | SLAVE ECU 108 | |
| | SLAVE ECU 109 | |
| | SLAVE ECU 118 | |
| 3RD COM GR | SLAVE ECU 108 | |
| | SLAVE ECU 109 | |
| | SLAVE ECU 118 | |
| ⋮ | ⋮ | |

| ACT GR | ZONE ECU 105 | |
|---|---|---|
| 1ST COM GR | SLAVE ECU 110 | |
| | SLAVE ECU 111 | |
| | | |
| 2ND COM GR | SLAVE ECU 110 | |
| | SLAVE ECU 111 | |
| | | |
| 3RD COM GR | SLAVE ECU 110 | |
| | SLAVE ECU 111 | |
| | | |
| ⋮ | ⋮ | |

......

CENTRAL ECU
151
CONT U
161
CPU
162
ROM
163
RAM
158
MEM
165
ACT TAB
101
152
COM U
153
COM U
154
COM U
155
COM U
156
COM U
157
COM U
143
144
145
146
142
141
102
172
COM U
173
ELE FUSE
123
171
121
174
ELE FUSE
124
CONT CIRCUIT
UP STREAM POW SUP DISTRIB U
103
182
COM U
183
ELE FUSE
125
181
122
184
ELE FUSE
126
CONT CIRCUIT
UP STREAM POW SUP DISTRIB U

COMMUNICATION SYSTEM

CROSS REFERENCE TO RELATED APPLICATION

The present application claims the benefit of priority from Japanese Patent Applications No. 2023-140005 filed on Aug. 30, 2023 and No. 2024-129825 filed on Aug. 6, 2024. The entire disclosure of the above application is incorporated herein by reference.

TECHNICAL FIELD

The present disclosure relates to a communication system including a plurality of electronic control devices.

BACKGROUND ART

A conceivable technique teaches discloses an in-vehicle network system that includes a power source relay for switching individually on and off a power source of each of a plurality of electronic control devices, determines a control content for switching the power source of a specific electronic control device between an on state and an off state in the specific electronic control device corresponding to a scene which is determined based on a situation of the vehicle, and switches the on state and the off state of the power source to supply an electric power to the specific electronic control device using the power source relay.

SUMMARY OF INVENTION

According to an example, a first device receives an electric power from a battery via an electronic fuse. A second device is connected to the first device to transmit and receive a frame. A third device controls the operation of the electronic fuse. The first and second devices store a diagnosis mask table. The diagnosis mask table defines, for each of communication groups, one or more combinations of a device whose electric power supply via the electronic fuse is cut off, a device which enters a sleep state, and a communication frame that is not received. The third device determines an activation group based on acquired activation trigger information. The third device transmits the communication frame indicating the determined activation group to the first and second devices.

BRIEF DESCRIPTION OF THE DRAWINGS

The above and other objects, features and advantages of the present disclosure will become more apparent from the following detailed description made with reference to the accompanying drawings. In the drawings:

FIG. 7 is a diagram showing the configuration of a activation table and a diagnosis mask table;

FIG. 9 is a diagram showing a correspondence relationship between a control target and a cluster;

FIG. 15 is a diagram showing the configuration of an activation table according to the fourth embodiment;

FIG. 16 is a diagram showing the configuration of a diagnosis mask table according to the fourth embodiment;

FIG. 27 is a diagram showing the configuration of an activation table according to the sixth embodiment;

FIG. 30 is a diagram showing the configuration of a diagnosis mask table according to the sixth embodiment;

DETAILED DESCRIPTION

Figure 1:
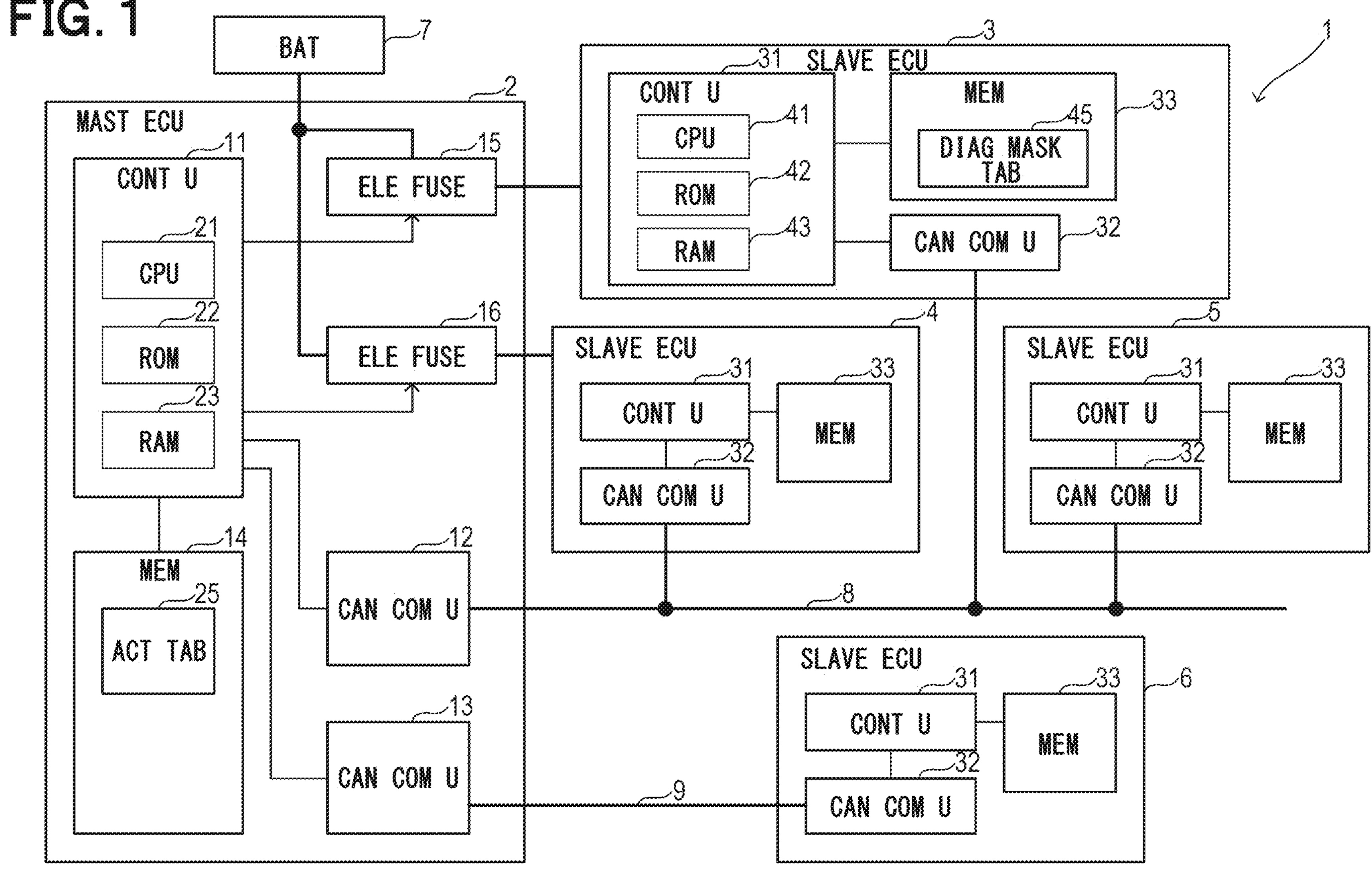
FIG. 1 is a block diagram illustrating the configuration of a communication system according to a first embodiment.

As a result of detailed study by the inventors, in a communication system that includes a plurality of electronic control devices and is configured to switch a power source of the plurality of electronic control devices, a difficulty is found such that an anomaly due to communication interruption may be erroneously detected and the detection accuracy of the anomaly may be decreased.

The present embodiments are to provide a communication system in which a detection accuracy of anomaly is improved.

One aspect of the present embodiments is a communication system including a plurality of electronic control devices connected to each other so as to be able to transmit and receive a communication frame. Each of the plurality of electronic control devices belongs to at least one of a plurality of communication groups. The communication system is configured such that one or more electronic control devices belonging to one of the communication groups can be switched as a whole between a wake-up state and a sleep state for each of the communication groups individually.

The plurality of electronic control devices include a first control device, a second control device, and a third control device. The first control device receives an electric power from a power source via a power supply switching unit configured to switch between a conduction state in which the power supply path is made conductive and a cutoff state in which the power supply path is cut off.

The second control device is connected to the first control device so as to be able to transmit and receive a communication frame. The third control device is connected to the first control device and the second control device so as to be able to transmit and receive a communication frame, and is configured to control the operation of the power supply switching unit.

The first control device and the second control device store a diagnosis mask table. The diagnosis mask table defines one or more activation stop combinations in a communication group among a cutoff device that is an electronic control device that cuts off the electric power supply via the electric power supply switching unit, a sleep device that is an electronic control device that enters a sleep state, and not-received frame identification information that is identification information of a communication frame that is not received. In other words, the not-received frame is a communication frame that is not to be transmitted from the electronic control device (that is, the cutoff device or the sleep device) due to the electric power supply being cut off or the transition to a sleep state.

The third control device includes a group determination unit and an activation group transmission unit. The group determination unit is configured to, upon acquiring activation trigger information for determining an activation group, which is a communication group to be brought into a wake-up state, determine the activation group based on the acquired activation trigger information. The group determination unit may determine a service to be started based on the activation trigger information, and determine an activation group corresponding to the service.

The activation group transmission unit is configured to transmit a management frame, which is a communication frame indicating the activation group determined by the group determination unit, to the first control device and the second control device.

In the communication system of the present embodiments configured in the above feature, the second control device can recognize the above described combination between the cutoff device and the not-received frame identification information and the above described combination between the sleep device and the not-received frame identification information by referring to the diagnosis mask table based on the activation group indicated by the management frame received from the third control device. Therefore, even if the second control device cannot receive the communication frame from the first control device since the electric power supply in the first control device via the electric power supply switching unit is cut off, the second control device can suppress the occurrence of the situation in which the first control device determines that an anomaly of the communication interruption has occurred. Furthermore, even if the second control device cannot receive a communication frame from the first control device that is in a sleep state, the second control device can suppress the occurrence of a situation in which the first control device determines that an anomaly of the communication interruption has occurred. Thereby, the communication system of the present disclosure can improve a detection accuracy of anomaly.

Another aspect of the present embodiments is a communication system including a plurality of electronic control devices connected to each other so as to be able to transmit and receive a communication frame. Each of the plurality of electronic control devices belongs to at least one of a plurality of communication groups. The communication system is configured such that one or more electronic control devices belonging to one of the communication groups can be switched as a whole between a wake-up state and a sleep state for each of the communication groups individually.

The plurality of electronic control devices include a first control device, a second control device, and a third control device. The third control device stores a diagnosis mask table.

The diagnosis mask table defines one or more activation stop combinations in a communication group among a cutoff device that is an electronic control device that cuts off the electric power supply via the electric power supply switching unit, a sleep device that is an electronic control device that enters a sleep state, and not-received frame identification information that is identification information of a communication frame that is not received.

The third control device includes a group determination unit and a sleep mask information transmission unit. The group determination unit is configured to, upon acquiring activation trigger information for determining an activation group, which is a communication group to be brought into a wake-up state, determine the activation group based on the acquired activation trigger information.

The sleep mask information transmission unit is configured to transmit the activation stop combination corresponding to the activation group determined by the group determination unit to the first control device and the second control device as diagnostic mask information.

In the communication system of the present disclosure configured in the above feature, the second control device can recognize the above described combination between the cutoff device and the not-received frame identification information and the above described combination between the sleep device and the not-received frame identification information based on the diagnosis mask information received from the third control device. Therefore, even if the second control device cannot receive the communication frame from the first control device since the electric power supply in the first control device via the electric power supply switching unit is cut off, the second control device can suppress the occurrence of the situation in which the first control device determines that an anomaly of the communication interruption has occurred. Furthermore, even if the second control device cannot receive a communication frame from the first control device that is in a sleep state, the second control device can suppress the occurrence of a situation in which the first control device determines that an anomaly of the communication interruption has occurred. Thereby, the communication system of the present disclosure can improve a detection accuracy of anomaly.

Another aspect of the present embodiments is a communication system including a plurality of electronic control devices connected to each other so as to be able to transmit and receive a communication frame. Each of the plurality of electronic control devices belongs to at least one of a plurality of communication groups. The communication system is configured such that one or more electronic control devices belonging to one of the communication groups can be switched as a whole between a wake-up state and a sleep state for each of the communication groups individually.

The plurality of electronic control devices include a first slave control device, a second slave control device, a zone control device, and a central control device. The first slave control device receives an electric power from a power source via a power supply switching unit configured to switch between a conduction state in which the power supply path is made conductive and a cutoff state in which the power supply path is cut off.

The second slave control device is connected to the first slave control device so as to be able to transmit and receive communication frames to and from the first slave control device. The zone control device is connected to the first slave control device and the second slave control device so as to be able to transmit and receive communication frames therebetween, and is configured to control the operation of the electric power supply switching unit.

The central control device is connected to the zone control device so as to be able to transmit and receive communication frames therebetween. The zone control device, the first slave control device and the second slave control device store a diagnosis mask table. The diagnosis mask table defines one or more activation stop combinations in a communication group among a cutoff device that is an electronic control device that cuts off the electric power supply via the electric power supply switching unit, a sleep device that is an electronic control device that enters a sleep state, and not-received frame identification information that is identification information of a communication frame that is not received.

The central control device includes a group determination unit and an activation group transmission unit. The group determination unit is configured to, upon acquiring activation trigger information for determining an activation group, which is a communication group to be brought into a wake-up state, determine the activation group based on the acquired activation trigger information.

The activation group transmission unit is configured to transmit a management frame, which is a communication frame indicating the activation group determined by the group determination unit, to the zone control device. The zone control device includes a frame transfer unit.

The frame transfer unit is configured to transfer the management frame received from the central control device to the first slave control device and the second slave control device.

In the communication system of the present embodiments configured in the above feature, the second slave control device can recognize the above described combination between the cutoff device and the not-received frame identification information and the above described combination between the sleep device and the not-received frame identification information by referring to the diagnosis mask table based on the activation group indicated by the management frame received from the zone control device. Therefore, even if the electric power supply to the first slave control device via the power supply switching unit is cut off and the second slave control device is unable to receive communication frames from the first slave control device, the second slave control device can restrict the occurrence of a situation in which it is determined that an anomaly of the communication interruption has occurred in the first slave control device. Furthermore, even if the second slave control device cannot receive a communication frame from the first slave control device that is in a sleep state, the second slave control device can suppress the occurrence of a situation in which it is determined that an anomaly of the communication interruption has occurred in the first slave control device. Thereby, the communication system of the present disclosure can improve a detection accuracy of anomaly.

Another aspect of the present embodiments is a communication system including a plurality of electronic control devices connected to each other so as to be able to transmit and receive a communication frame. The plurality of electronic control devices include a first slave control device, a second slave control device, a zone control device, and a central control device.

The central control device stores a diagnostic mask table. The diagnosis mask table defines one or more activation stop combinations in a communication group among a cutoff device that is an electronic control device that cuts off the electric power supply via the electric power supply switching unit, a sleep device that is an electronic control device that enters a sleep state, and not-received frame identification information that is identification information of a communication frame that is not received.

The central control device includes a group determination unit and a sleep mask information transmission unit. The group determination unit is configured to, upon acquiring activation trigger information for determining an activation group, which is a communication group to be brought into a wake-up state, determine the activation group based on the acquired activation trigger information.

The sleep mask information transmission unit is configured to transmit the activation stop combination corresponding to the activation group determined by the group determination unit to the zone control device as diagnosis mask information.

The zone control device includes a mask information transfer unit. The mask information transfer unit is configured to transfer the diagnosis mask information received from the central control device to the first slave control device and the second slave control device.

In the communication system of the present embodiments configured in the above feature, the second slave control device can recognize the above described combination between the cutoff device and the not-received frame identification information and the above described combination between the sleep device and the not-received frame identification information based on the diagnosis mask information received from the zone control device. Therefore, even if the electric power supply to the first slave control device via the power supply switching unit is cut off and the second slave control device is unable to receive communication frames from the first slave control device, the second slave control device can restrict the occurrence of a situation in which it is determined that an anomaly of the communication interruption has occurred in the first slave control device. Furthermore, even if the second slave control device cannot receive a communication frame from the first slave control device that is in a sleep state, the second slave control device can suppress the occurrence of a situation in which it is determined that an anomaly of the communication interruption has occurred in the first slave control device. Thereby, the communication system of the present disclosure can improve a detection accuracy of anomaly.

Another aspect of the present embodiments is a communication system including a plurality of electronic control devices connected to each other so as to be able to transmit and receive a communication frame. The plurality of electronic control devices include a first slave control device, a second slave control device, a zone control device, and a central control device.

The zone control device, the first slave control device and the second slave control device store a diagnosis mask table. The diagnosis mask table has one or more activation stop combinations set for the first slave control device and the second slave control device that are under control of the zone control device, and the activation stop combinations are combinations of a communication group, a cut-off device which is an electronic control device to which the electric power supply via the power supply switching unit is to be cut off, a sleep device which is an electronic control device that is to be into a sleep state, and non-received frame identification information which is identification information for communication frames that are not received.

The central control device includes a group determination unit and an activation group transmission unit. The group determination unit is configured to, upon acquiring activation trigger information for determining an activation group, which is a communication group to be brought into a wake-up state, determine the activation group based on the acquired activation trigger information.

The activation group transmission unit is configured to transmit a management frame, which is a communication frame indicating the activation group determined by the group determination unit, to the zone control device. The zone control device includes a frame transfer unit.

The frame transfer unit is configured to transfer the management frame received from the central control device to the first slave control device and the second slave control device.

In the communication system of the present embodiments configured in the above feature, the second slave control device can recognize the above described combination between the cutoff device and the not-received frame identification information and the above described combination between the sleep device and the not-received frame identification information by referring to the diagnosis mask table based on the activation group indicated by the management frame received from the zone control device. Therefore, even if the electric power supply to the first slave control device via the power supply switching unit is cut off and the second slave control device is unable to receive communication frames from the first slave control device, the second slave control device can restrict the occurrence of a situation in which it is determined that an anomaly of the communication interruption has occurred in the first slave control device. Furthermore, even if the second slave control device cannot receive a communication frame from the first slave control device that is in a sleep state, the second slave control device can suppress the occurrence of a situation in which it is determined that an anomaly of the communication interruption has occurred in the first slave control device. Thereby, the communication system of the present disclosure can improve a detection accuracy of anomaly.

Another aspect of the present embodiments is a communication system including a plurality of electronic control devices connected to each other so as to be able to transmit and receive a communication frame. The plurality of electronic control devices include a first slave control device, a second slave control device, a zone control device, and a central control device.

Another aspect of the present embodiments is a communication system including a plurality of electronic control devices connected to each other so as to be able to transmit and receive a communication frame. The plurality of electronic control devices include a first slave control device, a second slave control device, a zone control device, and a central control device.

The zone control device stores a diagnosis mask table. The diagnosis mask table has one or more activation stop combinations set for the first slave control device and the second slave control device that are under control of the zone control device, and the activation stop combinations are combinations of a communication group, a cut-off device which is an electronic control device to which the electric power supply via the power supply switching unit is to be cut off, a sleep device which is an electronic control device that is to be into a sleep state, and non-received frame identification information which is identification information for communication frames that are not received.

The central control device includes a group determination unit and an activation group transmission unit. The group determination unit is configured to, upon acquiring activation trigger information for determining an activation group, which is a communication group to be brought into a wake-up state, determine the activation group based on the acquired activation trigger information.

The activation group transmission unit is configured to transmit a management frame, which is a communication frame indicating the activation group determined by the group determination unit, to the zone control device. The zone control device includes a sleep mask information transmission unit.

The sleep mask information transmission unit is configured to transmit, as diagnosis mask information, to the first slave control device and the second slave control device, an activation stop combination corresponding to an activation group indicated by a management frame received from the central control device.

In the communication system of the present embodiments configured in the above feature, the second slave control device can recognize the above described combination between the cutoff device and the not-received frame identification information and the above described combination between the sleep device and the not-received frame identification information based on the diagnosis mask information received from the zone control device. Therefore, even if the electric power supply to the first slave control device via the power supply switching unit is cut off and the second slave control device is unable to receive communication frames from the first slave control device, the second slave control device can restrict the occurrence of a situation in which it is determined that an anomaly of the communication interruption has occurred in the first slave control device. Furthermore, even if the second slave control device cannot receive a communication frame from the first slave control device that is in a sleep state, the second slave control device can suppress the occurrence of a situation in which it is determined that an anomaly of the communication interruption has occurred in the first slave control device.

First Embodiment

Hereinafter, a first embodiment according to the present disclosure will be described with reference to the drawings. The communication system 1 of the present embodiment is mounted on a vehicle, and includes a master ECU 2, slave ECUs 3, 4, 5, and 6, and a battery 7, as shown in FIG. 1. ECU is an abbreviation for Electronic Control Unit. Hereinafter, the master ECU 2 and the slave ECUs 3, 4, 5, and 6 will be collectively referred to as nodes.

The master ECU 2 and the slave ECUs 3, 4, and 5 are connected to each other via a communication bus 8 so as to be capable of data communication. The master ECU 2 and the slave ECU 6 are connected to each other via a communication bus 9 so as to be capable of data communication.

The battery 7 supplies electric power to various parts of the vehicle at a DC battery voltage (for example, 12V). The master ECU 2 and the slave ECUs 3 to 6 operate by receiving the electric power from the battery 7.

The master ECU 2 includes a control unit 11, CAN communication units 12 and 13, a storage unit 14, and electronic fuses 15 and 16. The CAN is an abbreviation for Controller Area Network.

The controller 11 is an electronic control unit mainly including a microcomputer with a CPU 21, a ROM 22, a RAM 23, and the like. Various functions of the microcomputer are implemented by the CPU 21 executing a program stored in a non-transitory tangible storage medium. In this example, the ROM 22 corresponds to the non-transitory tangible storage medium in which the program is stored. A method corresponding to the program is executed by executing the program. A part or all of the functions to be executed by the CPU 21 may be configured in hardware by one or multiple ICs or the like. The number of microcomputers included in the control unit 11 may be one or more.

The CAN communication unit 12 communicates with the slave ECUs 3, 4, and 5 connected to the communication bus 8 by transmitting and receiving a communication frame based on the CAN communication protocol. The CAN communication unit 13 communicates with the slave ECU 6 connected to the communication bus 9 by transmitting and receiving a communication frame based on the CAN communication protocol. Hereinafter, the CAN communication frame will be referred to as a CAN frame.

The storage unit 14 is a storage device for storing various data. The storage unit 14 stores an activation table 25, which will be described later. The electronic fuse 15 is arranged on the electric power supply path between the battery 7 and the slave ECU 3. The electronic fuse 16 is arranged on the electric power supply path between the battery 7 and the slave ECU 4.

The electronic fuses 15 and 16 include a switching element (for example, a MOSFET) and a control circuit. The control circuit for the electronic fuses 15 and 16 is configured to cut off the electric power supply path by switching the switching element from the on state to the off state when the current value flowing through the electric power supply path exceeds a preset overcurrent determination value.

The control circuits of the electronic fuses 15 and 16 are configured to conduct or cut off the electric power supply path by switching the switching element to be in the on state or the off state in accordance with a command from the control unit 11.

The slave ECUs 3 to 6 include a control unit 31, a CAN communication unit 32, and a storage unit 33. The control unit 31 is an electronic control device mainly including a microcomputer with a CPU 41, a ROM 42, a RAM 43, and the like. Various functions of the microcomputer are implemented by the CPU 41 executing programs stored in a non-transitory tangible storage medium. In this example, the ROM 42 corresponds to the non-transitory tangible storage medium in which the programs are stored. A method corresponding to the program is executed by executing the program. Here, a part or all of the functions to be executed by the CPU 41 may be configured as hardware circuitry by one or multiple ICs or the like. Alternatively, the number of the microcomputers constituting the control unit 31 may be one or more.

The CAN communication units 32 of the slave ECUs 3 to 5 communicate with communication devices (that is, the master ECU 2 and the slave ECUs 3 to 5) connected to the communication bus 8 based on the CAN communication protocol.

The CAN communication unit 32 of the slave ECU 6 communicates with a communication device (that is, the master ECU 2) connected to the communication bus 9 based on a CAN communication protocol. The storage unit 33 is a storage device for storing various data. The storage unit 33 stores a diagnosis mask table 45, which will be described later.

A CAN frame includes a start-of-frame, an arbitration field, a control field, a data field, a CRC field, an ACK field and an end-of-frame. The arbitration field includes an 11-bit or 29-bit identifier (that is, ID) and a 1-bit RTR bit.

Here, the 11-bit identifier used in the CAN communication is referred as CAN ID. The CAN ID is preliminarily set based on the content of data included in the CAN frame, the transmission source of the CAN frame, the destination of the CAN frame, and the like.

The data field is a payload including first data, second data, third data, fourth data, fifth data, sixth data, seventh data, and eighth data each of which is 8 bits (that is, one byte).

The communication system 1 forms a partial network, which is an electric power supply control method based on communication control of the CAN protocol standard defined in ISO11898-6. For this reason, the communication system 1 individually transitions one or more nodes belonging to a communication group to a wake-up state (i.e., an activation state) or a sleep state (i.e., a dormant state) for each communication group, which will be described later, so that this feature achieves low electric power consumption. By waking up, a node enters a normal operation state in which the functions assigned to the node are available without restriction, and by sleeping, a node enters a low electric power consumption operation state in which the available functions assigned to the node are restricted.

In the communication system 1, when waking up a node in a sleep state, an NM frame, which is a CAN frame including activation information for specifying an activation group, is used. NM is an abbreviation for Network Management.

Figures 2, 3:
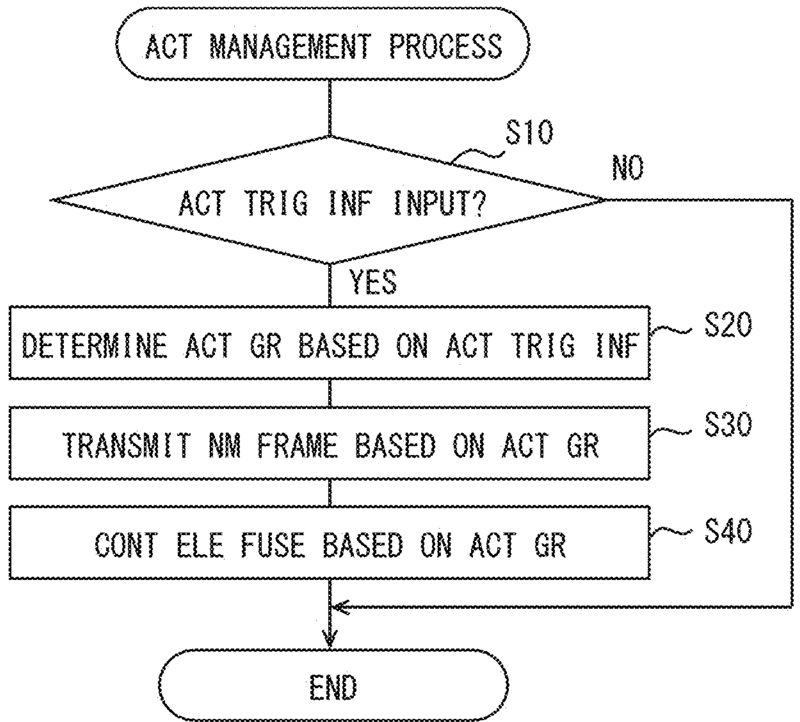
FIG. 2 is an explanatory diagram illustrating affiliation information and activation information.
FIG. 3 is a flowchart showing an activation management process according to the first embodiment.

The activation information is set as shown in FIG. 2, for example. DLC is an abbreviation for Data Length Code, and is an area that represents the size of a data field in a CAN frame in bytes. That is, the activation information is stored in the data field of the CAN frame. Here, in order to simplify the explanation, a case where the DLC is 1 byte (i.e., 8 bits) is shown. An activation group is associated with each bit of 8-bit data representing the activation information.

In the activation information set in the NM frame, a bit corresponding to the activation group as an activation target is set to 1. Each node (i.e., the master ECU 2 and the slave ECUs 3 to 6) stores affiliation information indicating the activation group to which the node belongs. The affiliation information has the same data length as the activation information, and the assignment of each bit of the affiliation information is also the same as that of the activation information. In the affiliation information, the bit corresponding to the activation group to which the node belongs is set to 1.

Each node determines whether or not the communication group to which the node belongs is a target for activation by comparing the activation information extracted from the NM frame and the affiliation information stored in the node.

For example, the affiliation information shown in FIG. 2 indicates that the node belongs to the first communication group, the third communication group, and the fifth communication group. The activation information shown in FIG. 2 indicates that the second communication group, the third communication group, the fourth communication group, and the fifth communication group are activated. Since the third communication group and the fifth communication group are included in both the affiliation information and the activation information shown in FIG. 2, the node determines that the node is the activation target with respect to the third communication group and the fifth communication group.

The activation trigger information includes multiple NM frames and multiple event occurrence information items. The event occurrence information is information indicating that a preset event has occurred. For example, when the slave ECU 6 is a door control ECU, and the door switch is in the on state, the slave ECU 6 transmits the information indicating that the door has been opened (hereinafter referred to as a door open event) as the event occurrence information to the ECU 2.

In the activation table 25 shown in FIG. 1, a communication group (that is, the activation group) to be activated is set for each event, as shown in FIG. 7. In the activation table 25, for example, the first communication group is set as the activation group with respect to a door open event.

The activation table 25 further includes a correspondence relationship between the activation group and an electronic fuse to be turned on (hereinafter referred to as a conduction fuse).

The activation table 25 is set such that, for example, when the activation group is the first communication group, the conduction fuse is the electronic fuse 15. The activation table 25 is set such that, for example, when the activation group is the second communication group, the conduction fuses are the electronic fuses 15 and 16. The activation table 25 is set such that, for example, when the activation group is the third communication group, the conduction fuse is the electronic fuse 16. The activation table 25 is set such that, for example, when the activation group is the fourth communication group, there is no conduction fuse.

Next, the procedure of the activation management process executed by the control unit 11 of the master ECU 2 will be described. The activation management process is a process that is repeatedly executed while the master ECU 2 is activated.

When the activation management process is executed, as shown in FIG. 3, the CPU 21 of the control unit 11 determines whether activation trigger information (i.e., NM frame or event occurrence information) has been input to the master ECU 2 in S10.

Here, if the activation trigger information has not been input, the CPU 21 ends the activation management process. On the other hand, if the activation trigger information is input, the CPU 21 determines the activation group based on the input activation trigger information in S20. Specifically, when the activation trigger information is an NM frame, the CPU 21 determines that the communication group corresponding to the bit set to 1 in the input NM frame is the activation group. Further, when the activation trigger information is the event occurrence information, the CPU 21 determines the activation group based on the event indicated by the event occurrence information by referring to the activation table 25. For example, when the event occurrence information is the door open event described above, the CPU 21 determines that the activation group is the first communication group.

In S30, the CPU 21 starts transmitting an NM frame indicating the activation group determined in S20. For example, when the CPU 21 determines that the activation groups are the first communication group and the third communication group, the CPU 21 transmits an NM frame in which the bit corresponding to the first communication group and the third communication group is set to 1. After starting the transmission of the NM frame in S30, the CPU 21 periodically transmits the same NM frame thereafter.

In S40, by referring to the activation table 25, the CPU 21 executes the electronic fuse control for turning on the electronic fuse corresponding to the activation group determined in S20, and turning off the electronic fuses other than the electronic fuse corresponding to the activation group, and then, ends the activation management process.

In addition, when there are multiple activation groups, the CPU 21 turns on the electronic fuses corresponding to the multiple activation groups using OR (i.e., logical sum), and the CPU 21 turns off the electronic fuses other than the electronic fuses corresponding to the multiple activation groups using AND (i.e., logical product). Even if multiple events occur and an NM frame is generated in which the first, third, and fifth communication groups are the activation groups, and another NM frame is generated in which the first, fourth, and sixth communication groups are the activation groups, the CPU 21 refers to both NM frames and turns off the electronic fuses other than those fuses corresponding to the multiple activation groups by the logical AND (i.e., logical product).

Next, the procedure of the diagnostic mask process executed by the control unit 31 of the slave ECUs 3 to 6 will be described. The diagnostic mask process is a process that is repeatedly executed while the slave ECUs 3 to 6 are activated.

Figure 4:
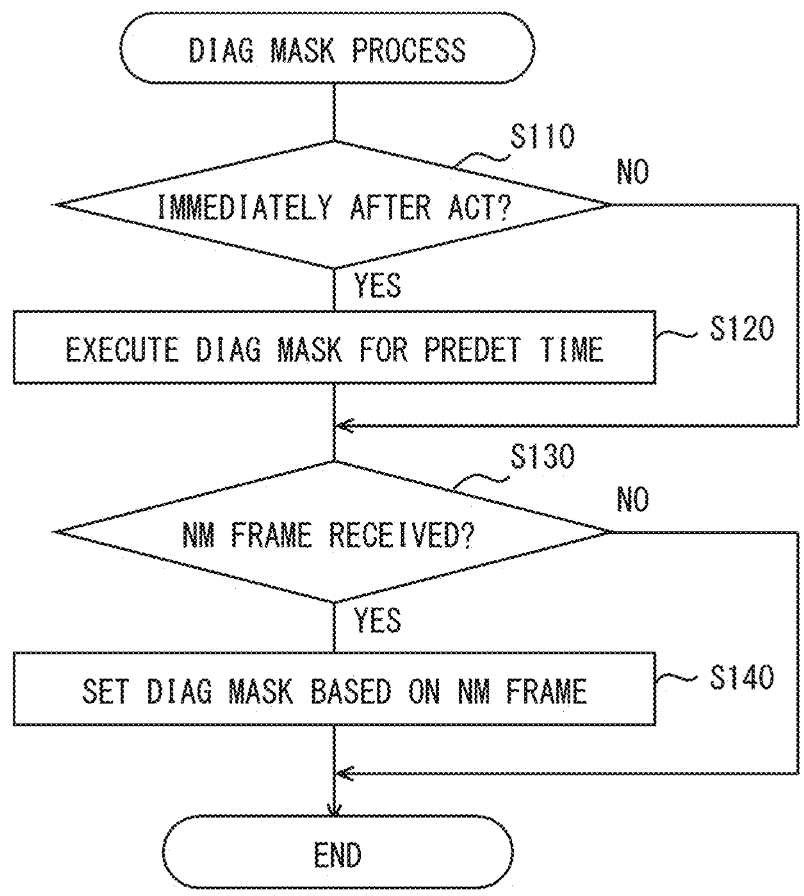
FIG. 4 is a flowchart showing a diagnostic mask process.

When the diagnostic mask process is executed, the CPU 41 of the control unit 31 determines in S110 whether or not the node has just been activated, as shown in FIG. 4. Here, if the node has not just been activated, the CPU 41 proceeds to S130. On the other hand, if the node has just been activated, the CPU 41 executes a diagnostic mask on the master ECU 2 and the slave ECUs 3 to 6 for a preset period of time in S120, and proceeds to S130. The diagnosis mask is a process for suppressing the ECU as a target from treating the target ECU as an anomaly ECU even if it is determined that the CAN frame cannot be received from the target ECU and the communication has been interrupted. Here, the communication interruption diagnosis may not be stored even if it is determined as the diagnosis mask such that the communication has been interrupted.

When proceeding to S130, the CPU 41 determines whether or not an NM frame has been received. Here, if the NM frame has not been received, the CPU 41 ends the diagnostic mask process.

On the other hand, when an NM frame is received, the CPU 41 sets a diagnostic mask based on the received NM frame by referring to the diagnostic mask table 45 in S140, and ends the diagnostic mask process. As shown in FIG. 7, the diagnosis mask table 45 defines, for each activation group, sets a CAN ID of the CAN frame that is not received (hereinafter referred to as a non-redeived frame ID) in association with the ECU whose electric power supply via the electronic fuse is cut off (hereinafter referred to as a cut-off device) and the ECU which enter a sleep state (hereinafter referred to as a sleep device). The not-received frame ID is a CAN frame that will no longer be transmitted from the cut-off device and the sleep device, and is a CAN frame that the reception side ECU will no longer be able to receive. Therefore, in the diagnosis mask table 45 sets one or more combinations of a cutoff device and a non-redeived frame ID and one or more combinations of a sleep device and a non-redeived frame ID for one activation group.

The diagnosis mask table 45 sets, for example, a combination of the slave ECU 4 and the first CANID and a combination of the slave ECU 5 and the second CANID for the first communication group. The diagnosis mask table 45 sets, for example, a combination of the slave ECU 6 and the third CAN ID for the second communication group.

By setting the diagnostic mask, the CPU 41 can suppress the target ECU from treating the target ECU as an anomaly ECU even if it is determined that the communication of the cut-off device and the sleep device has been interrupted. For example, when a diagnostic mask is set for the first communication group, the CPU 41 does not treat the first communication group as the anomaly even if the CAN frame of the first CAN ID cannot be received from the slave ECU 4. In addition, when the diagnostic mask is set for the first communication group, the CPU 41 does not treat the first communication group as the anomaly even if the CAN frame of the second CAN ID cannot be received from the slave ECU 5. When the activation information is changed from 0 to 1 in the NM frame, the CPU 41 cancels the setting of the diagnosis mask in the corresponding activation group.

Further, the master ECU 2 is configured to transmit the updated diagnosis mask table 45 to the slave ECUs 3 to 6 upon receiving the updated diagnosis mask table 45 from the diagnosis tester connected to the master ECU 2. Here, the master ECU 2 may acquire the updated diagnosis mask table 45 from the server via wireless communication. Thereby, the communication system 1 can execute an appropriate diagnosis mask process corresponding to a change in the configuration of the communication system 1.

The communication system 1 configured in this manner includes the master ECU 2 and the slave ECUs 3, 4, 5, and 6 that are connected to be able to transmit and receive the CAN frame. The master ECU 2 and the slave ECUs 3, 4, 5, and 6 each belong to at least one of a plurality of communication groups. The communication system 1 is configured such that one or more ECUs belonging to one of the communication groups can be switched as a whole between a wake-up state and a sleep state for each of the communication groups individually.

The slave ECU 3 receives the electric power from the battery 7 via the electronic fuse 15 that is configured to switch between a conduction state in which the electric power supply path is made conductive and a cutoff state in which the electric power supply path is cut off.

The slave ECU 5 is connected to the slave ECU 3 so as to be able to transmit and receive the CAN frame. The master ECU 2 is connected to the slave ECUs 3 and 5 so as to be able to transmit and receive the CAN frame, and is configured to control the operation of the electronic fuse 15.

The slave ECUs 3 and 5 store the diagnosis mask table 45. The diagnosis mask table 45 sets, for each communication group, one or more combinations (hereinafter referred to as an activation and stop combination) of the non-received CAN frame of the CAN ID (that is, the above-described non-received frame ID) and the ECU (i.e., the above-described cut-off device) to which the electric power supply via the electronic fuses 15 and 16 is cut off and the ECU (i.e., the above-described sleep device) that becomes the sleep state.

The master ECU 2 is configured to determine the activation group based on the acquired activation trigger information upon acquiring the activation trigger information for determining the communication group to be brought into the wake-up state (i.e., the activation group described above).

The master ECU 2 is configured to transmit a communication frame (namely, the above-described NM frame) indicating the determined activation group to the slave ECUs 3 and 5.

In such a communication system 1, the slave ECU 5 refers to the diagnosis mask table 45 based on the activation group indicated by the NM frame received from the master ECU 2, thereby recognizing the combination of the above-described cutoff device and the non-received frame ID, and the combination of the above-described sleep device and the non-received frame ID. Therefore, even if the slave ECU 5 is unable to receive a CAN frame from the slave ECU 3 because the electric power supply via the electronic fuse 15 is cut off to the ECU 3, the slave ECU 5 can suppress the occurrence of a situation in which it is determined that an anomaly due to the communication interruption has occurred in the slave ECU 3. Furthermore, even if the slave ECU 5 cannot receive a CAN frame from the slave ECU 3 that is in a sleep state, it is possible to suppress the occurrence of a situation in which it is determined that an anomaly due to the communication interruption has occurred in the slave ECU 3. Thereby, the communication system 1 can improve a detection accuracy of anomaly.

The activation trigger information also includes event occurrence information indicating that a preset event has occurred. The master ECU 2 includes an activation table 25 that associates one or more events with an activation group. The master ECU 2 is configured to determine the activation group by referring to the activation table 25 upon acquiring the event occurrence information. Such a communication system 1 can suppress the occurrence of the false detection of communication interruption anomaly even when an event occurs.

In the embodiment described above, the CAN frame corresponds to a communication frame, the master ECU 2 and the slave ECUs 3 to 6 correspond to a plurality of electronic control devices, the electronic fuse 15 corresponds to a power supply switching unit, and the battery 7 corresponds to a power source, and the slave ECU 3 corresponds to a first control device.

Moreover, the slave ECU 5 corresponds to the second control device, the master ECU 2 corresponds to the third control device, and the not-received frame ID corresponds to the not-received frame identification information. Furthermore, S20 corresponds to a process as the group determination unit, and S30 corresponds to a process as the activation group transmission unit.

Second Embodiment

Hereinafter, a second embodiment of the present disclosure will be described with reference to the drawings. In the second embodiment, portions different from those of the first embodiment will be described. The same reference numerals are given to common components.

Figure 5:
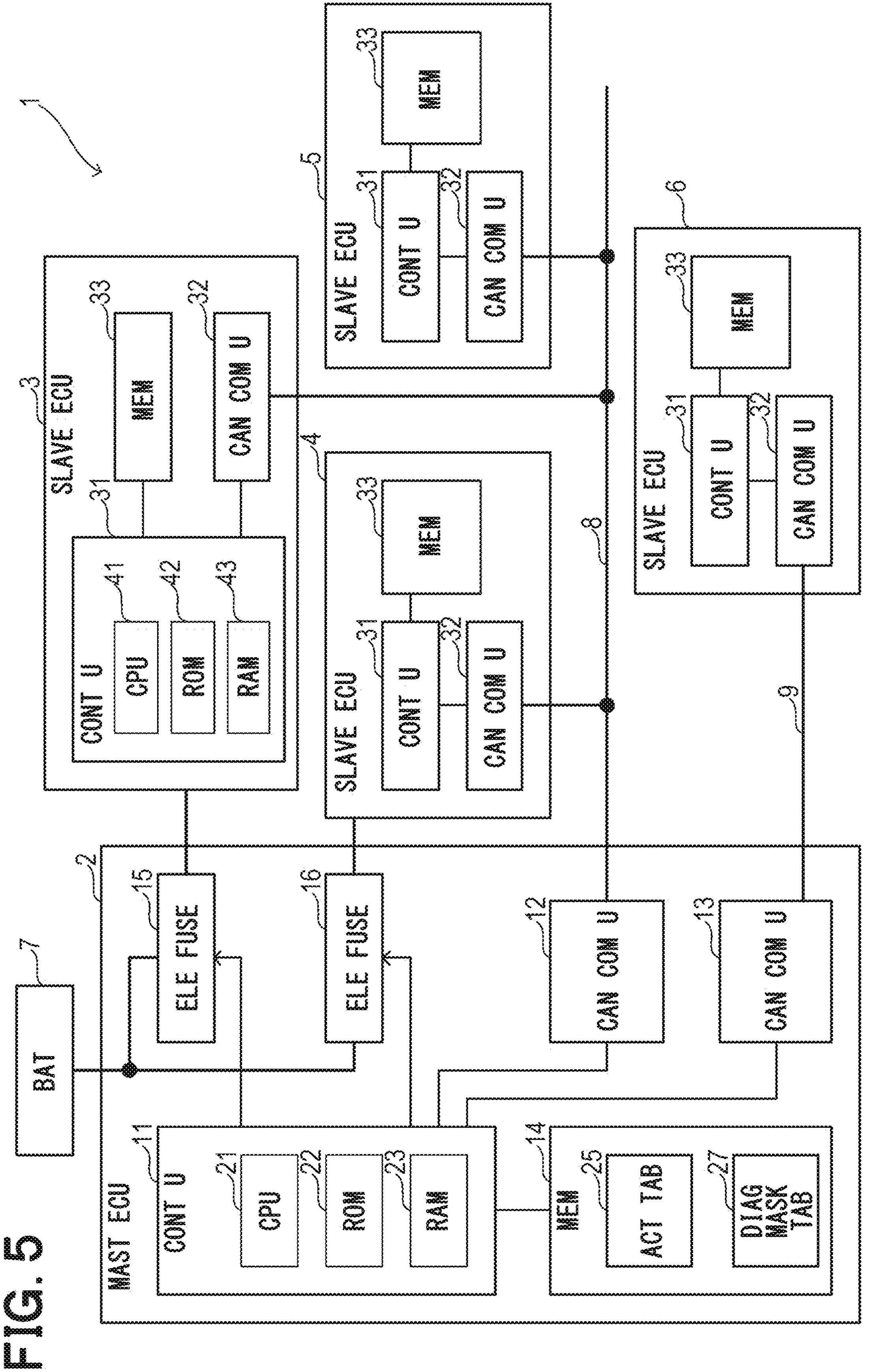
FIG. 5 is a block diagram illustrating the configuration of a communication system according to a second embodiment.

As shown in FIG. 5, the communication system 1 of the second embodiment differs from the first embodiment in that the diagnosis mask table 45 is omitted and the diagnosis mask table 27 is added.

The diagnosis mask table 27 is stored in the storage unit 14 of the master ECU 2. In the diagnosis mask table 27, like the diagnosis mask table 45, one or more combinations of the cut-off device, the sleep device, and the non-received frame ID (that is, the activation stop combination) are set for each activation group.

As shown in FIG. 7, the diagnosis mask table 27 further sets, for each of the electronic fuses 15 and 16, the CAN ID of the non-received CAN frame (i.e., the non-received frame ID) in association with the ECU that is supplied with the electric power from the battery 7 via the electronic fuses 15 and 16 (hereinafter referred to as an electric power supply ECU). Therefore, in the diagnosis mask table 27, one or more combinations of the electric power supply ECU and the non-received frame ID (hereinafter referred to as a fuse combination) are further set for one electronic fuse.

Figure 6:
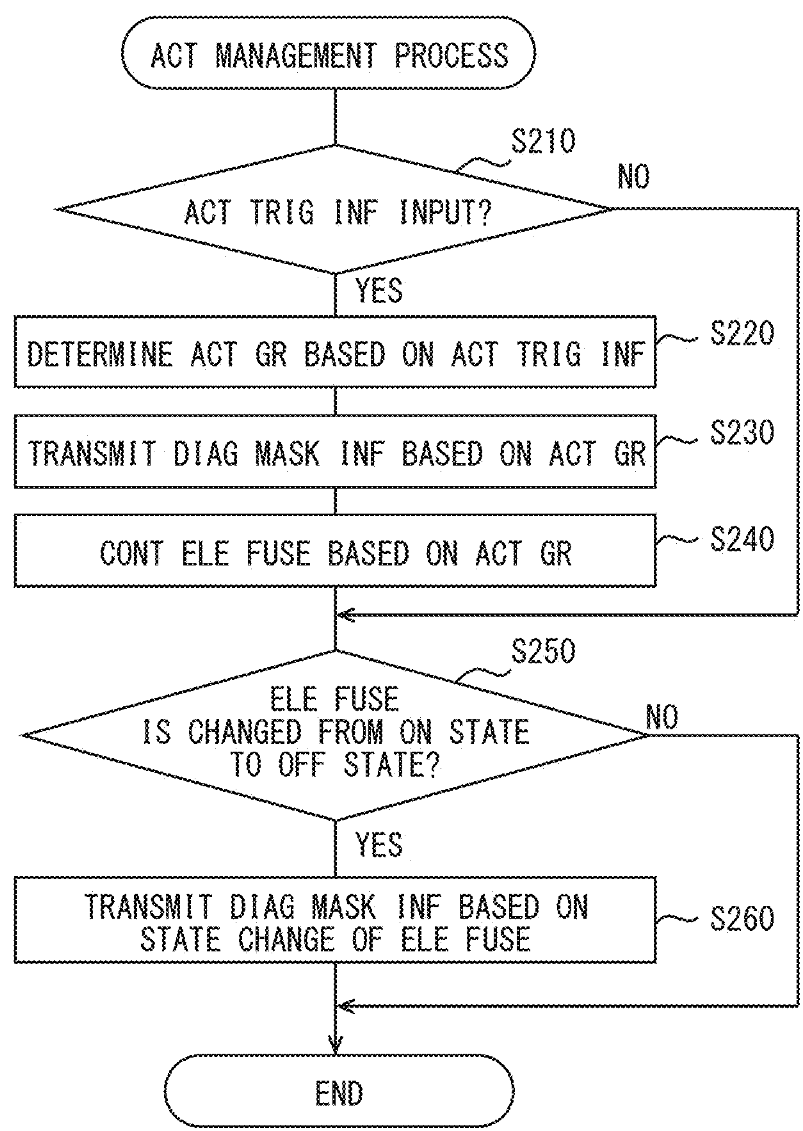
FIG. 6 is a flowchart showing an activation management process according to the second embodiment.

Next, the procedure of the activation management process executed by the control unit 11 of the master ECU 2 will be described. The activation management process is a process that is repeatedly executed while the master ECU 2 is activated. When the activation management process of the second embodiment is executed, the CPU 21 of the control unit 11 determines whether the activation trigger information has been input to the master ECU 2 in S210, similar to S10, as shown in FIG. 6.

Here, if the activation trigger information has not been input, the CPU 21 moves to S250. On the other hand, if the activation trigger information is input, the CPU 21 determines the activation group based on the input activation trigger information in S220, similar to S20.

In S230, the CPU 21 transmits the diagnostic mask information based on the activation group determined in S220. Specifically, the CPU 21 extracts the activation stop combination corresponding to the activation group determined in S220 from the diagnosis mask table 27, and transmits the extracted activation stop combination to the slave ECUs 3 to 6 as the diagnosis mask information.

For example, when determining that the activation group is the first communication group, the CPU 21 transmits the combination of the slave ECU 4 and the first CAN ID and the combination of the slave ECU 5 and the second CAN ID as the diagnostic mask information. For example, when the CPU 21 determines that the activation group is the second communication group, the CPU 21 transmits the combination of the slave ECU 6 and the third CAN ID as the diagnosis mask information.

Upon receiving the diagnostic mask information, the slave ECUs 3 to 6 set a diagnostic mask based on the received diagnostic mask information. As a result, for example, when the slave ECUs 3, 5, and 6 receive a combination of the slave ECU 4 and the first CAN ID as the diagnostic mask information, even if the CAN frame of the first CAN ID cannot be received from the slave ECU 4, the slave ECUs 3, 5, and 6 do not treat the first as the anomaly.

In S240 similar to S40, by referring to the activation table 25, the CPU 21 executes the electronic fuse control for turning on the electronic fuse corresponding to the activation group determined in S220, and turning off the electronic fuses other than the electronic fuse corresponding to the activation group, and then, proceeds to S250.

When proceeding to S250, the CPU 21 determines whether the electronic fuse 15 or the electronic fuse 16 has changed from the on state to the off state. Here, if the electronic fuse 15 and the electronic fuse 16 have not changed from the on state to the off state, the CPU 21 ends the activation management process.

On the other hand, when the electronic fuse 15 or 16 has changed from the on state to the off state, the CPU 21 refers to the diagnosis mask table 27 in S260, and transmits the diagnostic mask information based on the change in the state of the electronic fuse 15 or the electronic fuse 16, and then, end the activation management process. For example, when the electronic fuse 15 has changed from the on state to the off state, the CPU 21 extracts the non-received frame ID to which the electronic fuse 15 is associated as the electric power supply ECU from the diagnosis mask table 27, and transmits a combination of the extracted power supply EC and the non-received frame ID to the slave ECUs 3 to 6 as the diagnostic mask information.

The master ECU 2 of the communication system 1 configured in this manner stores the diagnosis mask table 27. In the diagnosis mask table 27, one or more combinations of the cutoff device, the sleep device, and the not-received frame ID (that is, the activation stop combinations) are set for each communication group.

When the master ECU 2 acquires the activation trigger information, the master ECU 2 is configured to determine the activation group based on the acquired activation trigger information. The master ECU 2 is configured to transmit the activation stop combination corresponding to the determined activation group to the slave ECUs 3 and 5 as the diagnostic mask information.

In such a communication system 1, the slave ECU 5 recognizes the combination of the cut-off device and the non-received frame ID, and the combination of the sleep device and the non-received frame ID, based on the diagnosis mask information received from the master ECU 2. Therefore, even if the master ECU 2 is unable to receive a CAN frame from the slave ECU 3 because the electric power supply via the electronic fuse 15 is cut off to the ECU 2, the slave ECU 5 can suppress the occurrence of a situation in which it is determined that an anomaly due to the communication interruption has occurred in the slave ECU 3. Furthermore, even if the slave ECU 5 cannot receive a CAN frame from the slave ECU 3 that is in a sleep state, it is possible to suppress the occurrence of a situation in which it is determined that an anomaly due to the communication interruption has occurred in the slave ECU 3. Thereby, the communication system 1 can improve a detection accuracy of anomaly.

Further, in the diagnosis mask table 27, one or more combinations of the slave ECU 3 to which the electric power is supplied via the electronic fuse 15 and the non-received frame ID (that is, the above-described fuse combination) are set. The master ECU 2 is configured to transmit the fuse combination to the slave ECU 5 as the diagnostic mask information when the electronic fuse 15 is switched from the on state to the off state.

In such a communication system 1, even if the electronic fuse 15 becomes the off state due to a condition other than the activation trigger information, it is possible to suppress the occurrence of a situation in which it is determined that an anomaly due to the communication interruption has occurred in the slave ECU 3. Therefore, the communication system 1 can further improve the accuracy of the anomaly detection.

In the embodiment described above, S220 corresponds to a process as a group determination unit, S230 corresponds to a process as a sleep mask information transmission unit, S260 corresponds to a process as a switching mask information transmission unit, and the fuse combination corresponds to a combination of switching units.

Third Embodiment

Hereinafter, a third embodiment of the present disclosure will be described with reference to the drawings. In the third embodiment, portions different from those of the first embodiment will be described. The same reference numerals are given to common components.

Figure 8:
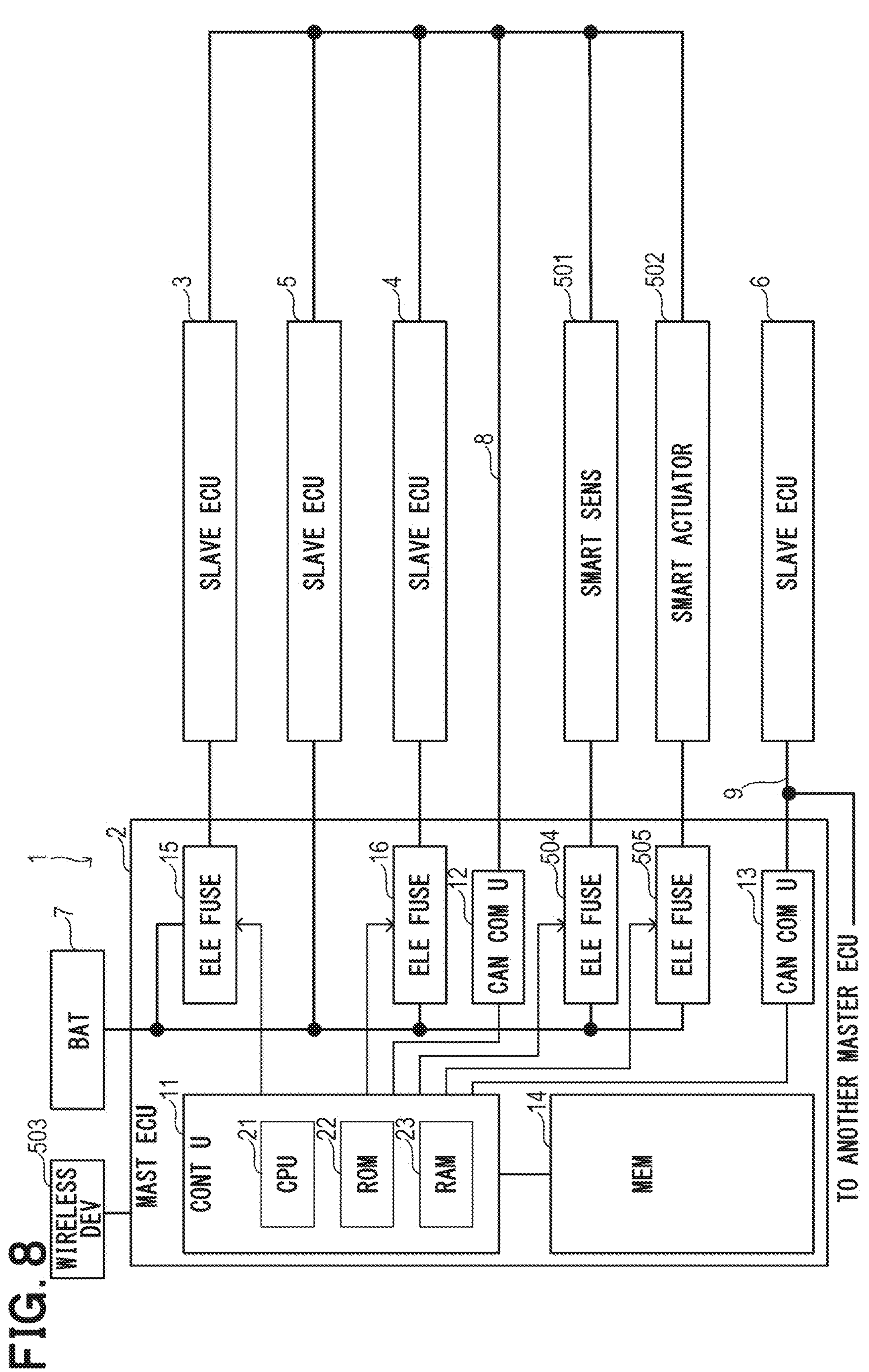
FIG. 8 is a block diagram illustrating the configuration of a communication system according to a third embodiment.

As shown in FIG. 8, the communication system 1 of the third embodiment differs from the first embodiment in that a smart sensor 501, a smart actuator 502, a wireless device 503, and electronic fuses 504 and 505 are added.

The smart sensor 501 is a sensor equipped with a communication function. The smart sensor 501 is connected to the communication bus 8. The smart actuator 502 is an actuator equipped with a communication function. The smart actuator 502 is connected to the communication bus 8.

The wireless device 503 is a wireless communication device for performing wireless communication with an external communication device installed outside the vehicle. The wireless device 503 is, for example, a DCM. The DCM is the abbreviation for data communication module.

The electronic fuse 504 is disposed on the power supply path between the battery 7 and the smart sensor 501. The electronic fuse 505 is disposed on the power supply path between the battery 7 and the smart actuator 502.

Each of the electronic fuses 504 and 505 is configured to switch, in response to an instruction from the control unit 11, between a conduction state in which the power supply path is connected and a cut-off state in which the power supply path is cut off.

Hereinafter, the master ECU 2, the slave ECUs 3 to 6, the smart sensor 501 and the smart actuator 502 will be collectively referred to as nodes.

Prerequisite

The master ECU 2 and the slave ECUs 5 and 6 are always supplied the electric power by the battery 7 without passing through a relay, and can independently switch between a wake-up state and a sleep state by themselves. Hereinafter, the master ECU 2 and the slave ECUs 5 and 6 are also referred to as NM-equipped nodes. The NM-equipped node is a node that has the function of generating a NM frame.

The slave ECUs 3 and 4, the smart sensor 501, and the smart actuator 502 are supplied with the electric power via a relay, and cannot independently switch to a wake-up state or a sleep state by themselves. That is, the wake-up state is established when the relay is turned on, and the sleep state is established when the relay is turned off. Hereinafter, the slave ECU 3, the slave ECU 5, the smart sensor 501, and the smart actuator 502 are also referred to as non-NM nodes. The non-NM node is a node that does not have the function to generate and interpret a NM frame.

The non-NM node includes at least one of an actuator and a sensor in addition to an ECU having a control function. The power supply paths of the non-NM nodes are connected to the electronic fuses 15, 16, 504, and 505 of the master ECU 2, respectively.

The non-NM nodes and the relays may be connected one-to-one, or multiple non-NM nodes belonging to the same cluster (i.e., a group that is activated simultaneously) may be connected in control of one electronic fuse.

The master ECU 2 and the NM-equipped node have a CAN communication unit and are capable of transmitting and receiving a NM frame. The NM-equipped node determines whether the node is in a wake-up state or a sleep state based on an NM frame transmitted and received via a communication bus.

The master ECU 2 turns on or off the electronic fuses 15, 16, 504, and 505 to which the non-NM node is connected, based on the NM frame transmitted and received via the communication bus.

The payload (i.e., data area) of an NM frame transmitted and received by the master ECU 2 and the NM-equipped node stores one or more bits of information indicating which cluster to activate.

One or more master ECUs (i.e., ECUs with built-in electronic fuses) are mounted in a vehicle. As shown in FIG. 9, one or more nodes belonging to each cluster are determined in advance by the system developer. Although it is possible to assign a cluster to each node, multiple nodes can be assigned to one cluster. If the bit corresponding to each cluster is active (i.e., "bit"=1), the cluster wakes up. In the case of the master ECU, waking up indicates an on state of the electronic fuse.

First Activation Example

The first activation example is an operation example in which a fault diagnosis of the slave ECU 3 is performed in response to a request from the cloud.

First, a connection request is transmitted from the base station (i.e., the cloud) to the wireless device 503 of the vehicle.

Next, when the wireless device 503 determines that the connection request is proper, the wireless device 503 notifies the master ECU 2 of the event received from the cloud.

Next, the master ECU 2 determines a service defined as "fault diagnosis of the slave ECU 3" based on the event, and generates an NM frame in which the bit of the third cluster to which only the slave ECU 3 belongs is active in order to activate the slave ECU 3.

Next, the master ECU 2 transmits the generated NM frame onto the communication buses 8 and 9. Since there is no NM-equipped node belonging to the third cluster on the communication buses 8 and 9, there is no change in the devices on the communication buses.

Next, the master ECU 2 executes processing based on the NM frame in the control unit 11, assuming that the master ECU has received an NM frame in which the bit of the third cluster is active at the same time as the above. Next, the control unit 11 of the master ECU 2 determines a wake-up instruction to the third cluster based on the NM frame, and since the third cluster includes the electronic fuse 15, turns on the electronic fuse 15.

When the electronic fuse 15 is in the on state, the electric power is supplied to the downstream slave ECU 3 and the slave ECU 3 is activated. The master ECU 2 waits for the slave ECU 3 to be activated, requests the slave ECU 3 for a diagnosis code, and transmits a response result from the slave ECU 3 to the base station via the wireless device 503.

Second Activation Example

The second activation example is an operation example in which a fault diagnosis of the slave ECU 5 is performed in response to a request from the cloud.

First, a connection request is transmitted from the base station (i.e., the cloud) to the wireless device 503 of the vehicle. Next, when the wireless device 503 determines that the connection request is proper, the wireless device 503 notifies the master ECU 2 of the event received from the cloud.

Next, the master ECU 2 determines a service defined as "fault diagnosis of the slave ECU 5" based on the event, and generates an NM frame in which the bit of the fourth cluster to which only the slave ECU 5 belongs is active in order to activate the slave ECU 5.

Next, the master ECU 2 transmits the generated NM frame onto the communication buses 8 and 9. Since the slave ECU 5 is disposed on the communication bus 8 as a node belonging to the fourth cluster, the slave ECU 5 wakes up.

Next, the master ECU 2 executes processing based on the NM frame in the control unit 11, assuming that the master ECU has received an NM frame in which the bit of the fourth cluster is active at the same time as the above. Next, even if the control unit 11 of the master ECU 2 determines to issue a wake-up instruction to the fourth cluster based on the NM frame, the fourth cluster does not include the corresponding relay, so the control unit 11 ignores the instruction.

When the slave ECU 5 is activated, the master ECU 2 requests the slave ECU 5 for a diagnostic code via the communication bus, and transmits a response result from the slave ECU 5 to the base station via the wireless device 503.

Third Activation Example

The third activation example is an operation example in which a user activates remote air conditioning using a smartphone. First, the user issues an instruction to turn on the in-vehicle air conditioner via the smartphone.

When the wireless device 503 receives an instruction signal from the smartphone and determines that the instruction signal is proper, the wireless device 503 transmits the event (i.e., the instruction signal) received from the cloud to the master ECU 2.

The master ECU 2 determines the "air conditioning service" based on the event, and generates an NM frame in which the second cluster is activated as the air conditioning cluster. The master ECU 2 periodically transmits the generated NM frame to the communication buses 8 and 9 until an instruction to stop the air conditioner is received. If the user requests to continue the active state, it is necessary for the master ECU 2 to continue transmitting the NM frames periodically. At the same time, the control unit 11 of the master ECU 2 executes a process based on the NM frame.

When an NM frame that activates the second cluster occurs on the communication bus 8, the slave ECU 5 (i.e., the air conditioner ECU) belonging to the second cluster receives the NM frame and wakes up in accordance with the received NM frame.

When the control unit 11 of the master ECU 2 detects that the second cluster is active, the master ECU 2 turns on the electronic fuses 504 and 505 that belong to the second cluster. When electronic fuse 504 and the electronic fuse 505 are in the on state, the electric power is supplied to the smart sensor 501 (i.e., the temperature sensor) and the smart actuator 502 (i.e., the compressor).

As a result of the above, the electric power supply to the air conditioner ECU, the smart sensor 501, and the smart actuator 502 starts, so that it is possible to turn on the in-vehicle air conditioner. When the user issues an instruction to turn off the in-vehicle air conditioner from the smartphone, the master ECU 2 stops the periodic transmission of the NM frame.

When the NM frame is interrupted, the slave ECU 5 transitions to a sleep state, and the master ECU 2 turns off the electronic fuses 504 and 505. Thus, the in-vehicle air conditioner stops operating.

Fourth Activation Example

The fourth activation example is an operation example in which the slave ECU 5 activates the in-vehicle air conditioner. Since the slave ECU 5 is always supplied with the electric power even when the vehicle is stopped, it is possible for the slave ECU 5 to wake up when the slave ECU 5 detects the input of a signal indicating that the activation switch connected to the slave ECU 5 has been turned on, even when the slave ECU 5 is in a sleep state.

When the woken up slave ECU 5 confirms an input to activate the in-vehicle air conditioner, the slave ECU 5 generates an NM frame with the bit corresponding to the second cluster turned on. The slave ECU 5 transmits the generated NM frame via the CAN communication unit 32. When the master ECU 2 receives this NM frame, the master ECU 2 turns on the electronic fuses 504 and 505 that belong to the second cluster.

When the activation switch of the in-vehicle air conditioner is turned off, the slave ECU 5 stops transmitting the NM frame and transitions to a sleep state after a while. When the NM frame is interrupted, the master ECU 2 turns off the electronic fuses 504 and 505 after a while and ends the control.

When the master ECU 2 determines that it is necessary to continue the control even after the transmission of the NM frame has stopped, the master ECU 2 transmits an NM frame in which the bit corresponding to the second cluster is set to be on. Thus, the slave ECU 5 and the electronic fuses 504 and 505 can maintain the activation state until the transmission of the NM frame generated by the master ECU 2 stops.

Fourth Embodiment

Hereinafter, a fourth embodiment according to the present disclosure will be described with reference to the drawings. In the fourth embodiment, portions different from those of the first embodiment will be described.

Figure 10:
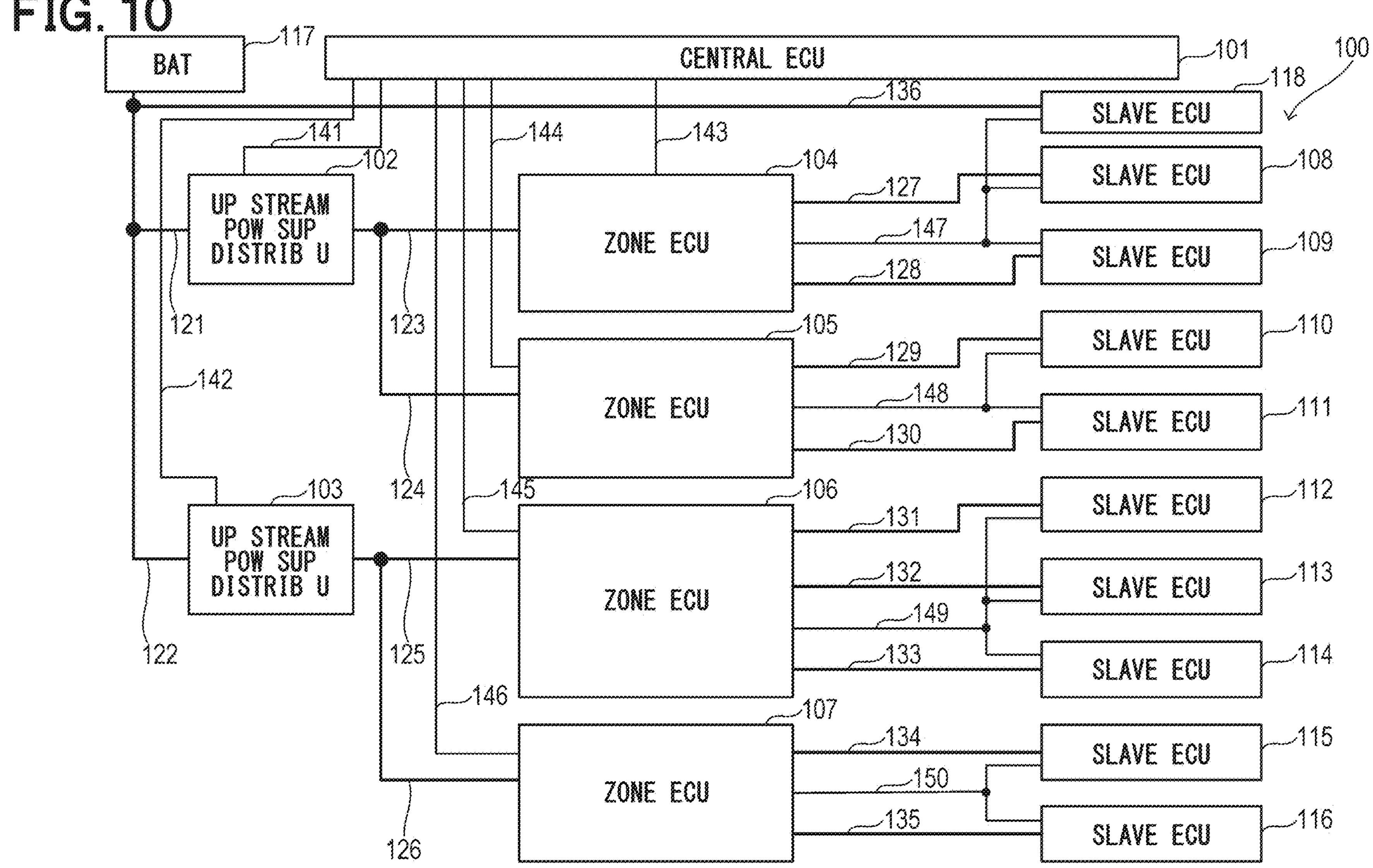
FIG. 10 is a block diagram illustrating the configuration of a communication system according to a fourth embodiment.

The communication system 100 of the fourth embodiment is mounted on a vehicle and, as shown in FIG. 10, includes a central ECU 101, upstream electric power distribution units 102, 103, zone ECUs 104, 105, 106, 107, slave ECUs 108, 109, 110, 111, 112, 113, 114, 115, 116, a battery 117, and a slave ECU 118. In the following description, the central ECU 101, the zone ECUs 104 to 107, and the slave ECUs 108 to 116 and 118 are collectively referred to as nodes.

The battery 117 supplies electric power to various parts of the vehicle at a DC battery voltage (for example, 12V). The central ECU 101, the upstream electric power distribution units 102 and 103, the zone ECUs 104 to 107, and the slave ECUs 108 to 116 and 118 operate by receiving the electric power supply from a battery 117.

The upstream electric power supply distribution unit 102 receives the electric power supply from the battery 117 via a power supply path 121 between the battery 117 and the upstream electric power supply distribution unit 102. The upstream electric power supply distribution unit 103 receives the electric power supply from the battery 117 via a power supply path 122 between the battery 117 and the upstream electric power supply distribution unit 103.

The zone ECUs 104 and 105 receive the electric power from a battery 117 via power supply paths 123 and 124 between the upstream electric power distribution unit 102 and the zone ECUs 104 and 105, respectively.

The zone ECUs 106 and 107 receive the electric power from the battery 117 via the power supply paths 125 and 126 between the upstream electric power distribution unit 103 and the zone ECUs 106 and 107, respectively.

The slave ECUs 108 and 109 receive the electric power from the battery 117 via the power supply paths 127 and 128 between the zone ECU 104 and the slave ECUs 108 and 109, respectively.

The slave ECUs 110 and 111 receive the electric power from a battery 117 via the power supply paths 129 and 130 between the zone ECU 105 and the slave ECUs 110 and 111, respectively.

The slave ECUs 112, 113 and 114 receive the electric power from the battery 117 via the power supply paths 131, 132 and 133 between the zone ECU 106 and the slave ECUs 112, 113 and 114, respectively.

The slave ECUs 115 and 116 receive the electric power from a battery 117 via the power supply paths 134 and 135 between the zone ECU 107 and the slave ECUs 115 and 116, respectively.

The slave ECU 118 receives the electric power from the battery 117 via a power supply path 136.

The central ECU 101 and the upstream electric power distribution unit 102 are connected to each other via a communication line 141 so as to be able to communicate data with each other.

The central ECU 101 and the upstream electric power distribution unit 103 are connected to each other via a communication line 142 so as to be able to communicate data with each other.

The central ECU 101 and the zone ECUs 104, 105, 106, and 107 are connected to each other via communication lines 143, 144, 145, and 146, respectively, so as to be able to communicate data with each other.

The zone ECU 104 and the slave ECUs 108, 109 and 118 are connected to each other via a communication bus 147 so as to be capable of data communication. The zone ECU 105 and the slave ECUs 110, 111 are connected to each other via a communication bus 148 so as to be capable of data communication.

The zone ECU 106 and the slave ECUs 112, 113 and 114 are connected to each other via a communication bus 149 so as to be capable of data communication. The zone ECU 107 and the slave ECUs 115, 116 are connected to each other via a communication bus 150 so as to be capable of data communication.

Figure 11:
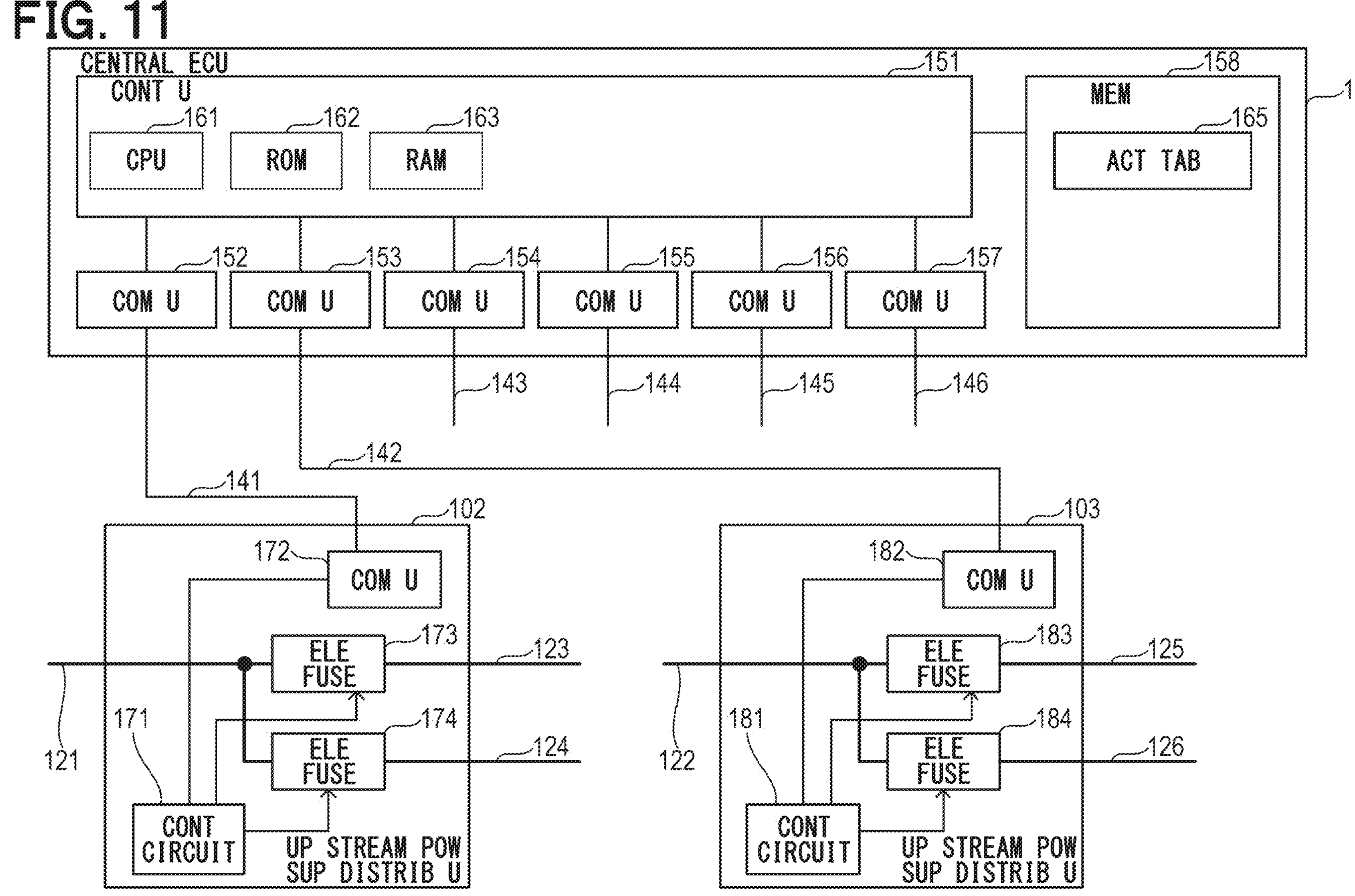
FIG. 11 is a block diagram showing the configuration of a central ECU and an upstream electric power distribution unit according to a fourth embodiment.

As shown in FIG. 11, the central ECU 101 includes a control unit 151, communication units 152, 153, 154, 155, 156, and 157, and a memory unit 158. The control unit 151 is an electronic control device mainly including a microcomputer with a CPU 161, a ROM 162, a RAM 163, and the like. Various functions of the microcomputer are implemented by the CPU 161 executing programs stored in a non-transitory tangible storage medium. In this example, the ROM 162 corresponds to the non-transitory tangible storage medium in which the programs are stored. A method corresponding to the program is executed by executing the program. Here, a part or all of the functions to be executed by the CPU 161 may be configured as hardware circuitry by one or multiple ICs or the like. Alternatively, the number of the microcomputers constituting the control unit 151 may be one or more.

The communication unit 152 communicates with the upstream electric power distribution unit 102 connected to the communication line 141 by transmitting and receiving communication frames based on, for example, the Ethernet communication protocol. The Ethernet is a registered trademark.

The communication unit 153 communicates with the upstream electric power distribution unit 103 connected to the communication line 142 by transmitting and receiving communication frames based on, for example, the Ethernet communication protocol. The communication unit 154 communicates with the zone ECU 104 connected to the communication line 143 by transmitting and receiving communication frames based on, for example, the Ethernet communication protocol.

The communication unit 155 communicates with the zone ECU 105 connected to the communication line 144 by transmitting and receiving communication frames based on, for example, the Ethernet communication protocol.

The communication unit 156 communicates with the zone ECU 106 connected to the communication line 145 by transmitting and receiving communication frames based on, for example, the Ethernet communication protocol.

The communication unit 157 communicates with the zone ECU 107 connected to the communication line 145 by transmitting and receiving communication frames based on, for example, the Ethernet communication protocol. The memory unit 158 is a storage device for storing various data. The memory unit 158 stores an activation table 165 to be described later.

The upstream electric power distribution unit 102 includes a control circuit 171, a communication unit 172, and electronic fuses 173 and 174. The control circuit 171 performs control to switch the electronic fuses 173 and 174 between an on state and an off state based on an instruction acquired from the central ECU 101 via the communication unit 172.

The communication unit 172 communicates with the central ECU 101 connected to the communication line 141 by transmitting and receiving communication frames based on, for example, the Ethernet communication protocol.

The electronic fuse 173 is disposed between the power supply path 121 and the power supply path 123. The electronic fuse 174 is disposed between the power supply path 121 and the power supply path 124. The upstream electric power distribution unit 103 includes a control circuit 181, a communication unit 182, and electronic fuses 183 and 184.

The control circuit 181 performs control to switch the electronic fuses 183 and 184 between an on state and an off state based on an instruction acquired from the central ECU 101 via the communication unit 182.

The communication unit 182 communicates with the central ECU 101 connected to the communication line 142 by transmitting and receiving communication frames based on, for example, the Ethernet communication protocol.

Figure 12:
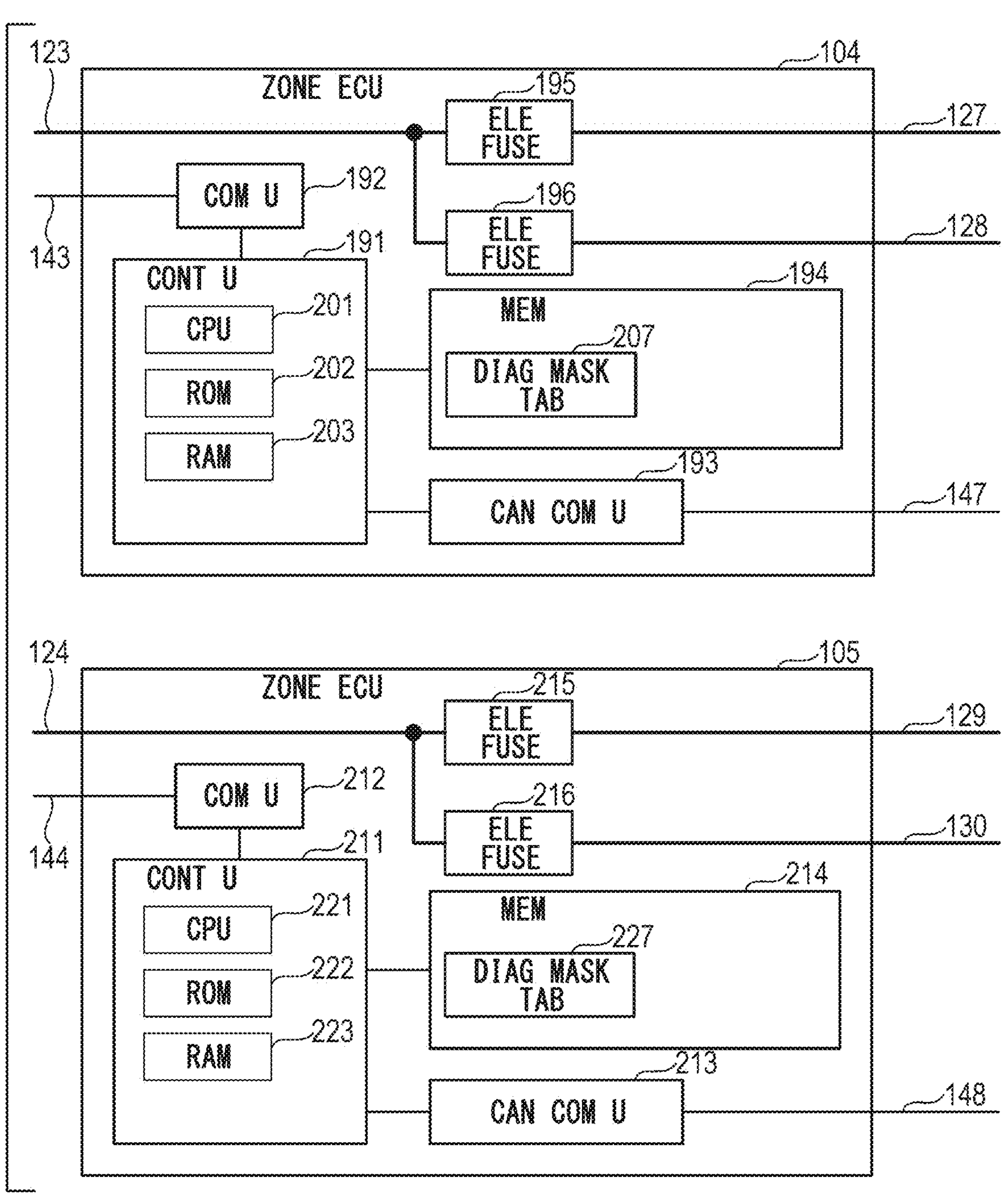
FIG. 12 is a first block diagram showing a configuration of a zone ECU according to a fourth embodiment.

The electronic fuse 183 is disposed between the power supply path 122 and the power supply path 125. The electronic fuse 184 is disposed between the power supply path 122 and the power supply path 126. As shown in FIG. 12, the zone ECU 104 includes a control unit 191, a communication unit 192, a CAN communication unit 193, a memory unit 194, and electronic fuses 195 and 196.

The control unit 191 is an electronic control device mainly including a microcomputer with a CPU 201, a ROM 202, a RAM 203, and the like. Various functions of the microcomputer are implemented by the CPU 201 executing programs stored in a non-transitory tangible storage medium. In this example, the ROM 202 corresponds to the non-transitory tangible storage medium in which the programs are stored. A method corresponding to the program is executed by executing the program. Here, a part or all of the functions to be executed by the CPU 201 may be configured as hardware circuitry by one or multiple ICs or the like. Alternatively, the number of the microcomputers constituting the control unit 191 may be one or more.

The communication unit 192 communicates with the central ECU 101 connected to the communication line 143 by transmitting and receiving communication frames based on, for example, the Ethernet communication protocol.

The CAN communication unit 193 communicates with the slave ECUs 108 and 109 connected to the communication bus 147 by transmitting and receiving a communication frame based on the CAN communication protocol.

The memory unit 194 is a storage device for storing various data. The memory unit 194 stores a diagnosis mask table 207, which will be described later. The electronic fuse 195 is disposed between the power supply path 123 and the power supply path 127. The electronic fuse 196 is disposed between the power supply path 123 and the power supply path 128.

The zone ECU 105 includes a control unit 211, a communication unit 212, a CAN communication unit 213, a memory unit 214, and electronic fuses 215 and 216. The control unit 211 is an electronic control device mainly including a microcomputer with a CPU 221, a ROM 222, a RAM 223, and the like. Various functions of the microcomputer are implemented by the CPU 221 executing programs stored in a non-transitory tangible storage medium. In this example, the ROM 222 corresponds to a non-transitory tangible storage medium storing programs. A method corresponding to the program is executed by executing the program. Here, a part or all of the functions to be executed by the CPU 221 may be configured as hardware circuitry by one or multiple ICs or the like. Alternatively, the number of the microcomputers constituting the control unit 211 may be one or more.

The communication unit 212 communicates with the central ECU 101 connected to the communication line 144 by transmitting and receiving communication frames based on, for example, the Ethernet communication protocol.

The CAN communication unit 213 communicates with the slave ECUs 110 and 111 connected to the communication bus 148 by transmitting and receiving a communication frame based on the CAN communication protocol.

The memory unit 214 is a storage device for storing various data. The memory unit 214 stores a diagnosis mask table 227, which will be described later. The electronic fuse 215 is disposed between the power supply path 124 and the power supply path 129. The electronic fuse 216 is disposed between the power supply path 124 and the power supply path 130.

Figure 13:
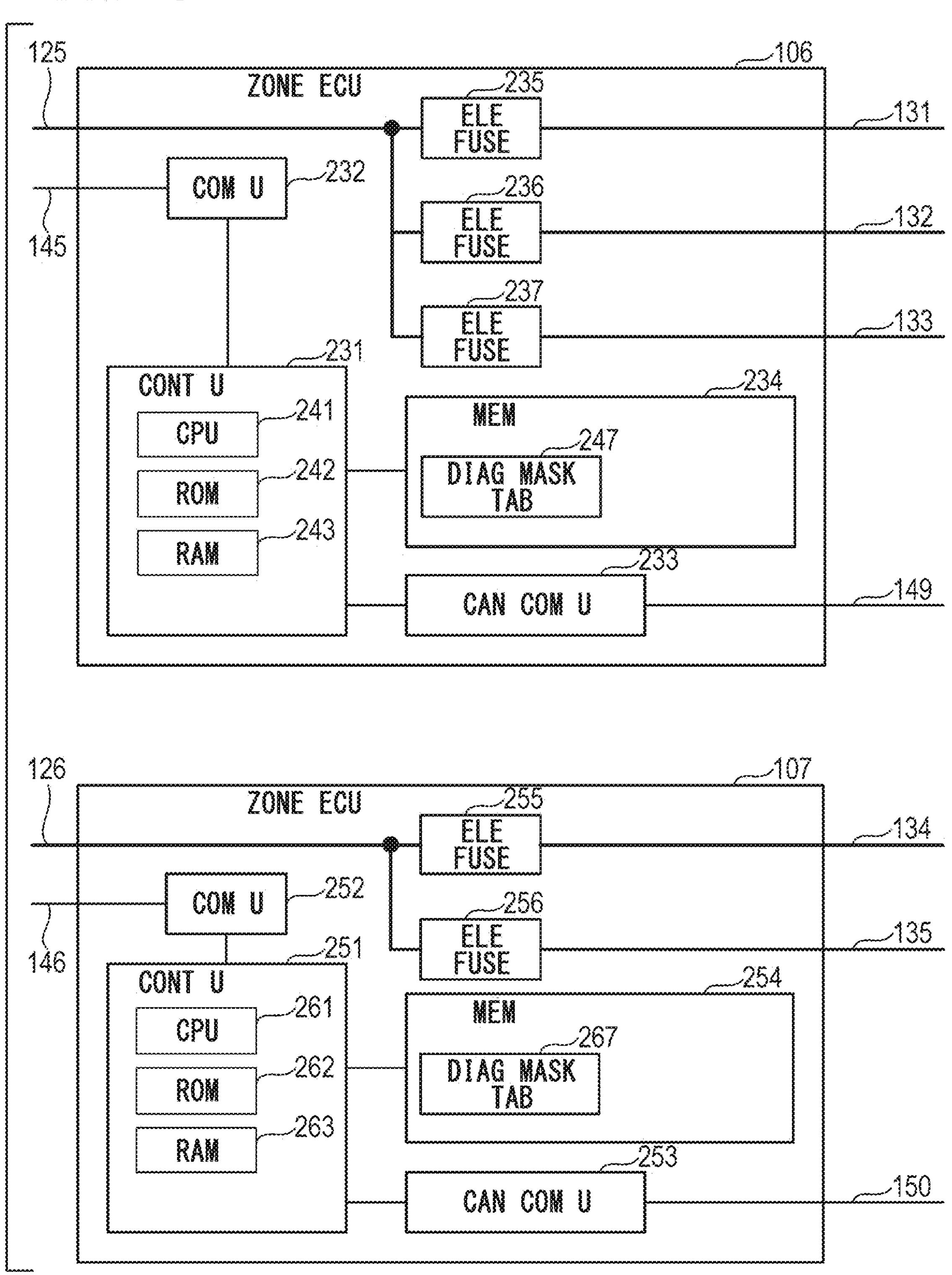
FIG. 13 is a second block diagram showing the configuration of the zone ECU according to the fourth embodiment.

As shown in FIG. 13, the zone ECU 106 includes a control unit 231, a communication unit 232, a CAN communication unit 233, a memory unit 234, and electronic fuses 235, 236 and 237. The control unit 231 is an electronic control device mainly including a microcomputer with a CPU 241, a ROM 242, a RAM 243, and the like. Various functions of the microcomputer are implemented by the CPU 241 executing programs stored in a non-transitory tangible storage medium. In this example, the ROM 242 corresponds to the non-transitory tangible storage medium in which the programs are stored. A method corresponding to the program is executed by executing the program. Here, a part or all of the functions to be executed by the CPU 241 may be configured as hardware circuitry by one or multiple ICs or the like. Alternatively, the number of the microcomputers constituting the control unit 231 may be one or more.

The communication unit 232 communicates with the central ECU 101 connected to the communication line 145 by transmitting and receiving communication frames based on, for example, the Ethernet communication protocol.

The CAN communication unit 233 communicates with the slave ECUs 112, 113 and 114 connected to the communication bus 149 by transmitting and receiving a communication frame based on the CAN communication protocol.

The memory unit 234 is a storage device for storing various data. The memory unit 194 stores a diagnosis mask table 247, which will be described later. The electronic fuse 235 is disposed between the power supply path 125 and the power supply path 131. The electronic fuse 236 is disposed between the power supply path 125 and the power supply path 132. The electronic fuse 237 is disposed between the power supply path 125 and the power supply path 133.

The zone ECU 107 includes a control unit 251, a communication unit 252, a CAN communication unit 253, a memory unit 254, and electronic fuses 255 and 256. The control unit 251 is an electronic control device mainly including a microcomputer with a CPU 261, a ROM 262, a RAM 263, and the like. Various functions of the microcomputer are implemented by the CPU 261 executing programs stored in a non-transitory tangible storage medium. In this example, the ROM 262 corresponds to the non-transitory tangible storage medium in which the programs are stored. A method corresponding to the program is executed by executing the program. Here, a part or all of the functions to be executed by the CPU 261 may be configured as hardware circuitry by one or multiple ICs or the like. Alternatively, the number of the microcomputers constituting the control unit 251 may be one or more.

The communication unit 252 communicates with the central ECU 101 connected to the communication line 146 by transmitting and receiving communication frames based on, for example, the Ethernet communication protocol.

The CAN communication unit 253 communicates with the slave ECUs 115 and 116 connected to the communication bus 150 by transmitting and receiving a communication frame based on the CAN communication protocol.

The memory unit 254 is a storage device for storing various data. The memory unit 254 stores a diagnosis mask table 267, which will be described later. The electronic fuse 255 is disposed between the power supply path 126 and the power supply path 134. The electronic fuse 256 is disposed between the power supply path 126 and the power supply path 135.

Figure 14:
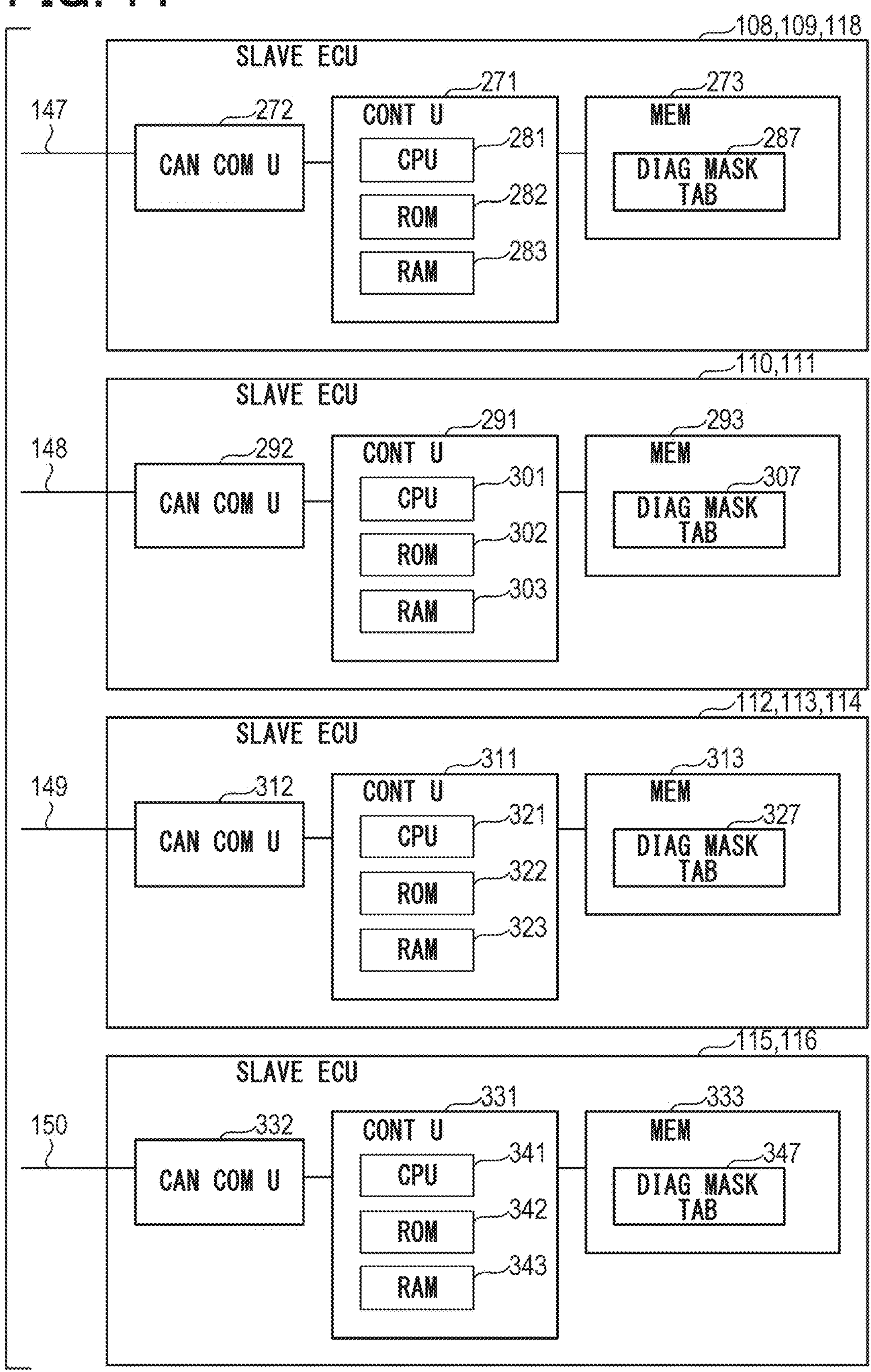
FIG. 14 is a block diagram showing a configuration of a slave ECU according to a fourth embodiment.

As shown in FIG. 14, the slave ECUs 108, 109, and 118 each include a control unit 271, a CAN communication unit 272, and a memory unit 273. The control unit 271 is an electronic control device mainly including a microcomputer with a CPU 281, a ROM 282, a RAM 283, and the like. Various functions of the microcomputer are implemented by the CPU 281 executing programs stored in a non-transitory tangible storage medium. In this example, the ROM 282 corresponds to the non-transitory tangible storage medium in which the programs are stored. A method corresponding to the program is executed by executing the program. Here, a part or all of the functions to be executed by the CPU 281 may be configured as hardware circuitry by one or multiple ICs or the like. Alternatively, the number of the microcomputers constituting the control unit 271 may be one or more.

The CAN communication unit 272 communicates with the zone ECU 104 connected to the communication bus 147 based on the CAN communication protocol. The memory unit 273 is a storage device for storing various data. The memory unit 273 stores a diagnosis mask table 287, which will be described later.

The slave ECUs 110 and 111 include the control unit 291, the CAN communication unit 292, and the memory unit 293, respectively. The control unit 291 is an electronic control device mainly including a microcomputer with a CPU 301, a ROM 302, a RAM 303, and the like. Various functions of the microcomputer are implemented by the CPU 301 executing programs stored in a non-transitory tangible storage medium. In this example, the ROM 302 corresponds to the non-transitory tangible storage medium in which the programs are stored. A method corresponding to the program is executed by executing the program. Here, a part or all of the functions to be executed by the CPU 301 may be configured as hardware circuitry by one or multiple ICs or the like. Alternatively, the number of the microcomputers constituting the control unit 291 may be one or more.

The CAN communication unit 292 communicates with the zone ECU 105 connected to the communication bus 148 based on the CAN communication protocol. The memory unit 293 is a storage device for storing various data. The memory unit 293 stores a diagnosis mask table 307, which will be described later.

The slave ECUs 112, 113 and 114 each include the control unit 311, the CAN communication unit 312, and the memory unit 313, respectively. The control unit 311 is an electronic control device mainly including a microcomputer with a CPU 321, a ROM 322, a RAM 323, and the like. Various functions of the microcomputer are implemented by the CPU 321 executing programs stored in a non-transitory tangible storage medium. In this example, the ROM 322 corresponds to the non-transitory tangible storage medium in which the programs are stored. A method corresponding to the program is executed by executing the program. Here, a part or all of the functions to be executed by the CPU 321 may be configured as hardware circuitry by one or multiple ICs or the like. Alternatively, the number of the microcomputers constituting the control unit 311 may be one or more.

The CAN communication unit 312 communicates with the zone ECU 106 connected to the communication bus 149 based on the CAN communication protocol. The memory unit 313 is a storage device for storing various data. The memory unit 313 stores a diagnosis mask table 327, which will be described later.

The slave ECUs 115 and 116 include the control unit 331, the CAN communication unit 332, and the memory unit 333, respectively. The control unit 331 is an electronic control device mainly including a microcomputer with a CPU 341, a ROM 342, a RAM 343, and the like. Various functions of the microcomputer are implemented by the CPU 341 executing programs stored in a non-transitory tangible storage medium. In this example, the ROM 342 corresponds to the non-transitory tangible storage medium in which the programs are stored. A method corresponding to the program is executed by executing the program. Here, a part or all of the functions to be executed by the CPU 341 may be configured as hardware circuitry by one or multiple ICs or the like. Alternatively, the number of the microcomputers constituting the control unit 331 may be one or more.

The CAN communication unit 332 communicates with the zone ECU 107 connected to the communication bus 150 based on the CAN communication protocol. The memory unit 333 is a storage device for storing various data. The memory unit 333 stores a diagnosis mask table 347, which will be described later.

As shown in FIG. 15, in the activation table 165 of the central ECU 101, a communication group to be activated (i.e., an activation group) is set for each event. The activation table 165 further includes a correspondence between an activation group and a slave ECU to be set into a wake-up state. The activation table 165 further includes a correspondence between the slave ECU and the electronic fuse connected to the slave ECU. The activation table 165 may be set in such a way that it is possible to recognize the correspondence relationship of which zone ECU the slave ECU is in control.

As shown in FIG. 16, in the diagnosis mask tables 207, 227, 247, 267, 287, 307, 327, and 347, an activation group is set for each event. The diagnosis mask tables 207, 227, 247, 267, 287, 307, 327, and 347 further set a correspondence between the activation group, a slave ECU (hereinafter, the cut-off device) to which the electric power supply via an electronic fuse is cut off, a slave ECU (hereinafter, the sleep device) that goes into a sleep state, and the CAN ID of a CAN frame that is not received (hereinafter, the non-received frame ID). The diagnosis mask tables 207, 227, 247, 267, 287, 307, 327, and 347 may be set in such a way that the correspondence relationship of which zone ECU the slave ECU is in control is recognized. Furthermore, the diagnosis mask tables 207, 227, 247, 267, 287, 307, 327, and 347 may not necessarily need to include a correspondence table between an event and an activation group (i.e., the table on the left in FIG. 16).

In FIG. 16, for example, when the activation group is the second communication group, the slave ECUs 110, 111, and 112 are indicated by hatched rectangles. This indicates that the slave ECUs 110, 111, and 112 are cutoff devices, and non-received frame IDs corresponding to the slave ECUs 110, 111, and 112 are set.

Next, the procedure of the central management process executed by the control unit 151 of the central ECU 101 will be described. The central management process is a process that is repeatedly executed while the central ECU 101 is activated.

Figure 17:
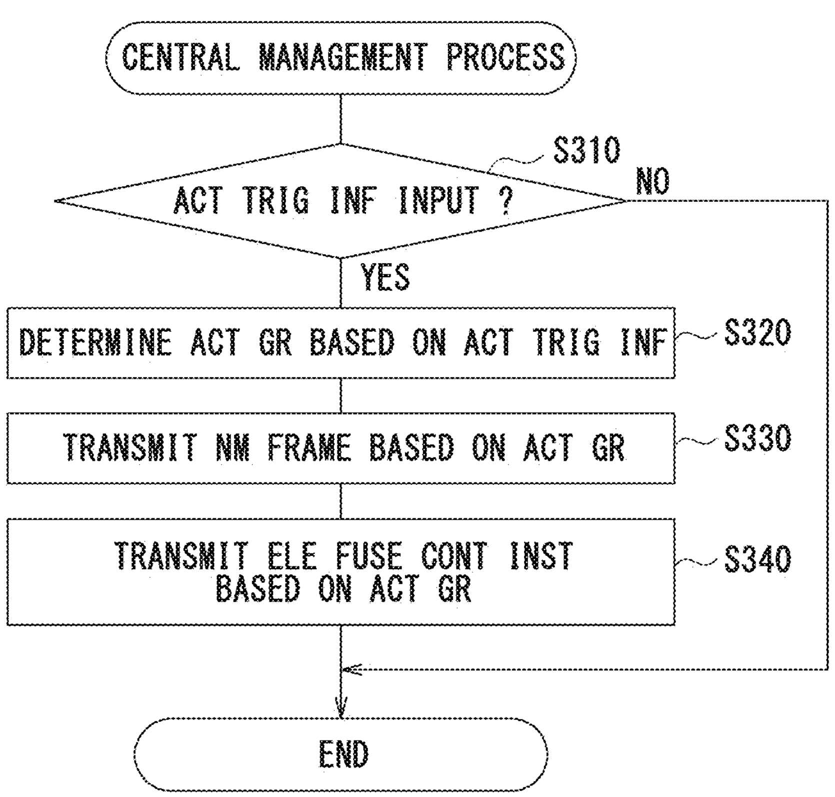
FIG. 17 is a flowchart showing a central management process according to a fourth embodiment.

When the central management process is executed, as shown in FIG. 17, the CPU 161 of the control unit 151 determines whether activation trigger information (i.e., NM frame or event occurrence information) has been input to the master ECU 2 in S310.

Here, if the activation trigger information has not been input, the CPU 161 ends the central management process. On the other hand, if the activation trigger information is input, the CPU 161 determines the activation group based on the input activation trigger information in S320. Specifically, when the activation trigger information is an NM frame, the CPU 161 determines that the communication group corresponding to the bit set to 1 in the input NM frame is the activation group. Further, when the activation trigger information is the event occurrence information, the CPU 161 determines the activation group based on the event indicated by the event occurrence information by referring to the activation table 165. The CPU 161 generates an NM frame indicating the determined activation group.

In S330, the CPU 161 starts the process of transmitting an NM frame indicating the activation group determined in S320 to the zone ECUs 104, 105, 106, and 107. After starting the transmission of the NM frame in S330, the CPU 161 periodically transmits the same NM frame thereafter.

In S340, the CPU 161 refers to the activation table 165 and transmits the electronic fuse control instruction to the upstream electric power distribution units 102, 103 and the zone ECUs 104, 105, 106, and 107, and ends the central management process. The electronic fuse control instruction includes an instruction to turn on the electronic fuse corresponding to the activation group determined in S320 and an instruction to turn off the electronic fuses other than the electronic fuses corresponding to the activation group.

The upstream electric power distribution unit 102 switches the electronic fuses 173 and 174 to the on state or the off state based on the received electronic fuse control instruction. The upstream electric power distribution unit 103 turns the electronic fuses 183 and 184 to the on state or the off state based on the received electronic fuse control instruction.

The zone ECU 104 switches the electronic fuses 195 and 196 to the on state or the off state based on the received electronic fuse control instruction. The zone ECU 105 switches the electronic fuses 215 and 216 to the on state or the off state based on the received electronic fuse control instruction.

The zone ECU 106 switches the electronic fuses 235, 236 and 237 to the on state or the off state based on the received electronic fuse control instruction. The zone ECU 107 switches the electronic fuses 255 and 256 to the on state or the off state based on the received electronic fuse control instruction.

Next, the procedure of the zone management process executed by the control units 191, 211, 231, and 251 of the zone ECUs 104, 105, 106, and 107 will be described. The zone management process is repeatedly executed while the zone ECUs 104, 105, 106, and 107 are activated.

Figure 18:
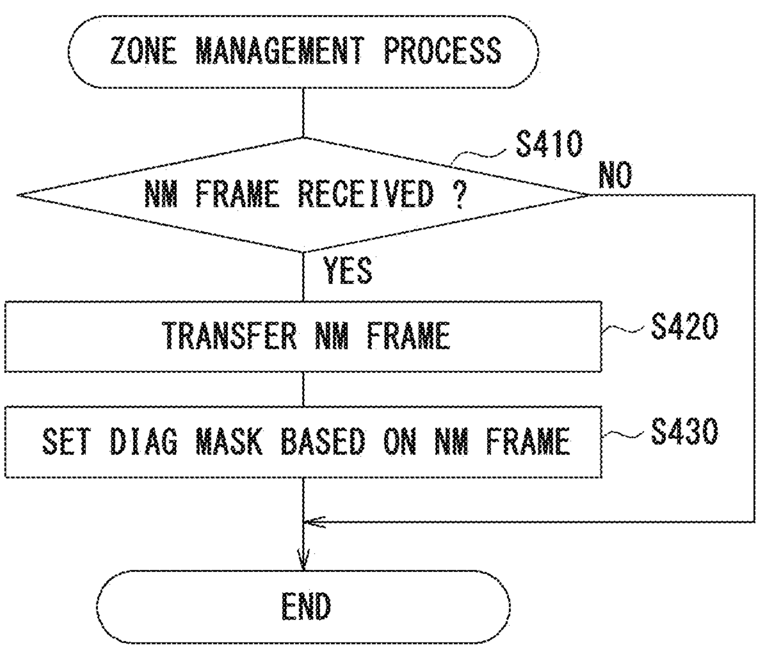
FIG. 18 is a flowchart showing a zone management process according to the fourth embodiment.

When the zone management process is executed, the CPUs 201, 221, 241, and 261 of the control units 191, 211, 231, and 251 determine in S410 whether or not an NM frame has been received, as shown in FIG. 18. If an NM frame has not been received, the CPU 201, 221, 241, 261 ends the zone management process.

On the other hand, if an NM frame is received, the CPU 201, 221, 241, 261 transfers the received NM frame to the slave ECU in control thereof in S420. The slave ECUs in the control of the zone ECU 104 are the slave ECUs 108, 109, and 118. The slave ECUs in the control of the zone ECU 105 are slave ECUs 110 and 111. The slave ECUs in the control of the zone ECU 106 are slave ECUs 112, 113, and 114. The slave ECUs in the control of the zone ECU 107 are slave ECUs 115 and 116.

In S430, the CPUs 201, 221, 241, and 261 refer to the diagnosis mask tables 207, 227, 247, and 267 to set a diagnosis mask based on the received NM frame, and then end the zone management process.

Next, the procedure of the slave management process performed by the control unit 271 of the slave ECUs 108 and 109 will be described. The slave management process is repeatedly performed while the slave ECUs 108 and 109 are activated. The slave ECUs 110 to 116 execute the slave management process in the same manner as the slave ECUs 108 and 109.

Figure 19:
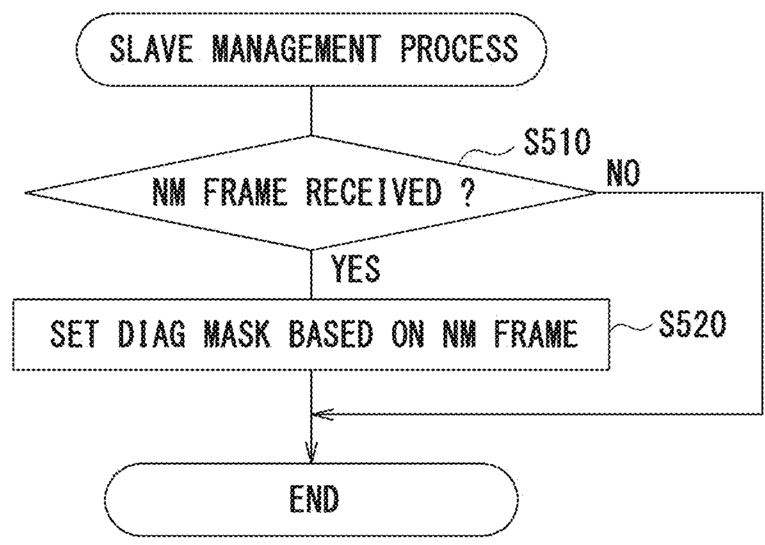
FIG. 19 is a flowchart illustrating a slave management process according to the fourth embodiment.

When the slave management processing is executed, the CPU 281 of the control unit 271 determines in S510 whether an NM frame has been received, as shown in FIG. 19. When the NM frame has not been received, the CPU 281 ends the slave management processing.

On the other hand, when an NM frame is received, the CPU 281 sets a diagnostic mask based on the received NM frame by referring to the diagnosis mask table 287 in S520, and ends the slave management process.

The communication system 100 thus configured includes a central ECU 101, zone ECUs 104 to 107, and slave ECUs 108 to 116, 118 that are connected to each other so as to be able to transmit and receive communication frames.

Each of the central ECU 101, the zone ECUs 104 to 107, and the slave ECUs 108 to 116 and 118 belongs to at least one of a plurality of communication groups. The communication system 100 is configured such that each of the ECUs belonging to one of the communication groups is independently switched, or multiple ECUs belonging to one of the communication groups are switched as a whole between a wake-up state and a sleep state for each of the communication groups.

The slave ECU 108 receives the electric power from the battery 117 via the electronic fuse 195 that is configured to switch between a conduction state in which the electric power supply path is made conductive and a cutoff state in which the electric power supply path is cut off. The slave ECU 109 receives the electric power from the battery 117 via the electronic fuse 196 that is configured to switch between a conduction state in which the electric power supply path is made conductive and a cutoff state in which the electric power supply path is cut off. The slave ECU 118 receives an electric power supply from a battery 117 without passing through an electronic fuse.

The slave ECU 109 is connected to the slave ECU 108 so as to be able to transmit and receive the communication frame. The slave ECU 108, the slave ECU 109, the slave ECU 118 and the zone ECU 104 are connected to each other so as to be able to transmit and receive communication frames therebetween. The zone ECU 104 is configured to control the operation of the electronic fuses 195 and 196.

The central ECU 101 is connected to the zone ECU 104 so as to be able to transmit and receive communication frames therebetween. The slave ECU 108, the slave ECU 109 and the slave ECU 118 store a diagnosis mask table 287, respectively. The diagnosis mask table 287 sets, one or more combinations (hereinafter referred to as an activation stop combination) of the communication group, the ECU (i.e., the above-described cut-off device) to which the electric power supply via the electronic fuse is cut off and the ECU (i.e., the above-described sleep device) that becomes the sleep state, and the CAN ID of the non-received CAN frame (that is, the above-described non-received frame ID).

The central ECU 101 is configured to determine the activation group based on the acquired activation trigger information upon acquiring the activation trigger information for determining the communication group to be brought into the wake-up state (i.e., the activation group described above).

The central ECU 101 is configured to transmit a communication frame indicating the determined activation group (i.e., the above-described NM frame) to the zone ECU 104. The zone ECU 104 is configured to transfer the NM frame received from the central ECU 101 to the slave ECU 108, the slave ECU 109 and the slave ECU 118.

In such a communication system 100, the slave ECU 109 refers to the diagnosis mask table 287 based on the activation group indicated by the NM frame received from the zone ECU 104, thereby recognizing the combination of the above-described cutoff device and the non-received frame ID, and the combination of the above-described sleep device and the non-received frame ID. Therefore, even if the slave ECU 109 is unable to receive a CAN frame from the slave ECU 108 because the electric power supply via the electronic fuse 195 is cut off in the ECU 108, the slave ECU 108 can suppress the occurrence of a situation in which it is determined that an anomaly due to the communication interruption has occurred in the slave ECU 108. Furthermore, even if the slave ECU 109 cannot receive a CAN frame from the slave ECU 108 that is in a sleep state, it is possible to suppress the occurrence of a situation in which it is determined that an anomaly due to the communication interruption has occurred in the slave ECU 108. Thereby, the communication system 100 can improve a detection accuracy of anomaly.

In the embodiment described above, the central ECU 101, the zone ECUs 104 to 107, and the slave ECUs 108 to 116 and 118 correspond to a plurality of electronic control devices, the electronic fuse 195 corresponds to a power supply switching unit, and the battery 117 corresponds to an electric power source.

Moreover, the slave ECU 108 corresponds to a first slave control device, the slave ECU 109 corresponds to a second slave control device, the zone ECU 104 corresponds to a zone control device, and the central ECU 101 corresponds to a central control device.

Moreover, S320 corresponds to the processing performed by a group determination unit, S330 corresponds to the processing performed by an activation group transmission unit, and S420 corresponds to the processing performed by a frame transfer unit.

Fifth Embodiment

Hereinafter, a fifth embodiment according to the present disclosure will be described with reference to the drawings. In the fifth embodiment, portions different from those of the fourth embodiment will be described. The same reference numerals are given to common components.

Figure 20:
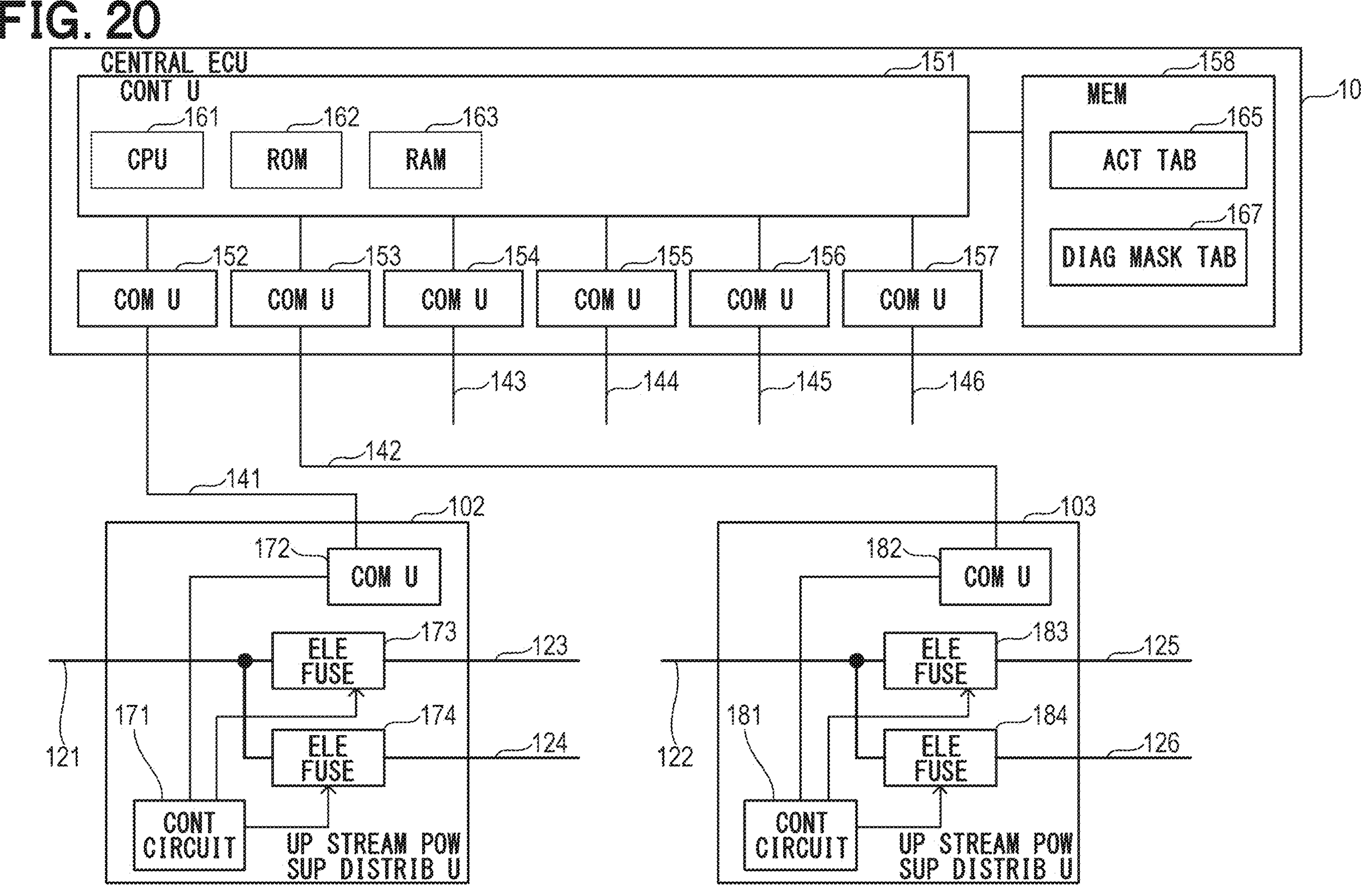
FIG. 20 is a block diagram showing the configuration of a central ECU and an upstream electric power distribution unit according to a fifth embodiment.

As shown in FIG. 20, the communication system 100 of the fifth embodiment differs from the fourth embodiment in that the memory unit 158 of the central ECU 101 further stores a diagnosis mask table 167.

As shown in FIG. 16, in the diagnosis mask table 167, an activation group is set for each event. The diagnosis mask table 167 further includes a correspondence relationship between an activation group, a cut-off device, a sleep device, and a non-received frame ID.

Figure 21:
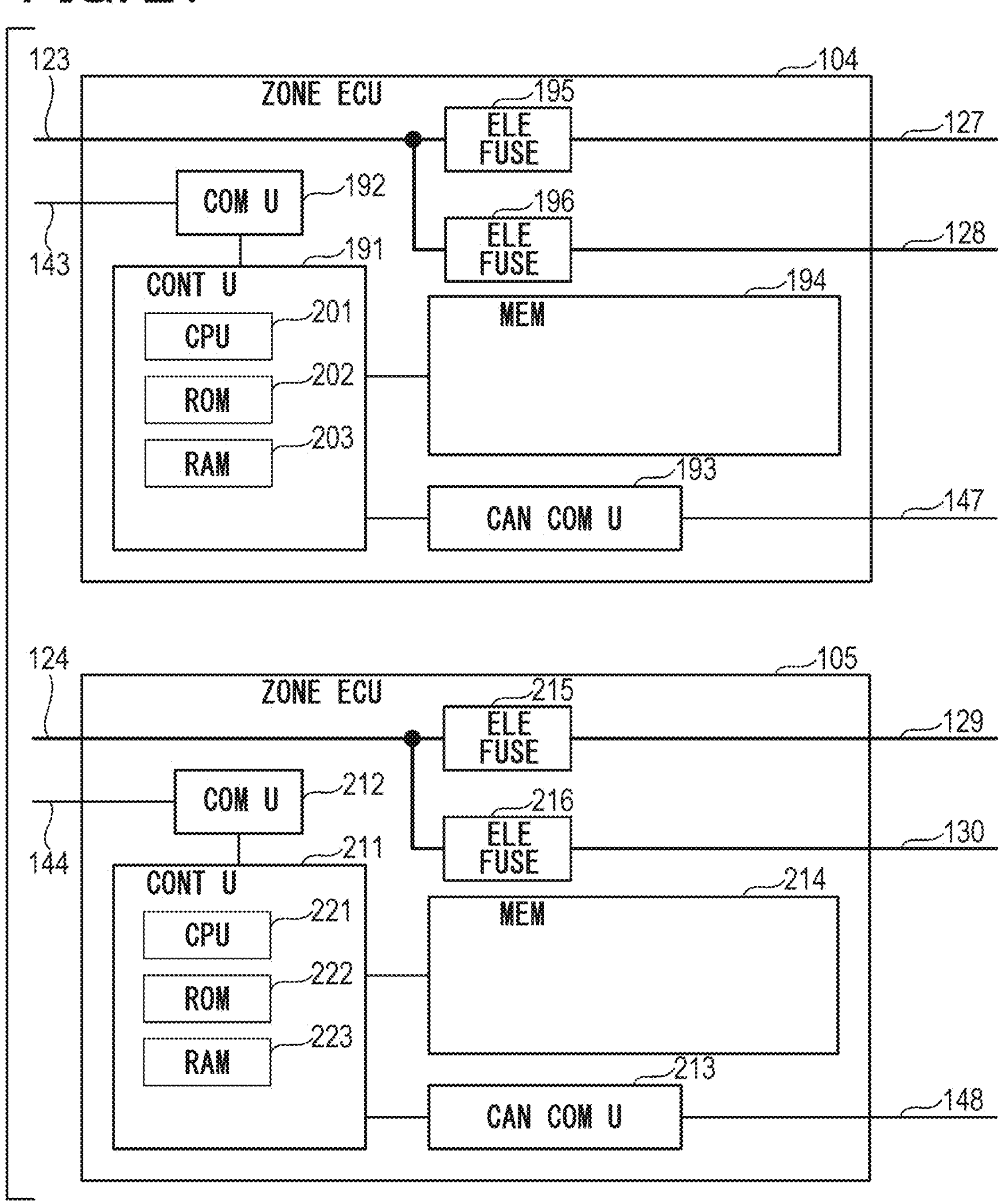
FIG. 21 is a first block diagram showing the configuration of the zone ECU according to the fifth embodiment.

Also, as shown in FIG. 21, the memory unit 194 of the zone ECU 104 differs from the fourth embodiment in that the diagnosis mask table 207 is omitted. Also, the memory unit 214 of the zone ECU 105 differs from the fourth embodiment in that the diagnosis mask table 227 is omitted.

Figure 22:
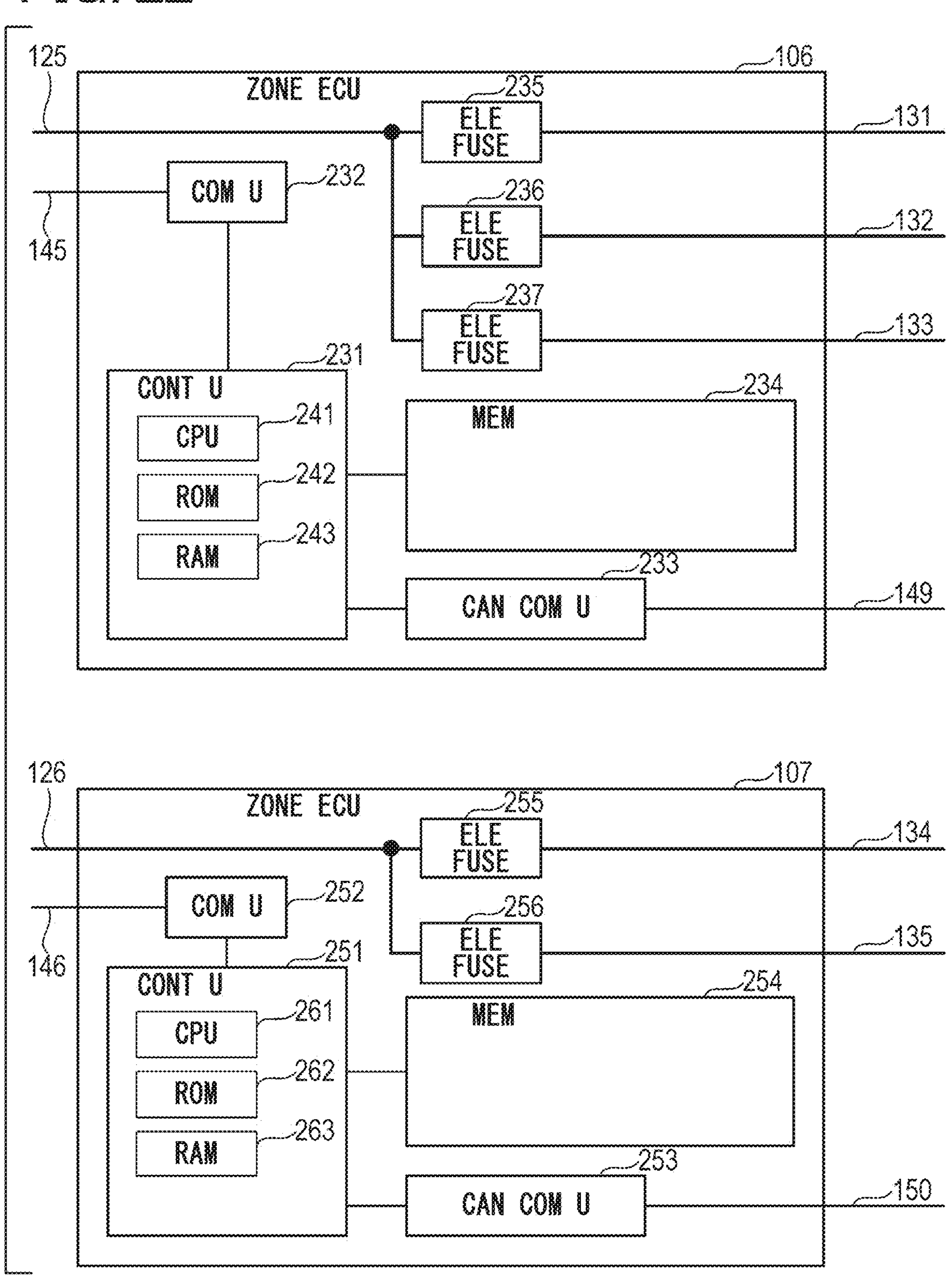
FIG. 22 is a second block diagram showing the configuration of the zone ECU according to the fifth embodiment.

Also, as shown in FIG. 22, the memory unit 234 of the zone ECU 106 differs from the fourth embodiment in that the diagnosis mask table 247 is omitted. Also, the memory unit 254 of the zone ECU 107 differs from the fourth embodiment in that the diagnosis mask table 267 is omitted.

Figure 23:
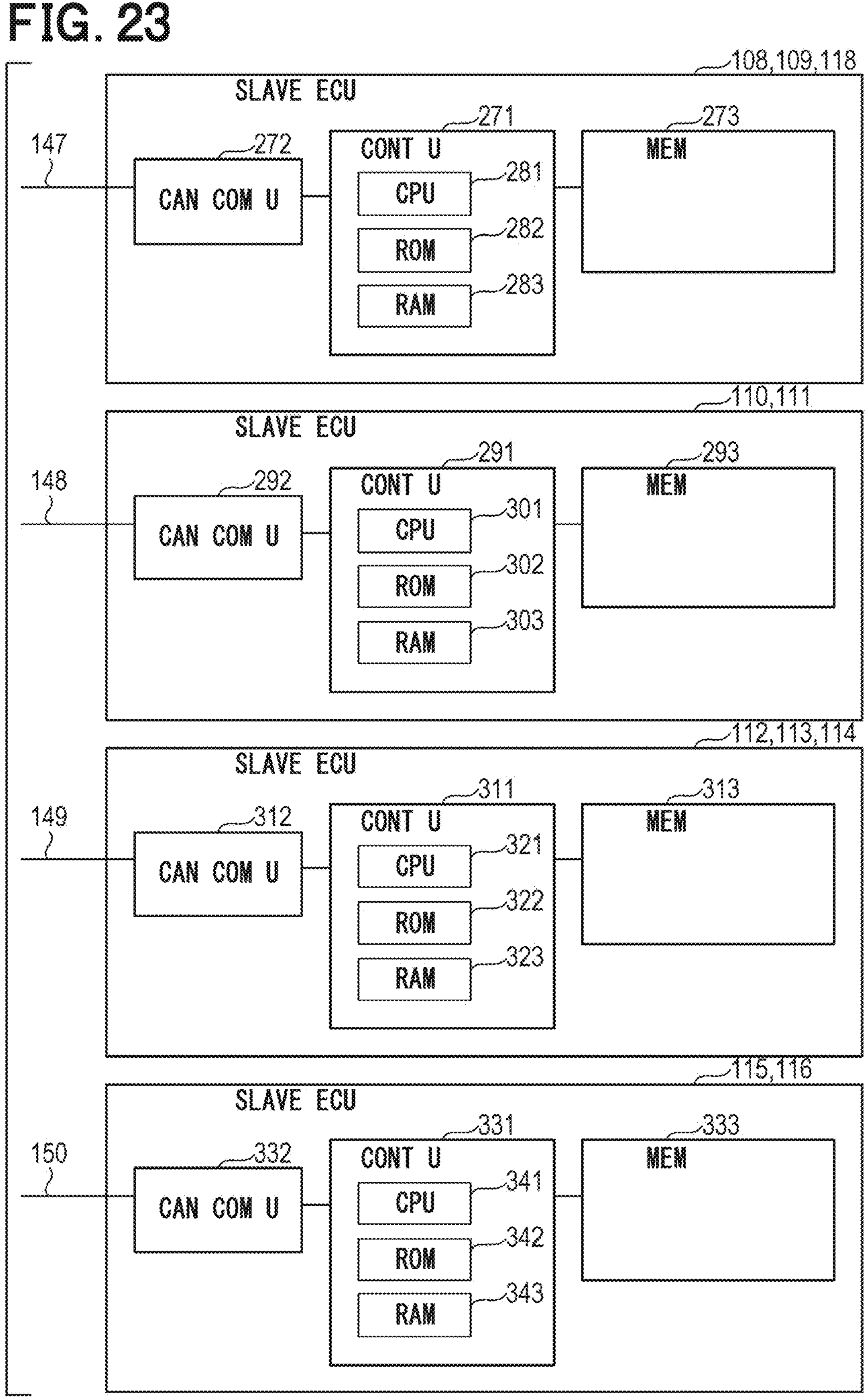
FIG. 23 is a block diagram showing a configuration of a slave ECU according to a fifth embodiment.

Also, as shown in FIG. 23, the memory unit 273 of the slave ECUs 108, 109 and 118 differs from the fourth embodiment in that the diagnosis mask table 287 is omitted. Also, the memory unit 293 of the slave ECUs 110 and 111 differs from the fourth embodiment in that the diagnosis mask table 307 is omitted.

Also, the memory unit 313 of the slave ECUs 112, 113 and 114 differs from the fourth embodiment in that the diagnosis mask table 327 is omitted. Also, the memory unit 333 of the slave ECUs 115 and 116 differs from the fourth embodiment in that the diagnosis mask table 347 is omitted.

Figure 24:
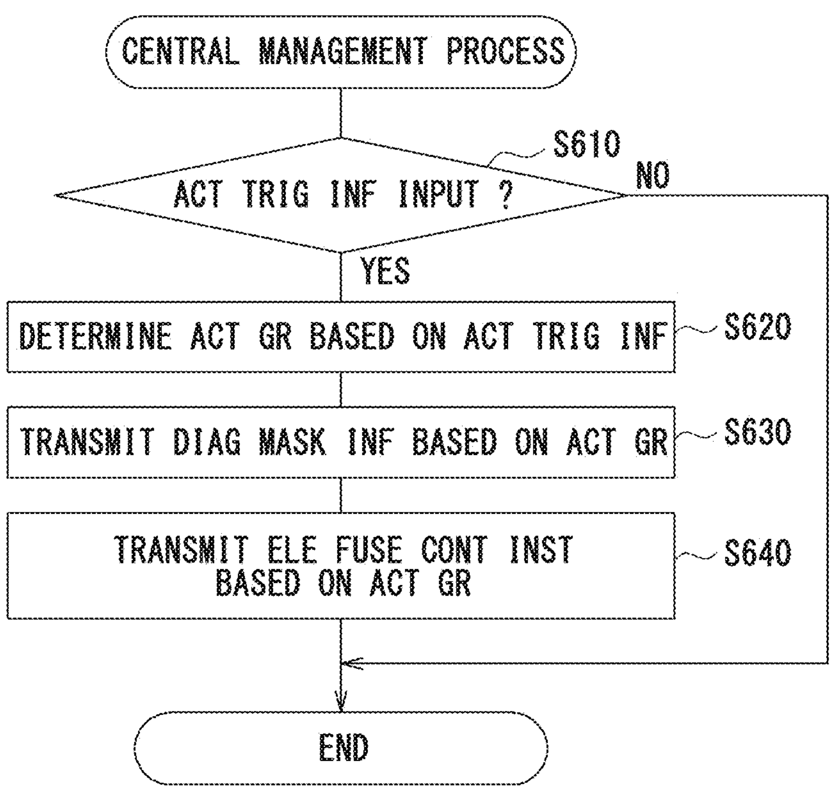
FIG. 24 is a flowchart showing a central management process according to a fifth embodiment.

Next, the procedure of the central management process of the fifth embodiment will be described. When the central management process according to the fifth embodiment is executed, as shown in FIG. 24, the CPU 161 of the control unit 151 determines whether activation trigger information (i.e., NM frame or event occurrence information) has been input to the central ECU 101 in S610.

Here, if the activation trigger information has not been input, the CPU 161 ends the central management process. On the other hand, if the activation trigger information is input, the CPU 161 determines the activation group based on the input activation trigger information in S620.

At S630, the CPU 161 refers to the diagnosis mask table 167 based on the activation group determined at S620, and generates diagnosis mask information. For example, when the activation group is the second communication group, the activation and stop combination related to the second communication group is extracted from the diagnostic mask table 167 and used as diagnosis mask information. The CPU 161 transmits the generated diagnosis mask information to the zone ECUs 104, 105, 106, and 107.

In S640, the CPU 161 refers to the activation table 165 and transmits the electronic fuse control instruction to the upstream electric power distribution units 102, 103 and the zone ECUs 104, 105, 106, and 107, and ends the central management process. The electronic fuse control instruction includes an instruction to turn on the electronic fuse corresponding to the activation group determined in S620 and an instruction to turn off the electronic fuses other than the electronic fuses corresponding to the activation group.

Figure 25:
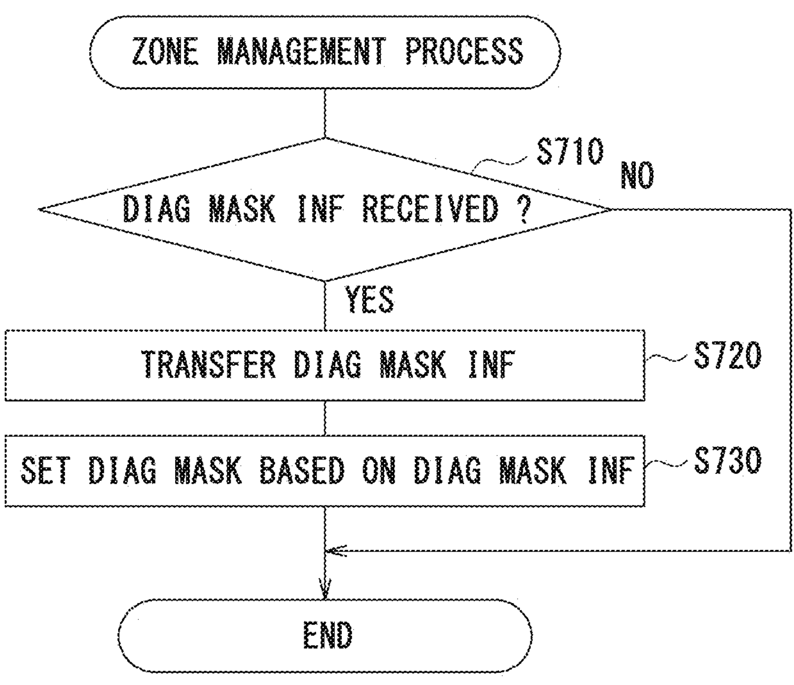
FIG. 25 is a flowchart showing a zone management process according to the fifth embodiment.

Next, the procedure of the zone management process of the fifth embodiment will be described. When the zone management process of the fifth embodiment is executed, the CPUs 201, 221, 241, and 261 of the control units 191, 211, 231, and 251 determine in S710 whether or not the diagnosing mask information has been received, as shown in FIG. 25. If no diagnosis mask information has been received, the CPU 201, 221, 241, 261 ends the zone management process.

On the other hand, if the diagnosis mask information has been received, the CPU 201, 221, 241, 261 transfers the received diagnosis mask information to the slave ECU in control of the CPU at S720.

In step S730, the CPUs 201, 221, 241, and 261 set a diagnosis mask based on the received diagnosis mask information, and then end the zone management process. Next, a procedure of slave management process according to the fifth embodiment will be described.

Figure 26:
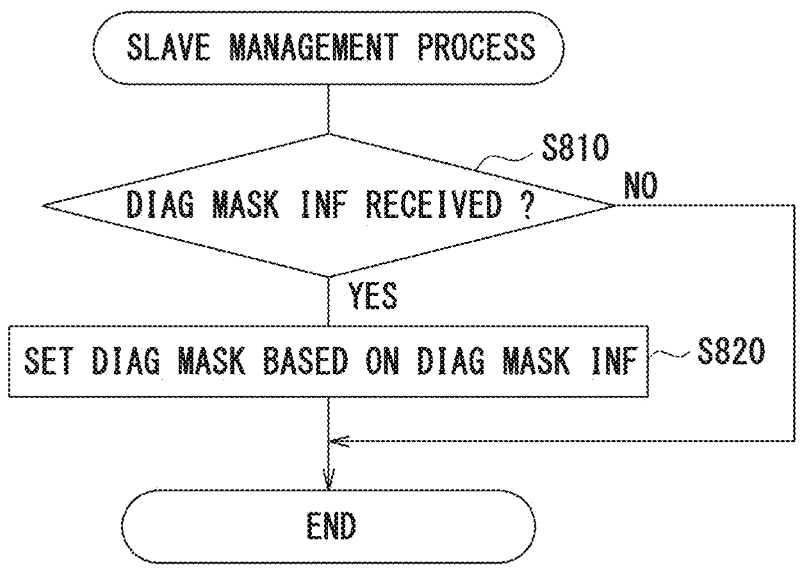
FIG. 26 is a flowchart illustrating a slave management process according to the fifth embodiment.

When the slave management process of the fifth embodiment is executed, the CPU 281 of the control unit 271 determines in S810 whether or not diagnosis mask information has been received, as shown in FIG. 26. If the diagnosis mask information has not been received, the CPU 281 ends the slave management process.

On the other hand, if the diagnosis mask information has been received, the CPU 281 sets a diagnosis mask based on the received diagnosis mask information in S820, and ends the slave management process.

The central ECU 101 of the communication system 100 configured in this manner stores the diagnosis mask table 167. In the diagnosis mask table 167, one or more combinations of the communication group, the cutoff device, the sleep device, and the not-received frame ID (that is, the activation stop combinations) are set.

When the central ECU 101 acquires the activation trigger information, the central ECU 101 is configured to determine the activation group based on the acquired activation trigger information. The central ECU 101 is configured to transmit the activation stop combination corresponding to the determined activation group to the zone ECU 104 as diagnosis mask information.

The zone ECU 104 is configured to transfer the diagnosis mask information received from the central ECU 101 to the slave ECU 108 and the slave ECU 109. In such a communication system 100, the slave ECU 109 recognizes the combination of the cut-off device and the non-received frame ID, and the combination of the sleep device and the non-received frame ID, based on the diagnosis mask information received from the zone ECU 104. Therefore, even if the slave ECU 109 is unable to receive a CAN frame from the slave ECU 108 because the electric power supply via the electronic fuse 195 is cut off in the ECU 108, the slave ECU 108 can suppress the occurrence of a situation in which it is determined that an anomaly due to the communication interruption has occurred in the slave ECU 108. Furthermore, even if the slave ECU 109 cannot receive a CAN frame from the slave ECU 108 that is in a sleep state, it is possible to suppress the occurrence of a situation in which it is determined that an anomaly due to the communication interruption has occurred in the slave ECU 108. Thereby, the communication system 100 can improve a detection accuracy of anomaly. Here, the zone ECU 104 also achieves the same effect as the slave ECU 109 by using the diagnosis mask information received from the central ECU 101.

In the embodiment described above, S620 corresponds to the processing performed by the group determination unit, S630 corresponds to the processing performed by the sleep mask information transmission unit, and S720 corresponds to the processing performed by the mask information transfer unit.

Sixth Embodiment

Hereinafter, a sixth embodiment according to the present disclosure will be described with reference to the drawings. In the sixth embodiment, portions different from those of the fourth embodiment will be described. The same reference numerals are given to common components.

As shown in FIG. 27, the communication system 100 of the sixth embodiment is different from the fourth embodiment in that the configuration of the activation table 165 included in the central ECU 101 is changed. That is, in the activation table 165 of the sixth embodiment, an activation group is set for each event. In other words, the activation table 165 of the sixth embodiment does not have a corresponding relationship between an activation group and a slave ECU to be put into a wake-up state.

Figure 28:
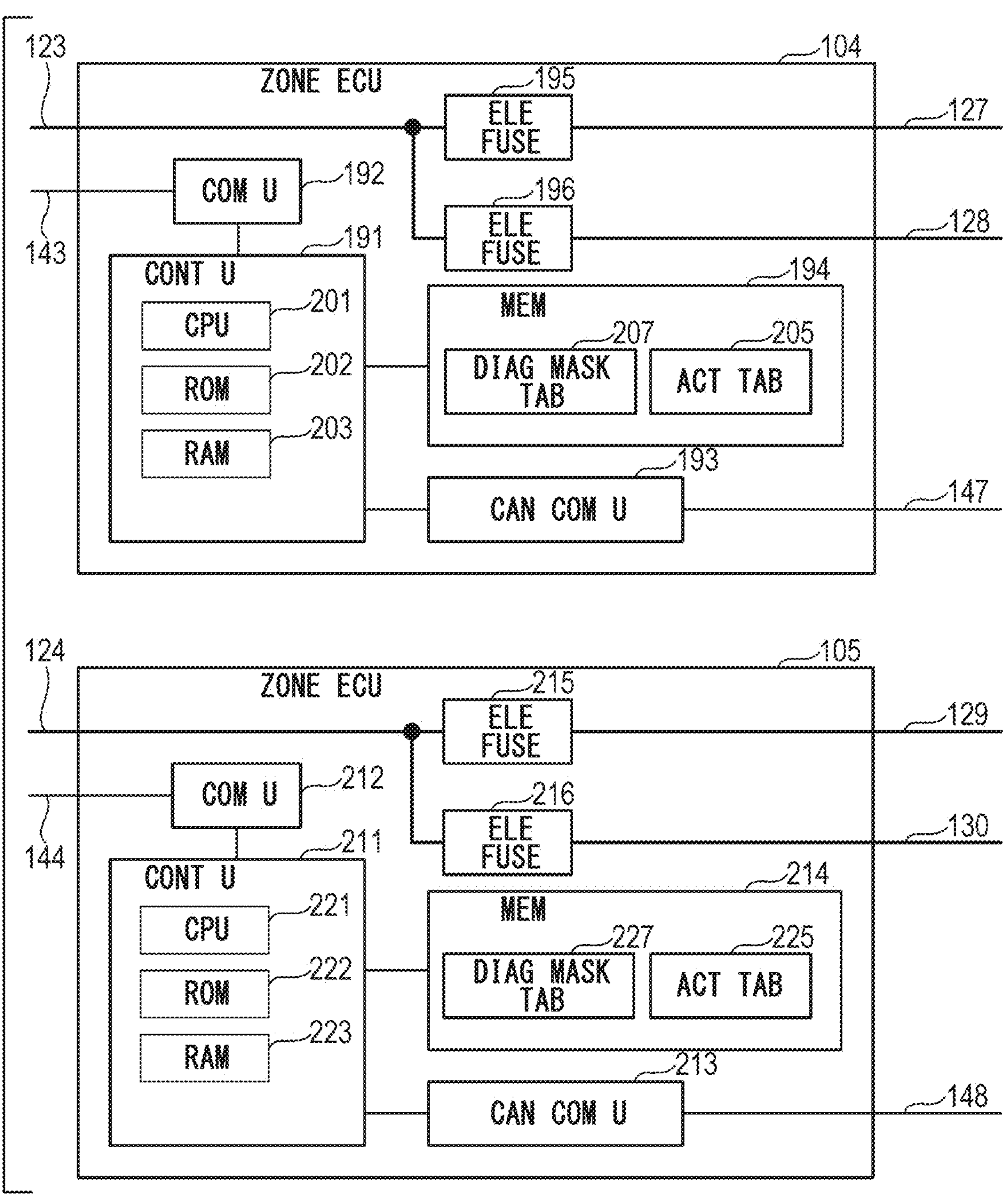
FIG. 28 is a second block diagram showing the configuration of the zone ECU according to the sixth embodiment.

As shown in FIG. 28, the sixth embodiment is different from the fourth embodiment in that the storage unit 194 of the zone ECU 104 further stores an activation table 205, which will be described later. The sixth embodiment differs from the fourth embodiment in that the memory unit 214 of the zone ECU 105 further stores an activation table 225, which will be described later.

Figure 29:
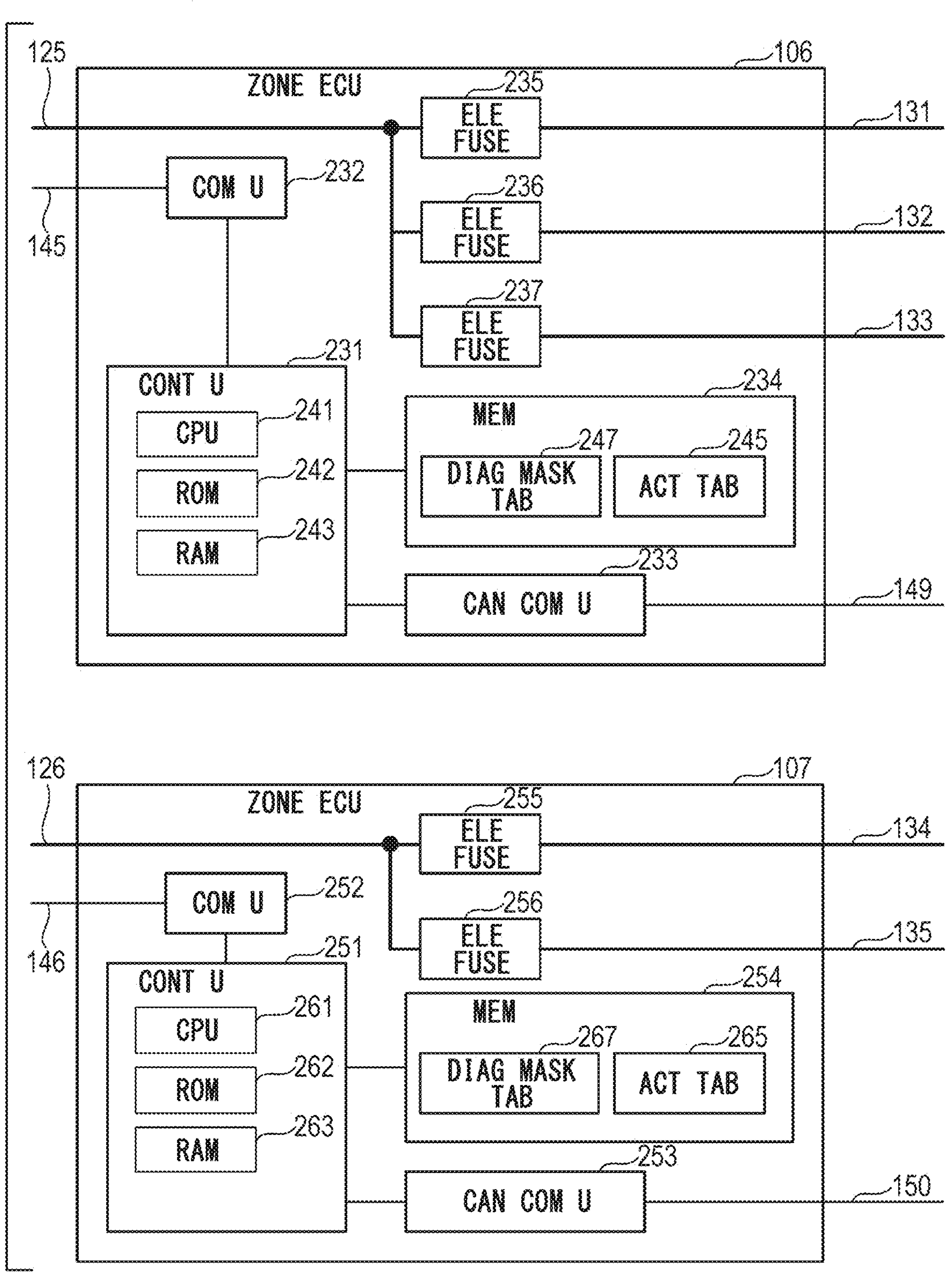
FIG. 29 is a second block diagram showing the configuration of the zone ECU according to the sixth embodiment.

As shown in FIG. 29, the sixth embodiment differs from the fourth embodiment in that the memory unit 234 of the zone ECU 106 further stores an activation table 245, which will be described later. The sixth embodiment differs from the fourth embodiment in that the memory unit 254 of the zone ECU 107 further stores an activation table 265, which will be described later.

As shown in FIG. 27, in the activation table 205, for the slave ECUs 108, 109, and 118 in control of the zone ECU 104, a correspondence relationship between an activation group and a slave ECU to be put into a wake-up state is set. The activation table 205 further includes a correspondence relationship between the slave ECUs 108, 109 and 118 and the electronic fuse connected to the slave ECUs 108, 109 and 118.

In the activation table 225, for the slave ECUs 110 and 111 in control of the zone ECU 105, a correspondence relationship is set between an activation group and a slave ECU to be put into a wake-up state. The activation table 225 further includes a correspondence relationship between the slave ECUs 110 and 111 and the electronic fuse connected to the slave ECUs 110 and 111.

In the activation table 245, for the slave ECUs 112, 113 and 114 in control of the zone ECU 106, a correspondence relationship between an activation group and a slave ECU to be put into a wake-up state is set. The activation table 225 further includes a correspondence relationship between the slave ECUs 112, 113 and 114 and the electronic fuse connected to the slave ECUs 112, 113 and 114.

In the activation table 265, for the slave ECUs 115 and 116 in control of the zone ECU 107, a correspondence relationship is set between an activation group and a slave ECU to be put into a wake-up state. The activation table 265 further includes a correspondence relationship between the slave ECUs 115 and 116 and the electronic fuse connected to the slave ECUs 115 and 116.

Also, the sixth embodiment differs from the fourth embodiment in that the configurations of the diagnosis mask tables 207, 227, 247, 267, 287, 307, 327, and 347 have been changed. As shown in FIG. 30, in the diagnosis mask tables 207 and 287, for the slave ECUs 108, 109, and 118 in control of the zone ECU 104, the correspondence relationship between the activation group, the cut-off device, the sleep device, and the non-received frame ID is set.

In the diagnosis mask tables 227 and 307, for the slave ECUs 110 and 111 in control of the zone ECU 105, the correspondence relationship between the activation group, the cut-off device, the sleep device, and the non-received frame ID is set.

In the diagnosis mask tables 247 and 327, the correspondence relationship between the activation group, the cut-off device, the sleep device, and the non-received frame ID is set for the slave ECUs 112, 113, and 114 in control of the zone ECU 106.

In the diagnosis mask tables 267 and 347, for the slave ECUs 115 and 116 in control of the zone ECU 107, the correspondence relationship between the activation group, the cut-off device, the sleep device, and the non-received frame ID is set.

Also, the sixth embodiment differs from the fourth embodiment in that the central management process and the zone management process have been changed. Next, the procedure of the central management process of the sixth embodiment will be described.

Figure 31:
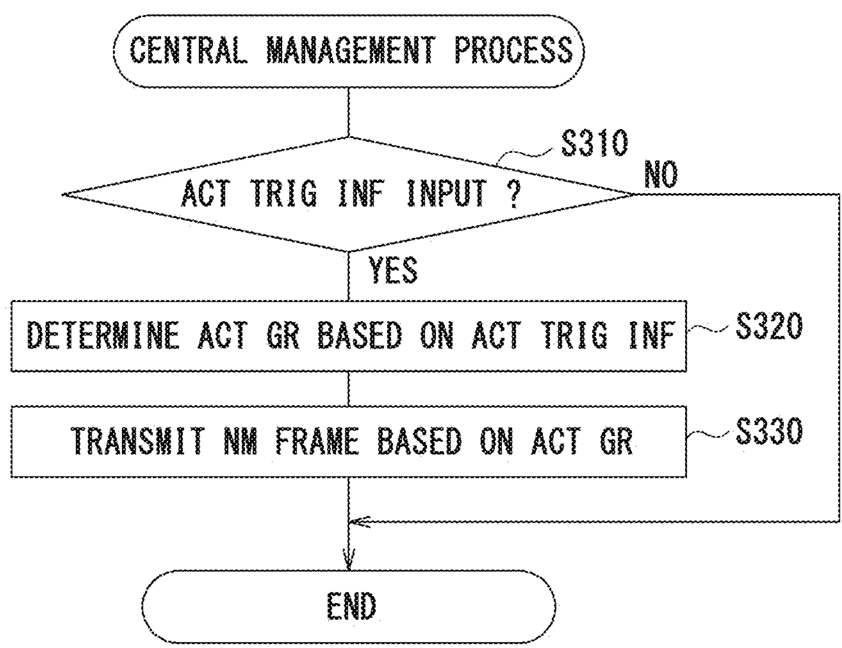
FIG. 31 is a flowchart showing a central management process according to a sixth embodiment.

As shown in FIG. 31, the central management process of the sixth embodiment differs from that of the fourth embodiment in that the process of S340 is omitted. That is, when the process of S330 ends, the CPU 161 ends the central management process.

Figure 32:
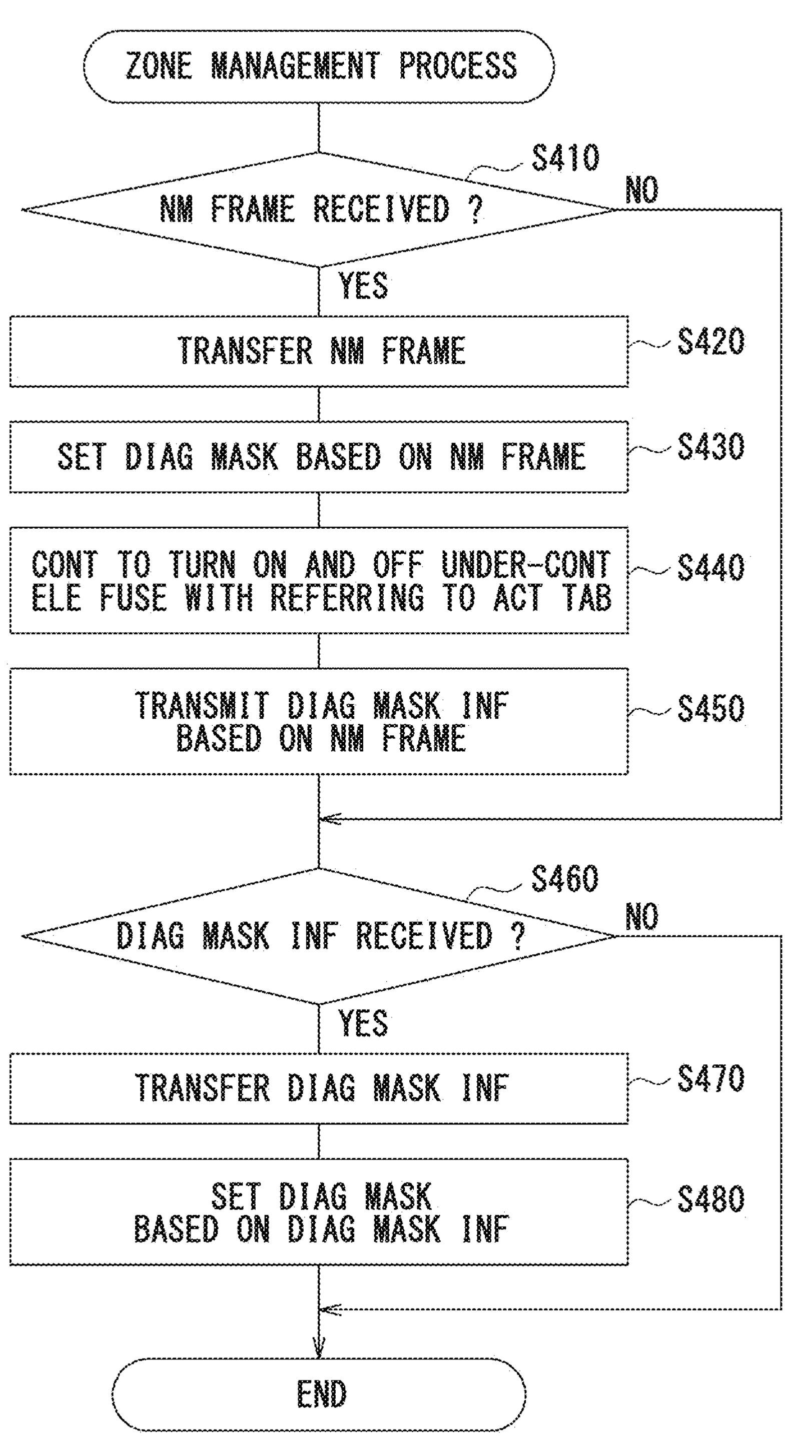
FIG. 32 is a flowchart showing a zone management process according to the sixth embodiment.

Next, the procedure of the zone management process of the sixth embodiment will be described. The zone management process of the sixth embodiment differs from the fourth embodiment in that the processes of S440 to S480 are added, as shown in FIG. 32.

That is, if an NM frame has not been received in S410, the CPUs 201, 221, 241, 261 proceed to S460. Also, when the processing of S430 is completed, the CPUs 201, 221, 241, and 261 refer to the activation tables 205, 225, 245, and 265 in S440 to execute electronic fuse control for the slave ECUs in control of the CPUs, in which the electronic fuses corresponding to the activation group indicated by the NM frame are turned on, and electronic fuses other than the electronic fuses corresponding to the activation group are turned off.

In S450, the CPUs 201, 221, 241, and 261 generate diagnosis mask information by referring to the diagnosis mask tables 207, 227, 247, and 267 based on the activation group indicated by the received NM frame. The CPUs 201, 221, 241, and 261 transmit the generated diagnosis mask information to the other zone ECUs via the central ECU 101, and proceed to S460.

When the process proceeds to S460, the CPU 201, 221, 241, 261 determines whether or not the CPU 201, 221, 241, 261 has received the diagnosis mask information transmitted from another zone ECU. If no diagnosis mask information has been received, the CPU 201, 221, 241, 261 ends the zone management process.

On the other hand, if the diagnosis mask information has been received, the CPU 201, 221, 241, 261 transfers the received diagnosis mask information to the slave ECU in control of the CPU at S470.

In step S480, the CPUs 201, 221, 241, and 261 refer to the diagnosis mask information transmitted from the other zone ECUs and perform additional setting of the diagnosis mask. For example, the CPU 201 can refer to the diagnosis mask table 207 to generate the diagnosis mask information related to the slave ECUs 108, 109 and 118. However, since it is not possible to generate diagnosis mask information for slave ECUs other than these slave ECUs 108, 109, and 118, the diagnosis mask is set using the diagnosis mask information transmitted from other zone ECUs.

When the CPUs 201, 221, 241, and 261 have set the diagnosis mask information for all the slave ECUs, the CUPs end the zone management process. The slave ECUs 108, 109, and 118 use the NM frame transmitted from the zone ECU 104 to refer to the diagnosis mask table 287 to set the diagnosis mask. In addition, the slave ECUs 108, 109, and 118 use the diagnosis mask information transmitted from the zone ECU 104 to additionally set a diagnosis mask.

Similarly, the slave ECUs 110 and 111 use the NM frame transmitted from the zone ECU 105 to refer to the diagnosis mask table 307 to set the diagnosis mask. In addition, the slave ECUs 110 and 111 use the diagnosis mask information transmitted from the zone ECU 105 to additionally set a diagnosis mask.

The slave ECUs 112, 113 and 114 use the NM frame transmitted from the zone ECU 106 to refer to the diagnosis mask table 327 to set the diagnosis mask. In addition, the slave ECUs 112, 113 and 114 use the diagnosis mask information transmitted from the zone ECU 105 to additionally set a diagnosis mask.

The slave ECUs 115 and 116 use the NM frame transmitted from the zone ECU 107 to refer to the diagnosis mask table 347 to set the diagnosis mask. In addition, the slave ECUs 115 and 116 use the diagnosis mask information transmitted from the zone ECU 107 to additionally set a diagnosis mask.

The communication system 100 thus configured includes a central ECU 101, zone ECUs 104 to 107, and slave ECUs 108 to 116, 118 that are connected to each other so as to be able to transmit and receive communication frames.

The zone ECU 104 and the slave ECUs 108 and 109 store the diagnosis mask tables 207 and 287. In the diagnostic mask tables 207 and 287, one or more combinations of the communication group, the cut-off device, the sleep device, and the non-received frame ID (hereinafter, "activation stop combinations") are set for the slave ECUs 108 and 109 in control of the zone ECU 104.

The central ECU 101 is configured to determine the activation group based on the acquired activation trigger information upon acquiring the activation trigger information for determining the communication group to be brought into the wake-up state (i.e., the activation group described above).

The central ECU 101 is configured to transmit an NM frame indicating the determined activation group to the zone ECU 104. The zone ECU 104 is configured to transfer the NM frame received from the central ECU 101 to the slave ECUs 108 and 109.

In such a communication system 100, the slave ECU 109 refers to the diagnosis mask table 287 based on the activation group indicated by the NM frame received from the zone ECU 104, thereby recognizing the combination of the above-described cutoff device and the non-received frame ID, and the combination of the above-described sleep device and the non-received frame ID. Therefore, even if the slave ECU 109 is unable to receive a CAN frame from the slave ECU 108 because the electric power supply via the electronic fuse 195 is cut off in the ECU 108, the slave ECU 108 can suppress the occurrence of a situation in which it is determined that an anomaly due to the communication interruption has occurred in the slave ECU 108. Furthermore, even if the slave ECU 109 cannot receive a CAN frame from the slave ECU 108 that is in a sleep state, it is possible to suppress the occurrence of a situation in which it is determined that an anomaly due to the communication interruption has occurred in the slave ECU 108. Thereby, the communication system 100 can improve a detection accuracy of anomaly.

In the embodiment described above, S320 corresponds to the processing performed by the group determination unit, S330 corresponds to the processing performed by the activation group transmission unit, and S420 corresponds to the processing performed by the frame transfer unit.

Seventh Embodiment

Hereinafter, a seventh embodiment according to the present disclosure will be described with reference to the drawings. In the seventh embodiment, portions different from those of the fifth embodiment will be described. The same reference numerals are given to common components.

Figure 33:
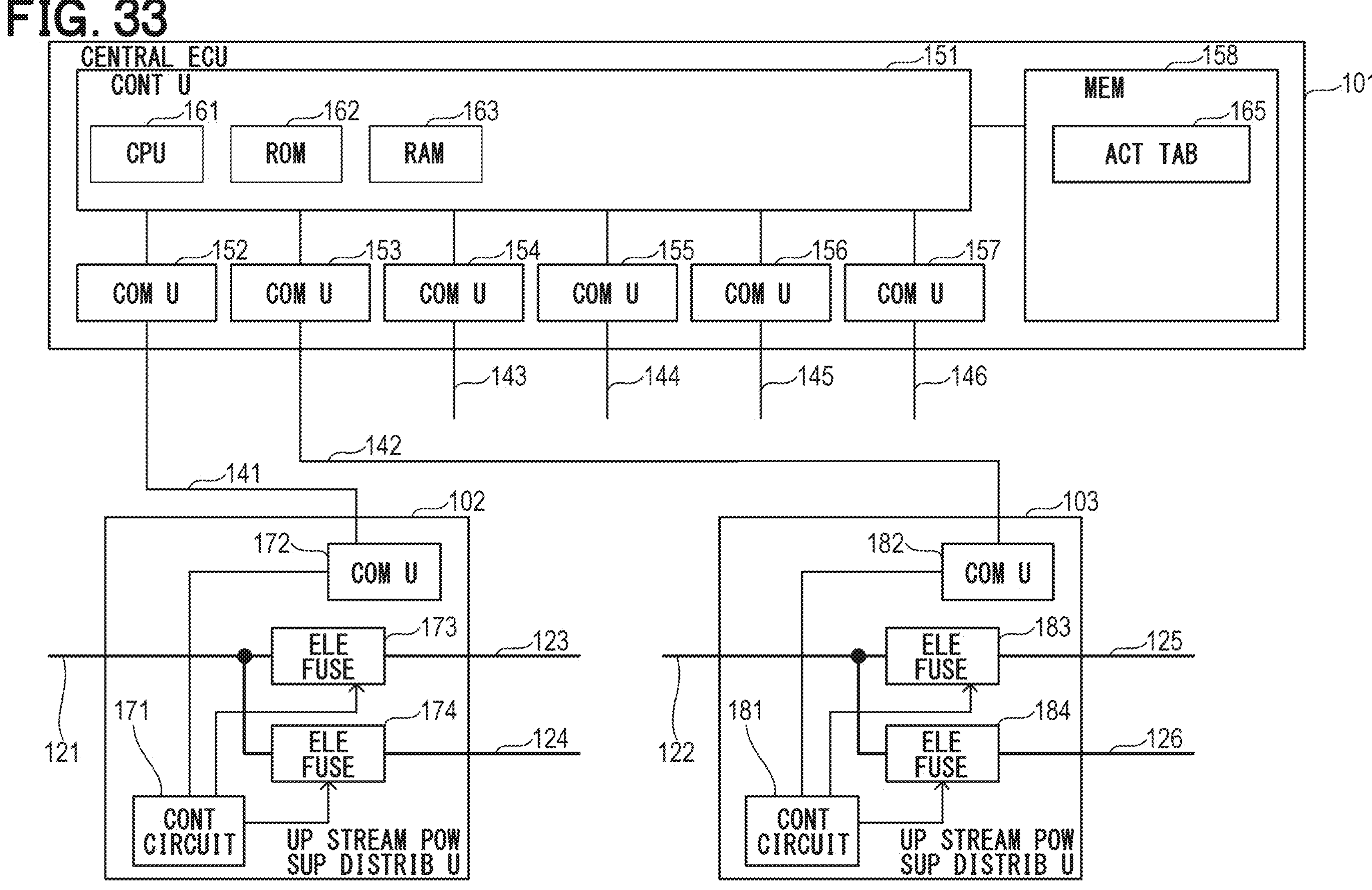
FIG. 33 is a block diagram showing the configuration of a central ECU and an upstream electric power distribution unit according to a seventh embodiment.

As shown in FIG. 33, the communication system 100 of the seventh embodiment differs from the fifth embodiment in that the diagnosis mask table 167 is omitted in the memory unit 158 of the central ECU 101.

Figure 34:
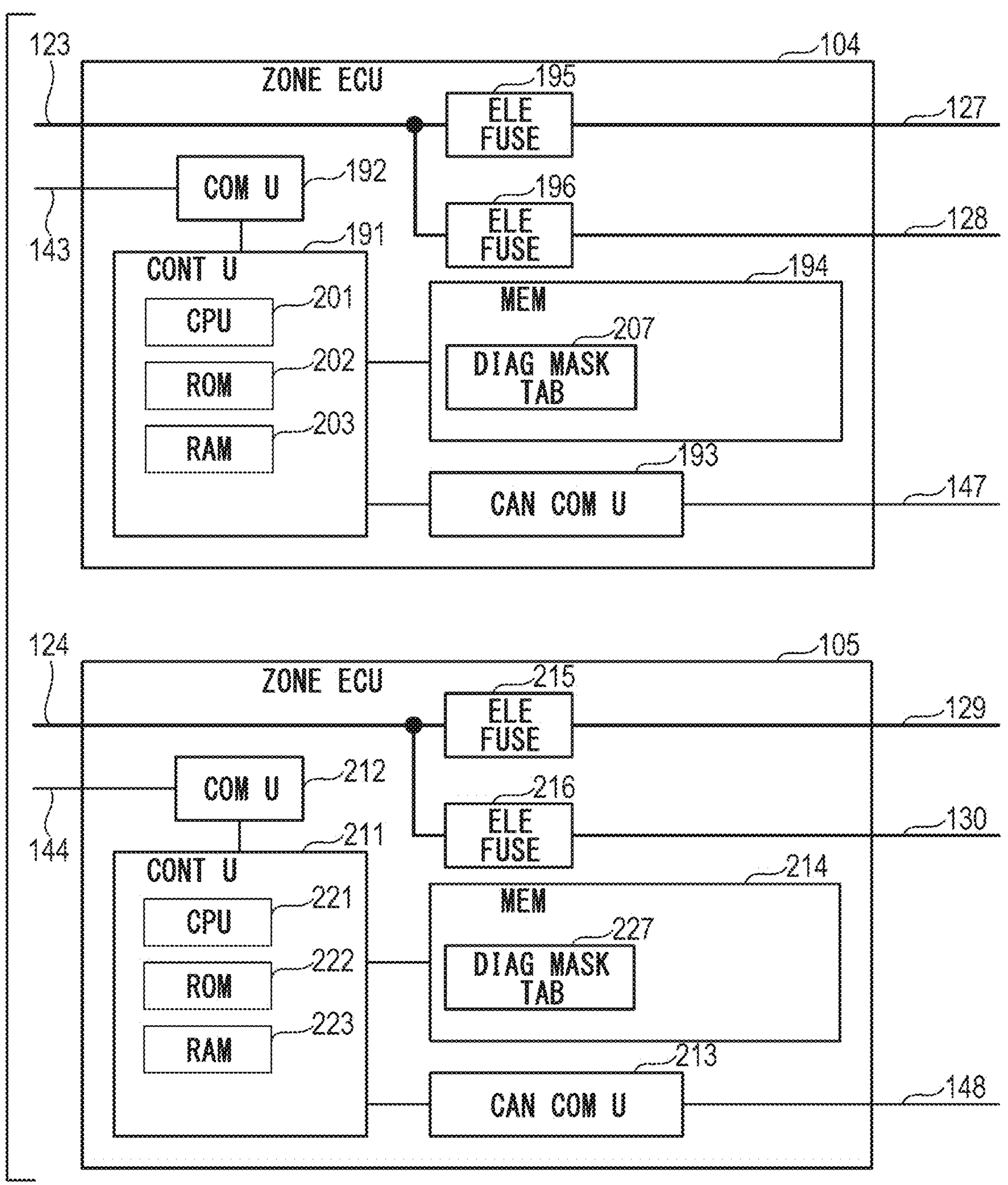
FIG. 34 is a first block diagram showing the configuration of the zone ECU according to the seventh embodiment.

As shown in FIG. 34, the seventh embodiment differs from the fifth embodiment in that the memory unit 194 of the zone ECU 104 stores a diagnosis mask table 207 similar to that of the sixth embodiment.

The seventh embodiment differs from the fifth embodiment in that the memory unit 214 of the zone ECU 105 stores a diagnosis mask table 227 similar to that of the sixth embodiment.

Figure 35:
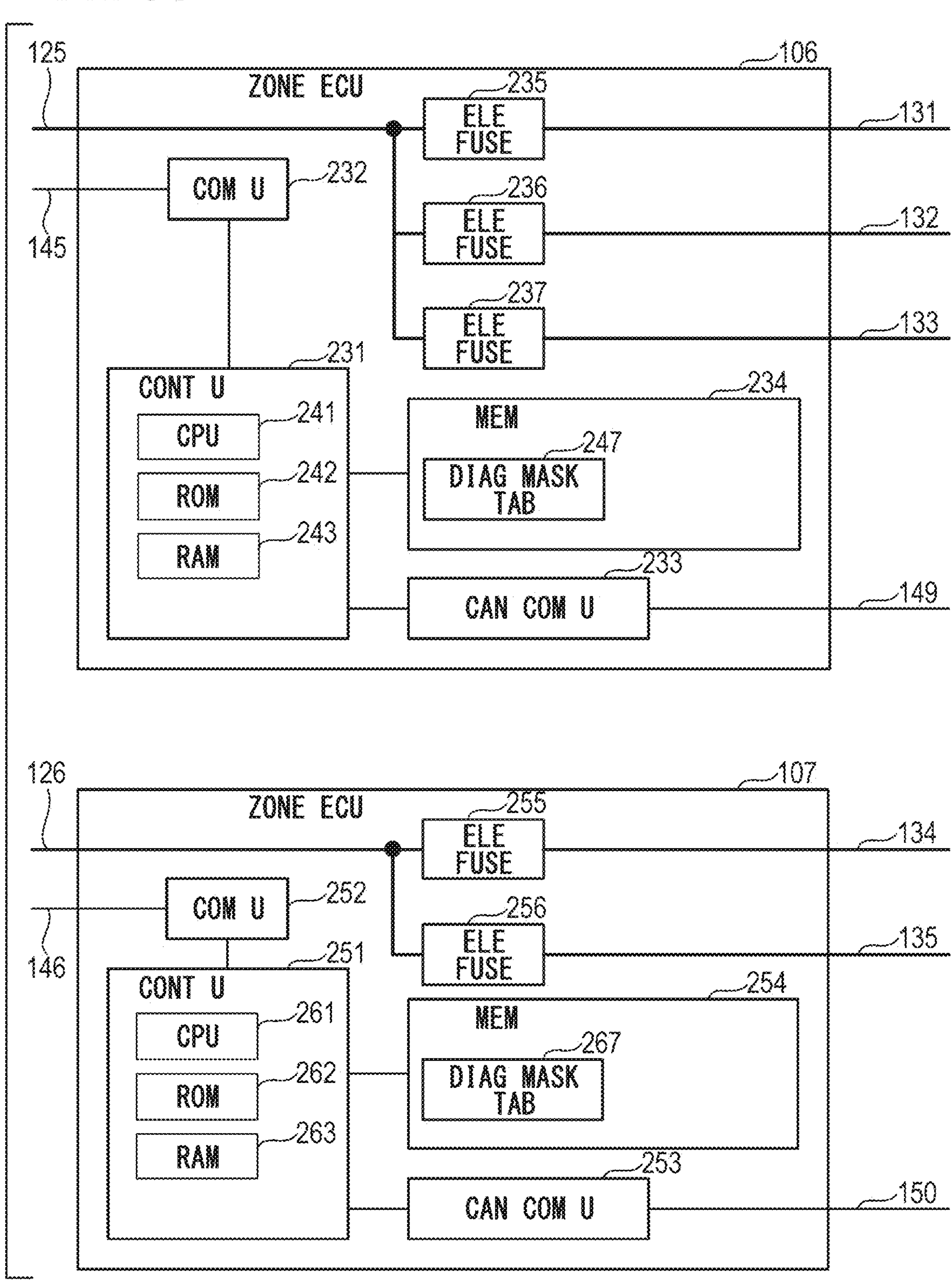
FIG. 35 is a second block diagram showing the configuration of the zone ECU according to the seventh embodiment.

As shown in FIG. 35, the seventh embodiment differs from the fifth embodiment in that the memory unit 234 of the zone ECU 106 stores a diagnosis mask table 247 similar to that of the sixth embodiment. The seventh embodiment differs from the fifth embodiment in that the memory unit 254 of the zone ECU 107 stores a diagnosis mask table 267 similar to that of the sixth embodiment.

Also, the seventh embodiment differs from the fifth embodiment in that the central management process and the zone management process have been changed. Next, the procedure of the central management process of the seventh embodiment will be described.

Figure 36:
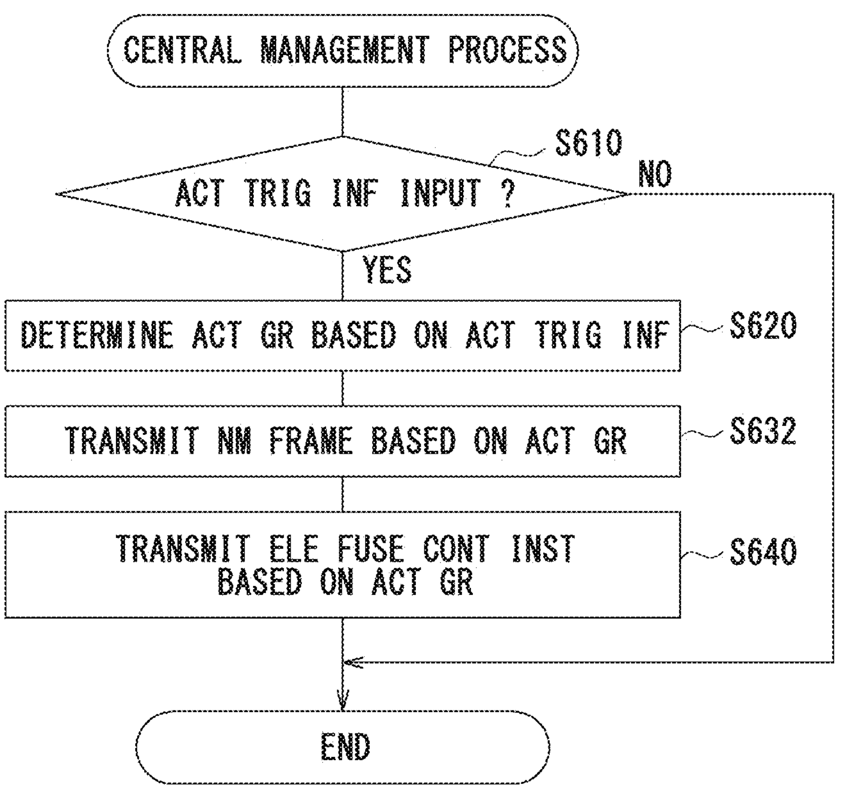
FIG. 36 is a flowchart showing a central management process according to a seventh embodiment.

As shown in FIG. 36, the central management process of the seventh embodiment differs from that of the fifth embodiment in that the process of S632 is executed instead of S630. That is, when the process of S620 ends, the CPU 161, in S632, refers to the activation table 165 based on the activation group determined in S620, and generates an NM frame. The CPU 161 transmits the generated NM frame to the zone ECUs 104, 105, 106, and 107, and proceeds to S640.

Figure 37:
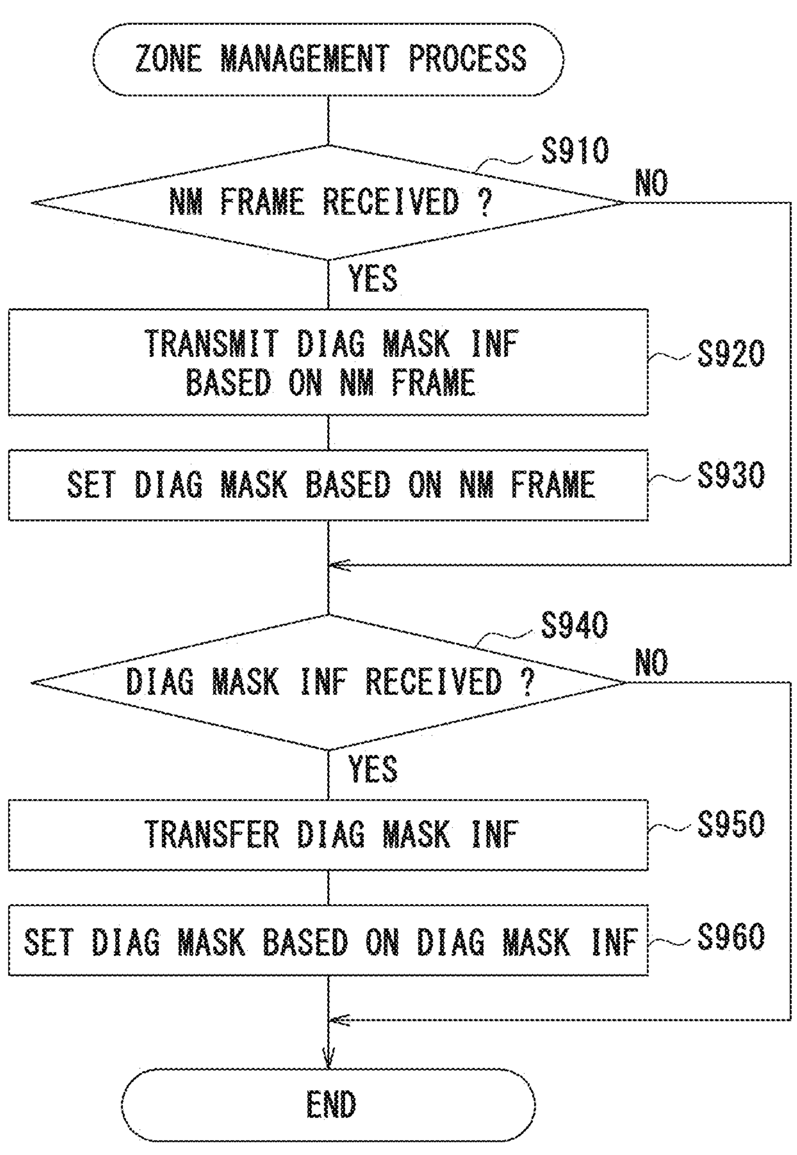
FIG. 37 is a flowchart showing a zone management process according to the seventh embodiment.

Next, the procedure of the zone management process of the seventh embodiment will be described. When the zone management process is executed, the CPUs 201, 221, 241, and 261 determine in S910 whether or not an NM frame has been received, as shown in FIG. 37. If an NM frame has not been received, the CPU 201, 221, 241, 261 ends the zone management process.

On the other hand, when an NM frame is received, the CPU 201, 221, 241, 261 generates diagnosis mask information based on the activation group indicated by the NM frame by referring to the diagnosis mask table 207, 227, 247, 267 in S420. The CPUs 201, 221, 241, and 261 transmit the generated diagnosis mask information to the slave ECUs in control of the CPUs, and also transmit the generated diagnosis mask information to other zone ECUs via the central ECU 101.

In S930, the CPUs 201, 221, 241, and 261 refer to the diagnosis mask tables 207, 227, 247, and 267 to set a diagnosis mask based on the received NM frame.

The CPU 201, 221, 241, 261 determines at S940 whether or not the CPU 201, 221, 241, 261 has received the diagnosis mask information transmitted from another zone ECU. If no diagnosis mask information has been received, the CPU 201, 221, 241, 261 ends the zone management process.

On the other hand, if the diagnosis mask information has been received, the CPU 201, 221, 241, 261 transfers the received diagnosis mask information to the slave ECU in control of the CPU at S950.

In step S960, the CPUs 201, 221, 241, and 261 refer to the diagnosis mask information transmitted from the other zone ECUs and perform additional setting of the diagnosis mask. For example, the CPU 201 can refer to the diagnosis mask table 207 to generate the diagnosis mask information related to the slave ECUs 108, 109 and 118. However, since it is not possible to generate diagnosis mask information for slave ECUs other than these slave ECUs 108, 109, and 118, the diagnosis mask is set using the diagnosis mask information transmitted from other zone ECUs.

When the CPUs 201, 221, 241, and 261 have set the diagnosis mask information for all the slave ECUs, the CUPs end the zone management process. The zone ECU 104 of the communication system 100 configured in this manner stores the diagnosis mask table 207. In the diagnostic mask table 207, one or more combinations of the communication group, the cut-off device, the sleep device, and the non-received frame ID (hereinafter, "activation stop combinations") are set for the slave ECUs 108 and 109 in control of the zone ECU 104.

When the central ECU 101 acquires the activation trigger information, the central ECU 101 is configured to determine the activation group based on the acquired activation trigger information. The central ECU 101 is configured to transmit an NM frame indicating the determined activation group to the zone ECU 104.

The zone ECU 104 is configured to transmit a start stop combination corresponding to the activation group indicated by the NM frame transmitted from the central ECU 101 to the slave ECUs 108, 109, and 118 as diagnosis mask information. The zone ECU 104 also transmits this diagnosis mask information to the other zone ECUs 105, 106, and 107 via the central ECU 101. The zone ECU 104 sets the diagnosis mask based on this diagnosis mask information.

When the zone ECU 104 receives the diagnosis mask information transmitted from the other zone ECUs 105, 106, and 107, the zone ECU 104 transmits the diagnosis mask information to the slave ECUs 108, 109, and 118. The zone ECU 104 performs additional setting of the diagnosis mask based on the received diagnosis mask information.

In addition, the slave ECUs 108, 109 and 118 use the diagnosis mask information transmitted from the zone ECU 104 to set a diagnosis mask and to additionally set a diagnosis mask. In such a communication system 100, the slave ECU 109 recognizes the combination of the cut-off device and the non-received frame ID, and the combination of the sleep device and the non-received frame ID, based on the diagnosis mask information received from the zone ECU 104. Therefore, even if the slave ECU 109 is unable to receive a CAN frame from the slave ECU 108 because the electric power supply via the electronic fuse 195 is cut off in the ECU 108, the slave ECU 108 can suppress the occurrence of a situation in which it is determined that an anomaly due to the communication interruption has occurred in the slave ECU 108. Furthermore, even if the slave ECU 109 cannot receive a CAN frame from the slave ECU 108 that is in a sleep state, it is possible to suppress the occurrence of a situation in which it is determined that an anomaly due to the communication interruption has occurred in the slave ECU 108. Thereby, the communication system 100 can improve a detection accuracy of anomaly. Here, the zone ECU 104 also achieves the same effect as the slave ECU 109 by setting and additionally setting the diagnosis masks using the diagnosis mask information generated by the zone ECU 104 and the diagnosis mask information received from other zone ECUs.

In the embodiment described above, S620 corresponds to the processing performed by the group determination unit, S632 corresponds to the processing performed by the activation group transmission unit, and S920 corresponds to the processing performed by the mask information transmission unit.

Although one embodiment of the present disclosure has been described above, the present disclosure is not limited to the above embodiment, and various modifications can be made.

First Modification

In the above embodiment, a feature is described in which the electric power is supplied from the battery 7 via the electronic fuses 15 and 16. Alternatively, as long as the electric power supply path may be configured to be switched between a conductive state and a cutoff state, for example, it may also be a mechanical relay that opens and closes a mechanical contact using electromagnetic action.

The control units 11, 31, 41 and 91 and methods thereof described in the present disclosure may be implemented by a dedicated computer including a processor and memory programmed to perform one or more functions embodied by a computer program. Alternatively, the control units 11, 31, 41 and 91 and the method thereof described in the present disclosure may be implemented by a dedicated computer including a processor implemented by one or more dedicated hardware logic circuits. Alternatively, the control units 11, 31, 41 and 91 and the methods thereof described in the present disclosure may be implemented by one or more dedicated computers implemented by a combination of a processor and memory programmed to execute one or more functions, and a processor implemented by one or more hardware logic circuits. The computer program may be stored in a computer-readable non-transitory tangible storage medium as instructions to be executed by a computer. The methods of implementing the function of each part included in the control units 11, 31, 41 and 91 do not necessarily include software, and all the functions may be implemented using one or more pieces of hardware.

Multiple functions belonging to one configuration element in the above-described embodiment may be implemented by multiple configuration elements, or one function belonging to one configuration element may be implemented by multiple configuration elements. Multiple functions of multiple configuration elements may be implemented by one configuration element, or one function implemented by multiple configuration elements may be implemented by one configuration element. A part of the configuration of the above embodiments may be omitted as appropriate. At least a part of the configuration of the above embodiment may be added to or replaced with the configuration of another embodiment.

In addition to the ECUs 2 to 6, 101, 104-116, and 118 described above, various features such as a system including the ECUs 2 to 6, 101, 104-116 and 118 as a component, a program for causing a computer to function as the ECUs 2 to 6, 101, 104-116 and 118, a non-transitory tangible storage medium such as a semiconductor memory in which this program is stored, and a communication management method can also provide the present embodiments.

Technical Features Disclosed in Present Disclosure

Feature 1

A communication system includes: at least one of (i) a circuit and (ii) a processor having a memory storing computer program code. The at least one of the circuit and the processor having the memory is configured to cause the communication system to provide a plurality of electronic control devices connected to each other to transmit and receive a communication frame. Each of the plurality of electronic control devices belongs to at least one of a plurality of communication groups. The communication system is configured that one or more electronic control devices of the plurality of electronic control devices belonging to the at least one of the communication groups is switchable as a whole between a wake-up state and a sleep state for each of the communication groups individually. The plurality of electronic control devices include: a first control device that receives an electric power supply from a power source via an electric power supply switching unit configured to switch between a conduction state in which an electric power supply path is made conductive and a cutoff state in which the electric power supply path is cut off; a second control device that is connected to the first control device so as to transmit and receive the communication frame; and a third control device that is connected to the first control device and the second control device so as to transmit and receive the communication frame, and configured to control an operation of the electric power supply switching unit. The first control device and the second control device store a diagnosis mask table that defines one or more activation stop combinations of a communication group, one of the electronic control devices as a cutoff device to which the electric power supply via the electric power supply switching unit is cut off, another one of the electronic control devices as a sleep device that becomes the sleep state, and non-received frame identification information that is identification information of the communication frame not received. The third control device includes: a group determination unit that is configured to determine an activation group based on activation trigger information for determining the activation group as one of the plurality of communication groups to be set to the wake-up state upon receiving the activation trigger information; and an activation group transmission unit that is configured to transmit the communication frame indicating the activation group determined by the group determination unit as a management frame to the first control device and the second control device.

Second Feature

In the communication system according to feature 1, the first control device and the second control device set a diagnosis mask for the activation group indicated by the received management frame by referring to the diagnosis mask table.

Third Feature

In the communication system according to claim 1 or 2, upon acquiring updated diagnostic mask table, the third control device transmits the updated diagnostic mask table to the first control device and the second control device.

Fourth Feature

A communication system includes: at least one of (i) a circuit and (ii) a processor having a memory storing computer program code. The at least one of the circuit and the processor having the memory is configured to cause the communication system to provide a plurality of electronic control devices connected to each other to transmit and receive a communication frame. Each of the plurality of electronic control devices belongs to at least one of a plurality of communication groups. The communication system is configured that one or more electronic control devices of the plurality of electronic control devices belonging to the at least one of the communication groups is switchable as a whole between a wake-up state and a sleep state for each of the communication groups individually. The plurality of electronic control devices include: a first control device that receives an electric power supply from a power source via an electric power supply switching unit configured to switch between a conduction state in which an electric power supply path is made conductive and a cutoff state in which the electric power supply path is cut off; a second control device that is connected to the first control device so as to transmit and receive the communication frame; and a third control device that is connected to the first control device and the second control device so as to transmit and receive the communication frame, and configured to control an operation of the electric power supply switching unit. The third control device stores a diagnosis mask table that defines one or more activation stop combinations of a communication group, one of the electronic control devices as a cutoff device to which the electric power supply via the electric power supply switching unit is cut off, another one of the electronic control devices as a sleep device that becomes the sleep state, and non-received frame identification information that is identification information of the communication frame not received. The third control device includes: a group determination unit that is configured to determine an activation group based on activation trigger information for determining the activation group as one of the communication groups to be set to the wake-up state upon receiving the activation trigger information; and a sleep mask information transmission unit that is configured to transmit the activation stop combination corresponding to the activation group determined by the group determination unit to the first control device and the second control device as diagnostic mask information.

Fifth Feature

In the communication system according to feature 4, the first control device and the second control device set a diagnosis mask based on the received diagnosis mask information.

Sixth Feature

In the communication system according to claim 4 or 5, the diagnosis mask table further defines one or more switching unit combinations of the first control device that is supplied with the electric power via the electric power supply switching unit and the unreceived frame identification information. The third control device further includes a switching mask information transmission unit that is configured to transmit the one or more switching unit combinations to the second control device as the diagnosis mask information when the electric power supply switching unit switches from an on state to an off state.

Seventh Feature

In the communication system according to any one of claims 1 to 6, the activation trigger information includes the communication frame in which one bit is assigned to each of the plurality of communication groups, and the one bit corresponding to one of the communication groups to be set to the wake-up state is set to 1.

Eighth Feature

In the communication system according to any one of claims 1 to 6, the activation trigger information includes event occurrence information indicating that a preset event has occurred. The third control device has an activation table that associates one or more events with the activation group. Upon acquiring the event occurrence information, the group determination unit of the third control device determines the activation group by referring to the activation table.

Ninth Feature

In the communication system according to any one of claims 1 to 8, the electric power supply switching unit includes an electronic fuse.

Tenth Feature

A communication system includes: at least one of (i) a circuit and (ii) a processor having a memory storing computer program code. The at least one of the circuit and the processor having the memory is configured to cause the communication system to provide a plurality of electronic control devices connected to each other to transmit and receive a communication frame. Each of the plurality of electronic control devices belongs to at least one of a plurality of communication groups. The communication system is configured that one or more electronic control devices of the plurality of electronic control devices belonging to the at least one of the communication groups is switchable as a whole between a wake-up state and a sleep state for each of the communication groups individually. The plurality of electronic control devices include: a first slave control device that receives an electric power supply from a power source via an electric power supply switching unit configured to switch between a conduction state in which an electric power supply path is made conductive and a cutoff state in which the electric power supply path is cut off; a second slave control device connected to the first slave control device so as to be capable of transmitting and receiving the communication frame; a zone control device connected to the first slave control device and the second slave control device so as to be capable of transmitting and receiving the communication frame between the first slave control device and the second slave control device and configured to control an operation of the electric power supply switching unit; and a central control device connected to the zone control devices so as to be capable of transmitting and receiving the communication frame. The zone control device, the first slave control device, and the second slave control device store a diagnosis mask table that defines one or more activation stop combinations of a communication group, one of the electronic control devices as a cutoff device to which the electric power supply via the electric power supply switching unit is cut off, another one of the electronic control devices as a sleep device that becomes the sleep state, and non-received frame identification information that is identification information of the communication frame not received. The central control device includes: a group determination unit that is configured to determine an activation group based on activation trigger information for determining the activation group as one of the communication groups to be set to the wake-up state upon receiving the activation trigger information; and an activation group transmission unit that is configured to transmit the communication frame indicating the activation group determined by the group determination unit as a management frame to the zone control device. The zone control device includes: a frame transfer unit configured to transfer the management frame received from the central control device to the first slave control device and the second slave control device.

Eleventh Feature

A communication system includes: at least one of (i) a circuit and (ii) a processor having a memory storing computer program code. The at least one of the circuit and the processor having the memory is configured to cause the communication system to provide a plurality of electronic control devices connected to each other to transmit and receive a communication frame. Each of the plurality of electronic control devices belongs to at least one of a plurality of communication groups. The communication system is configured that one or more electronic control devices of the plurality of electronic control devices belonging to the at least one of the communication groups is switchable as a whole between a wake-up state and a sleep state for each of the communication groups individually. The plurality of electronic control devices include: a first slave control device that receives an electric power supply from a power source via an electric power supply switching unit configured to switch between a conduction state in which an electric power supply path is made conductive and a cutoff state in which the electric power supply path is cut off; a second slave control device connected to the first slave control device so as to be capable of transmitting and receiving the communication frame; a zone control device connected to the first slave control device and the second slave control device so as to be capable of transmitting and receiving the communication frame between the first slave control device and the second slave control device and configured to control an operation of the electric power supply switching unit; and a central control device connected to the zone control devices so as to be capable of transmitting and receiving the communication frame. The central control device stores a diagnosis mask table that defines one or more activation stop combinations of a communication group, one of the electronic control devices as a cutoff device to which the electric power supply via the electric power supply switching unit is cut off, another one of the electronic control devices as a sleep device that becomes the sleep state, and non-received frame identification information that is identification information of the communication frame not received. The central control device includes: a group determination unit that is configured to determine an activation group based on activation trigger information for determining the activation group as one of the communication groups to be set to the wake-up state upon receiving the activation trigger information; and a sleep mask information transmission unit that is configured to transmit the activation stop combination corresponding to the activation group determined by the group determination unit to the zone control device as diagnostic mask information. The zone control device includes: a mask information transfer unit configured to transfer the diagnosis mask information received from the central control device to the first slave control device and the second slave control device.

Twelfth Feature

A communication system includes: at least one of (i) a circuit and (ii) a processor having a memory storing computer program code. The at least one of the circuit and the processor having the memory is configured to cause the communication system to provide a plurality of electronic control devices connected to each other to transmit and receive a communication frame. Each of the plurality of electronic control devices belongs to at least one of a plurality of communication groups. The communication system is configured that one or more electronic control devices of the plurality of electronic control devices belonging to the at least one of the communication groups is switchable as a whole between a wake-up state and a sleep state for each of the communication groups individually. The plurality of electronic control devices include: a first slave control device that receives an electric power supply from a power source via an electric power supply switching unit configured to switch between a conduction state in which an electric power supply path is made conductive and a cutoff state in which the electric power supply path is cut off; a second slave control device connected to the first slave control device so as to be capable of transmitting and receiving the communication frame; a zone control device connected to the first slave control device and the second slave control device so as to be capable of transmitting and receiving the communication frame between the first slave control device and the second slave control device and configured to control an operation of the electric power supply switching unit; and a central control device connected to the zone control devices so as to be capable of transmitting and receiving the communication frame. The zone control device, the first slave control device, and the second slave control device store a diagnosis mask table defining one or more activation stop combinations set for the first slave control device and the second slave control device that are in control of the zone control device, and the activation stop combinations are combinations of the communication group, the cut-off device as one of the electronic control devices to which the electric power supply via the power supply switching unit is to be cut off, the sleep device as another one of the electronic control devices that becomes the sleep state, and non-received frame identification information which is identification information for the communication frame not received. The central control device includes: a group determination unit that is configured to determine an activation group based on activation trigger information for determining the activation group as one of the communication groups to be set to the wake-up state upon receiving the activation trigger information; and an activation group transmission unit that is configured to transmit the communication frame indicating the activation group determined by the group determination unit as a management frame to the zone control device. The zone control device includes: a frame transfer unit configured to transfer the management frame received from the central control device to the first slave control device and the second slave control device.

Thirteenth Feature

A communication system includes: at least one of (i) a circuit and (ii) a processor having a memory storing computer program code. The at least one of the circuit and the processor having the memory is configured to cause the communication system to provide a plurality of electronic control devices connected to each other to transmit and receive a communication frame. Each of the plurality of electronic control devices belongs to at least one of a plurality of communication groups. The communication system is configured that one or more electronic control devices of the plurality of electronic control devices belonging to the at least one of the communication groups is switchable as a whole between a wake-up state and a sleep state for each of the communication groups individually. The plurality of electronic control devices include: a first slave control device that receives an electric power supply from a power source via an electric power supply switching unit configured to switch between a conduction state in which an electric power supply path is made conductive and a cutoff state in which the electric power supply path is cut off; a second slave control device connected to the first slave control device so as to be capable of transmitting and receiving the communication frame; a zone control device connected to the first slave control device and the second slave control device so as to be capable of transmitting and receiving the communication frame between the first slave control device and the second slave control device and configured to control an operation of the electric power supply switching unit; and a central control device connected to the zone control devices so as to be capable of transmitting and receiving the communication frame. The zone control device stores diagnosis mask table defining one or more activation stop combinations set for the first slave control device and the second slave control device that are in control of the zone control device, and the activation stop combinations are combinations of the communication group, the cut-off device as one of the electronic control devices to which the electric power supply via the power supply switching unit is to be cut off, the sleep device as another one of the electronic control devices that becomes the sleep state, and non-received frame identification information which is identification information for the communication frame not received. The central control device includes: a group determination unit that is configured to determine an activation group based on activation trigger information for determining the activation group as one of the communication groups to be set to the wake-up state upon receiving the activation trigger information; and an activation group transmission unit that is configured to transmit the communication frame indicating the activation group determined by the group determination unit as a management frame to the zone control device. The zone control device includes a sleep mask information transmission unit configured to transmit the activation stop combination corresponding to the activation group indicated in the management frame received from the central control device as diagnosis mask information to the first slave control device and the second slave control device.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause the communication system to perform functions" should be understood that (i) only the circuit can cause the communication system to perform all the functions, (ii) only the processor can cause the communication system to perform all the functions, or (iii) the circuit can cause the communication system to perform at least one of the functions and the processor can cause the communication system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:

a plurality of electronic control devices connected to each other to transmit and receive a communication frame, wherein:

each of the plurality of electronic control devices belongs to at least one of a plurality of communication groups;

in the communication system, one or more electronic control devices of the plurality of electronic control devices belonging to the at least one of the communication groups is switchable between a wake-up state and a sleep state for each of the communication groups individually;

the plurality of electronic control devices include:

a first control device that receives an electric power supply from a power source via an electric power supply switching unit configured to switch between a conduction state in which an electric power supply path is made conductive and a cutoff state in which the electric power supply path is cut off;

a second control device that is connected to the first control device so as to transmit and receive the communication frame; and a third control device that is connected to the first control device and the second control device so as to transmit and receive the communication frame, and configured to control an operation of the electric power supply switching unit;

each of the first control device and the second control device stores a diagnosis mask table that defines one or more activation stop combinations;

each activation stop combination defines a combination of one of the plurality of communication groups, the one or more electronic control devices, and non-received frame identification information;

the one or more electronic control devices includes at least one of a cutoff device and a sleep device;

one of the electronic control devices is defined as the cutoff device to which the electric power supply via the electric power supply switching unit is cut off;

another one of the electronic control devices is defined as the sleep device that becomes the sleep state;

the non-received frame identification information is identification information of the communication frame not received; and the third control device includes:

a group determination unit that is configured to determine an activation group based on activation trigger information for determining the activation group as one of the plurality of communication groups to be set to the wake-up state upon receiving the activation trigger information; and an activation group transmission unit that is configured to transmit the communication frame indicating the activation group determined by the group determination unit as a management frame to the first control device and the second control device.

2. The communication system according to claim 1, wherein:

each of the first control device and the second control device sets a diagnosis mask for the activation group indicated by a received management frame by referring to the diagnosis mask table.

3. The communication system according to claim 1, wherein:

upon acquiring updated diagnosis mask table, the third control device transmits the updated diagnosis mask table to the first control device and the second control device.

4. The communication system according to claim 1, wherein:

the activation trigger information includes the communication frame in which one bit is assigned to each of the plurality of communication groups, and the one bit corresponding to one of the communication groups to be set to the wake-up state is set to 1.

5. The communication system according to claim 1, wherein:

the activation trigger information includes event occurrence information indicating that a preset event has occurred;

the third control device has an activation table that associates one or more events with the activation group; and upon acquiring the event occurrence information, the group determination unit of the third control device determines the activation group by referring to the activation table.

6. The communication system according to claim 1, wherein:

the electric power supply switching unit includes an electronic fuse.

7. The communication system according to claim 1, further comprising:

at least one of (i) a circuit and (ii) a processor having a memory storing computer program code, wherein:

the at least one of the circuit and the processor having the memory is configured to cause the communication system to: provide each of the plurality of electronic control devices.

8. A communication system comprising:

a plurality of electronic control devices connected to each other to transmit and receive a communication frame, wherein:

each of the plurality of electronic control devices belongs to at least one of a plurality of communication groups;

in the communication system, one or more electronic control devices of the plurality of electronic control devices belonging to the at least one of the communication groups is switchable between a wake-up state and a sleep state for each of the communication groups individually;

the plurality of electronic control devices include:

a first control device that receives an electric power supply from a power source via an electric power supply switching unit configured to switch between a conduction state in which an electric power supply path is made conductive and a cutoff state in which the electric power supply path is cut off;

a second control device that is connected to the first control device so as to transmit and receive the communication frame; and a third control device that is connected to the first control device and the second control device so as to transmit and receive the communication frame, and configured to control an operation of the electric power supply switching unit;

the third control device stores a diagnosis mask table that defines one or more activation stop combinations of the at least one of the communication group, one of the electronic control devices as a cutoff device to which the electric power supply via the electric power supply switching unit is cut off, another one of the electronic control devices as a sleep device that becomes the sleep state, and non-received frame identification information is identification information of the communication frame not received; and the third control device includes:

a group determination unit that is configured to determine an activation group based on activation trigger information for determining the activation group as one of the communication groups to be set to the wake-up state upon receiving the activation trigger information; and a sleep mask information transmission unit that is configured to transmit the activation stop combination corresponding to the activation group determined by the group determination unit to the first control device and the second control device as diagnosis mask information.

9. The communication system according to claim 8, wherein:

each of the first control device and the second control device sets a diagnosis mask based on a received diagnosis mask information.

10. The communication system according to claim 8, wherein:

the diagnosis mask table further defines one or more switching unit combinations of the first control device that is supplied with the electric power via the electric power supply switching unit and the non-received frame identification information; and the third control device further includes a switching mask information transmission unit that is configured to transmit the one or more switching unit combinations to the second control device as the diagnosis mask information when the electric power supply switching unit switches from an on state to an off state.

11. The communication system according to claim 8, wherein:

the activation trigger information includes the communication frame in which one bit is assigned to each of the plurality of communication groups, and the one bit corresponding to one of the communication groups to be set to the wake-up state is set to 1.

12. The communication system according to claim 8, wherein:

the activation trigger information includes event occurrence information indicating that a preset event has occurred;

the third control device has an activation table that associates one or more events with the activation group; and upon acquiring the event occurrence information, the group determination unit of the third control device determines the activation group by referring to the activation table.

13. The communication system according to claim 8, further comprising:

at least one of (i) a circuit and (ii) a processor having a memory storing computer program code, wherein:

the at least one of the circuit and the processor having the memory is configured to cause the communication system to: provide each of the plurality of electronic control devices.

14. A communication system comprising:

a plurality of electronic control devices connected to each other to transmit and receive a communication frame, wherein:

each of the plurality of electronic control devices belongs to at least one of a plurality of communication groups;

in the communication system, one or more electronic control devices of the plurality of electronic control devices belonging to the at least one of the communication groups is switchable between a wake-up state and a sleep state for each of the communication groups individually;

the plurality of electronic control devices include:

a first slave control device that receives an electric power supply from a power source via an electric power supply switching unit configured to switch between a conduction state in which an electric power supply path is made conductive and a cutoff state in which the electric power supply path is cut off;

a second slave control device connected to the first slave control device so as to be capable of transmitting and receiving the communication frame;

a zone control device connected to the first slave control device and the second slave control device so as to be capable of transmitting and receiving the communication frame between the first slave control device and the second slave control device and configured to control an operation of the electric power supply switching unit; and a central control device connected to the zone control device so as to be capable of transmitting and receiving the communication frame;

each of the zone control device, the first slave control device, and the second slave control device stores a diagnosis mask table that defines one or more activation stop combinations of the at least one of a plurality of communication groups, one of the electronic control devices as a cutoff device to which the electric power supply via the electric power supply switching unit is cut off, another one of the electronic control devices as a sleep device that becomes the sleep state, and non-received frame identification information is identification information of the communication frame not received;

the central control device includes:

a group determination unit that is configured to determine an activation group based on activation trigger information for determining the activation group as the at least one of the communication groups to be set to the wake-up state upon receiving the activation trigger information; and an activation group transmission unit that is configured to transmit the communication frame indicating the activation group determined by the group determination unit as a management frame to the zone control device; and the zone control device includes a frame transfer unit configured to transfer the management frame received from the central control device to the first slave control device and the second slave control device.

15. The communication system according to claim 14, further comprising:

at least one of (i) a circuit and (ii) a processor having a memory storing computer program code, wherein:

the at least one of the circuit and the processor having the memory is configured to cause the communication system to: provide each of the plurality of electronic control devices.

16. A communication system comprising:

a plurality of electronic control devices connected to each other to transmit and receive a communication frame, wherein:

each of the plurality of electronic control devices belongs to at least one of a plurality of communication groups;

in the communication system, one or more electronic control devices of the plurality of electronic control devices belonging to the at least one of the communication groups is switchable as a whole between a wake-up state and a sleep state for each of the communication groups individually;

the plurality of electronic control devices include:

a first slave control device that receives an electric power supply from a power source via an electric power supply switching unit configured to switch between a conduction state in which an electric power supply path is made conductive and a cutoff state in which the electric power supply path is cut off;

a second slave control device connected to the first slave control device so as to be capable of transmitting and receiving the communication frame;

a zone control device connected to the first slave control device and the second slave control device so as to be capable of transmitting and receiving the communication frame between the first slave control device and the second slave control device and configured to control an operation of the electric power supply switching unit; and a central control device connected to the zone control device so as to be capable of transmitting and receiving the communication frame;

the central control device stores a diagnosis mask table that defines one or more activation stop combinations of the at least one of a plurality of communication groups, one of the electronic control devices as a cutoff device to which the electric power supply via the electric power supply switching unit is cut off, another one of the electronic control devices as a sleep device that becomes the sleep state, and non-received frame identification information is identification information of the communication frame not received;

the central control device includes:

a group determination unit that is configured to determine an activation group based on activation trigger information for determining the activation group as the at least one of the communication groups to be set to the wake-up state upon receiving the activation trigger information; and a sleep mask information transmission unit that is configured to transmit the activation stop combination corresponding to the activation group determined by the group determination unit to the zone control device as diagnosis mask information; and the zone control device includes a mask information transfer unit configured to transfer the diagnosis mask information received from the central control device to the first slave control device and the second slave control device.

17. The communication system according to claim 16, further comprising:

at least one of (i) a circuit and (ii) a processor having a memory storing computer program code, wherein:

the at least one of the circuit and the processor having the memory is configured to cause the communication system to: provide each of the plurality of electronic control devices.

18. A communication system comprising:

a plurality of electronic control devices connected to each other to transmit and receive a communication frame, wherein:

each of the plurality of electronic control devices belongs to at least one of a plurality of communication groups;

in the communication system, one or more electronic control devices of the plurality of electronic control devices belonging to the at least one of the communication groups is switchable between a wake-up state and a sleep state for each of the communication groups individually;

the plurality of electronic control devices include:

a first slave control device that receives an electric power supply from a power source via an electric power supply switching unit configured to switch between a conduction state in which an electric power supply path is made conductive and a cutoff state in which the electric power supply path is cut off;

a second slave control device connected to the first slave control device so as to be capable of transmitting and receiving the communication frame;

a zone control device connected to the first slave control device and the second slave control device so as to be capable of transmitting and receiving the communication frame between the first slave control device and the second slave control device and configured to control an operation of the electric power supply switching unit; and a central control device connected to the zone control device so as to be capable of transmitting and receiving the communication frame;

each of the zone control device, the first slave control device, and the second slave control device stores a diagnosis mask table defining one or more activation stop combinations set for the first slave control device and the second slave control device that are in control of the zone control device;

the activation stop combinations are combinations of the communication group, a cut-off device as one of the electronic control devices to which the electric power supply via the power supply switching unit is to be cut off, a sleep device as another one of the electronic control devices that becomes the sleep state, and non-received frame identification information is identification information for the communication frame not received;

the central control device includes:

a group determination unit that is configured to determine an activation group based on activation trigger information for determining the activation group as the at least one of the communication groups to be set to the wake-up state upon receiving the activation trigger information; and an activation group transmission unit that is configured to transmit the communication frame indicating the activation group determined by the group determination unit as a management frame to the zone control device; and the zone control device includes a frame transfer unit configured to transfer the management frame received from the central control device to the first slave control device and the second slave control device.

19. The communication system according to claim 18, further comprising:

at least one of (i) a circuit and (ii) a processor having a memory storing computer program code, wherein:

the at least one of the circuit and the processor having the memory is configured to cause the communication system to: provide each of the plurality of electronic control devices.

20. A communication system comprising:

a plurality of electronic control devices connected to each other to transmit and receive a communication frame, wherein:

each of the plurality of electronic control devices belongs to at least one of a plurality of communication groups;

in the communication system, one or more electronic control devices of the plurality of electronic control devices belonging to the at least one of the communication groups is switchable between a wake-up state and a sleep state for each of the communication groups individually;

the plurality of electronic control devices include:

a first slave control device that receives an electric power supply from a power source via an electric power supply switching unit configured to switch between a conduction state in which an electric power supply path is made conductive and a cutoff state in which the electric power supply path is cut off;

a second slave control device connected to the first slave control device so as to be capable of transmitting and receiving the communication frame;

a zone control device connected to the first slave control device and the second slave control device so as to be capable of transmitting and receiving the communication frame between the first slave control device and the second slave control device and configured to control an operation of the electric power supply switching unit; and a central control device connected to the zone control device so as to be capable of transmitting and receiving the communication frame;

the zone control device stores a diagnosis mask table defining one or more activation stop combinations set for the first slave control device and the second slave control device that are in control of the zone control device;

the activation stop combinations are combinations of the communication group, a cut-off device as one of the electronic control devices to which the electric power supply via the power supply switching unit is to be cut off, a sleep device as another one of the electronic control devices that becomes the sleep state, and non-received frame identification information is identification information for the communication frame not received;

the central control device includes:

a group determination unit that is configured to determine an activation group based on activation trigger information for determining the activation group as the at least one of the communication groups to be set to the wake-up state upon receiving the activation trigger information; and an activation group transmission unit that is configured to transmit the communication frame indicating the activation group determined by the group determination unit as a management frame to the zone control device; and the zone control device includes a sleep mask information transmission unit configured to transmit the activation stop combination corresponding to the activation group indicated in the management frame received from the central control device as diagnosis mask information to the first slave control device and the second slave control device.

21. The communication system according to claim 20, further comprising:

at least one of (i) a circuit and (ii) a processor having a memory storing computer program code, wherein:

the at least one of the circuit and the processor having the memory is configured to cause the communication system to: provide each of the plurality of electronic control devices.

* * * * *